(12) United States Patent
Shibata

(10) Patent No.: US 9,519,155 B2
(45) Date of Patent: Dec. 13, 2016

(54) OPTICAL SYSTEM, IMAGING APPARATUS AND METHOD FOR MANUFACTURING THE OPTICAL SYSTEM

(75) Inventor: Satoru Shibata, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/994,757

(22) PCT Filed: Dec. 14, 2011

(86) PCT No.: PCT/JP2011/078871
§ 371 (c)(1),
(2), (4) Date: Oct. 14, 2013

(87) PCT Pub. No.: WO2012/081603
PCT Pub. Date: Jun. 21, 2012

(65) Prior Publication Data
US 2014/0029111 A1    Jan. 30, 2014

(30) Foreign Application Priority Data

Dec. 17, 2010 (JP) ................. 2010-281885
Dec. 17, 2010 (JP) ................. 2010-281891
(Continued)

(51) Int. Cl.
G02B 27/64 (2006.01)
G02B 15/20 (2006.01)
G02B 15/173 (2006.01)

(52) U.S. Cl.
CPC ........... *G02B 27/646* (2013.01); *G02B 15/173* (2013.01); *G02B 15/20* (2013.01); *Y10T 29/49826* (2015.01)

(58) Field of Classification Search
CPC ......... G02B 15/02; G02B 15/04; G02B 27/64; G02B 27/646
See application file for complete search history.

(56) References Cited

U.S. PATENT DOCUMENTS 5,760,957 A    6/1998 Suzuki
6,384,975 B1*  5/2002 Hayakawa ..................... 359/557
(Continued)

FOREIGN PATENT DOCUMENTS

JP    01-116619 A    5/1989
JP    06-082889 A    3/1994
(Continued)

OTHER PUBLICATIONS

English translation of the International Preliminary Report on Patentability from International Application No. PCT/JP2011/078871, Jun. 18, 2013.

*Primary Examiner* — Darryl J Collins
(74) *Attorney, Agent, or Firm* — Shapiro, Gabor and Rosenberger, PLLC

(57) ABSTRACT

An optical system comprises a first lens element and a second lens element which are respectively shiftable to have a component in a direction perpendicular to the optical axis, the second lens element being composed of the first lens element and other lens element, and the first lens element or the second lens element being shifted to have a component in a direction perpendicular to the optical axis, thereby carrying out a correction of the image plane. Thus, there are provided an optical system having a suitable vibration reduction property, an image apparatus equipped with the optical system and a method for manufacturing the optical system.

23 Claims, 50 Drawing Sheets

(30) Foreign Application Priority Data

Dec. 13, 2011  (JP) .................................. 2011-272193
Dec. 13, 2011  (JP) .................................. 2011-272200

(56) References Cited

U.S. PATENT DOCUMENTS

| | | | |
|---|---|---|---|
| 2003/0133200 A1* | 7/2003 | Sato | 359/686 |
| 2007/0195425 A1* | 8/2007 | Arai | 359/687 |
| 2009/0040625 A1* | 2/2009 | Shinohara et al. | 359/687 |
| 2009/0086321 A1* | 4/2009 | Mizuguchi et al. | 359/557 |

FOREIGN PATENT DOCUMENTS

| | | |
|---|---|---|
| JP | 07-027978 A | 1/1995 |
| JP | 2001-249276 A | 9/2001 |
| JP | 2002-250952 A | 9/2002 |
| JP | 2003-295250 A | 10/2003 |
| JP | 2004-046022 A | 2/2004 |
| JP | 2006-227526 A | 8/2006 |

\* cited by examiner

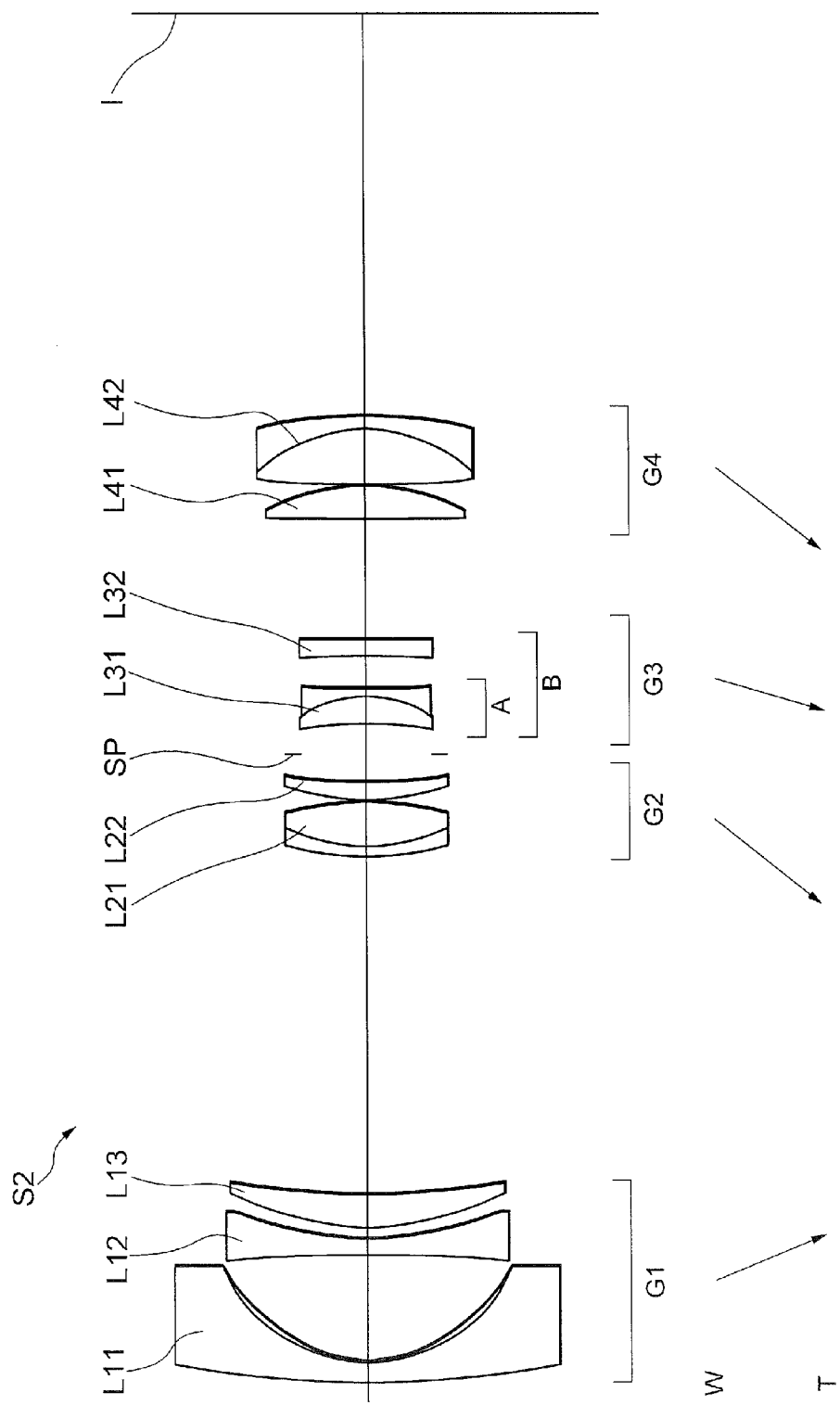

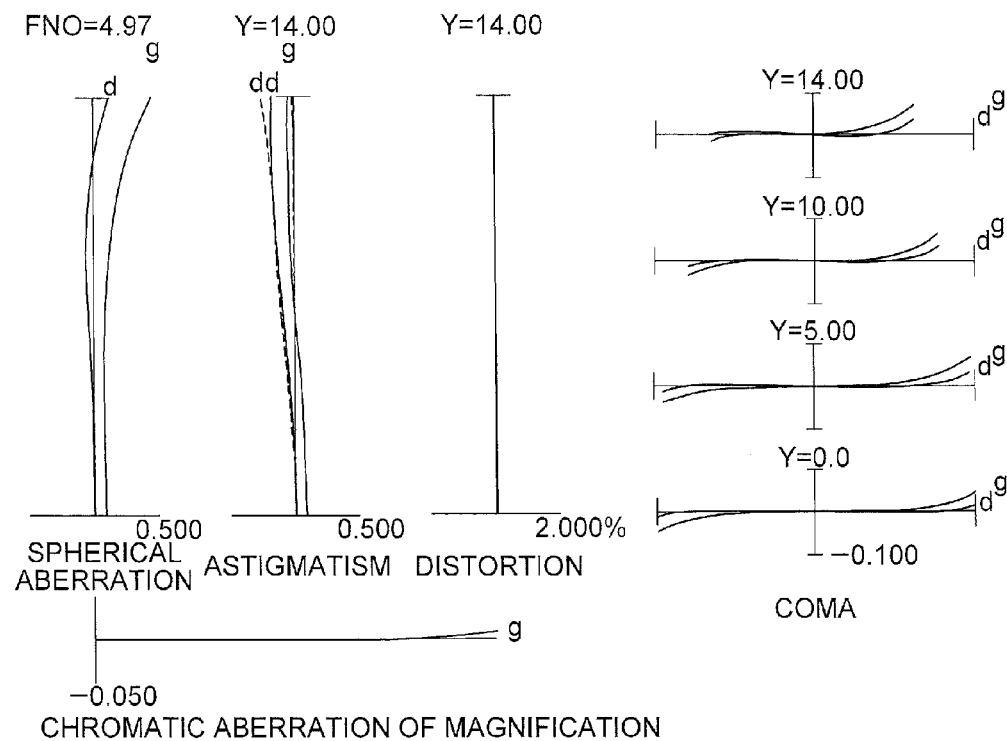
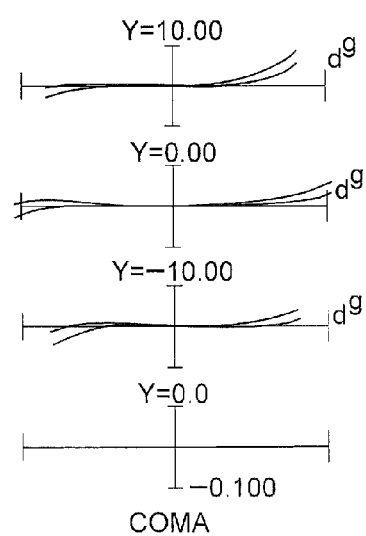
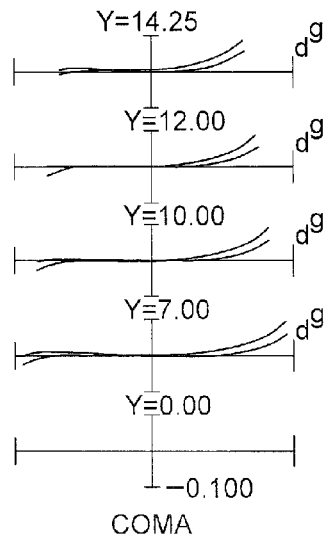

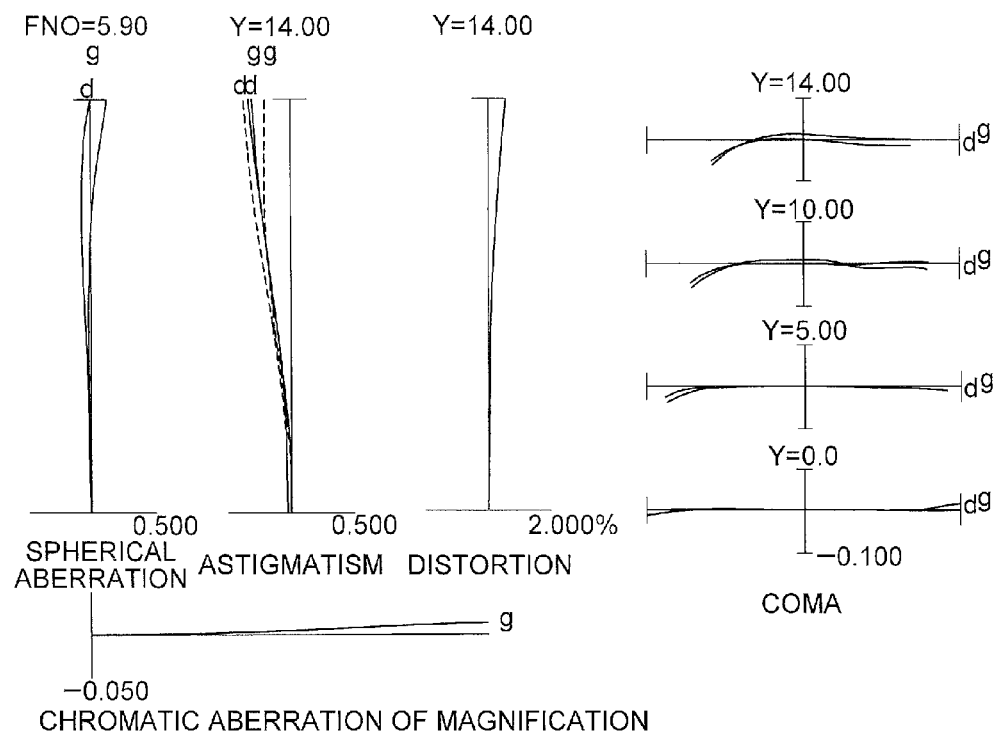
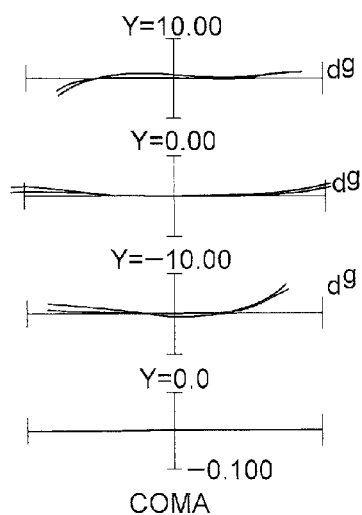
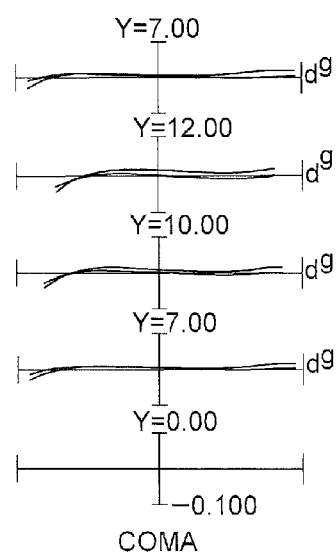
FIG. 8A
FIG. 8B
FIG. 8C

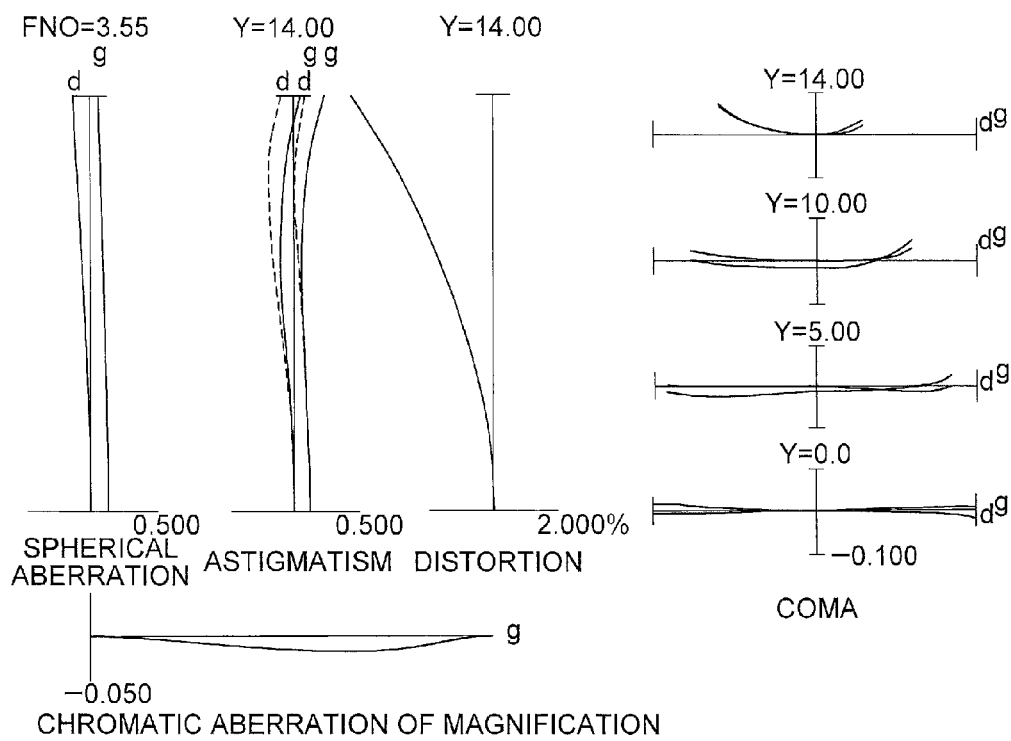
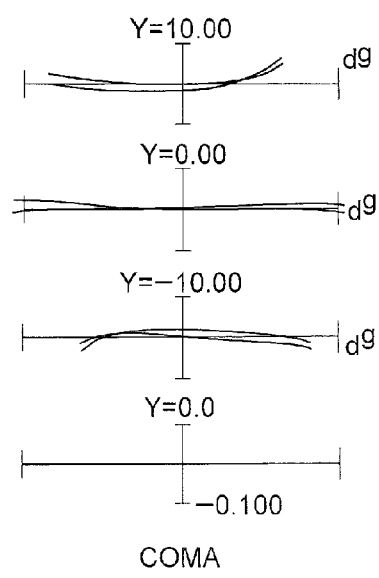
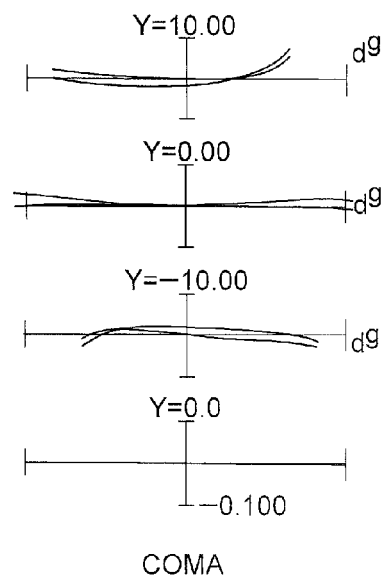

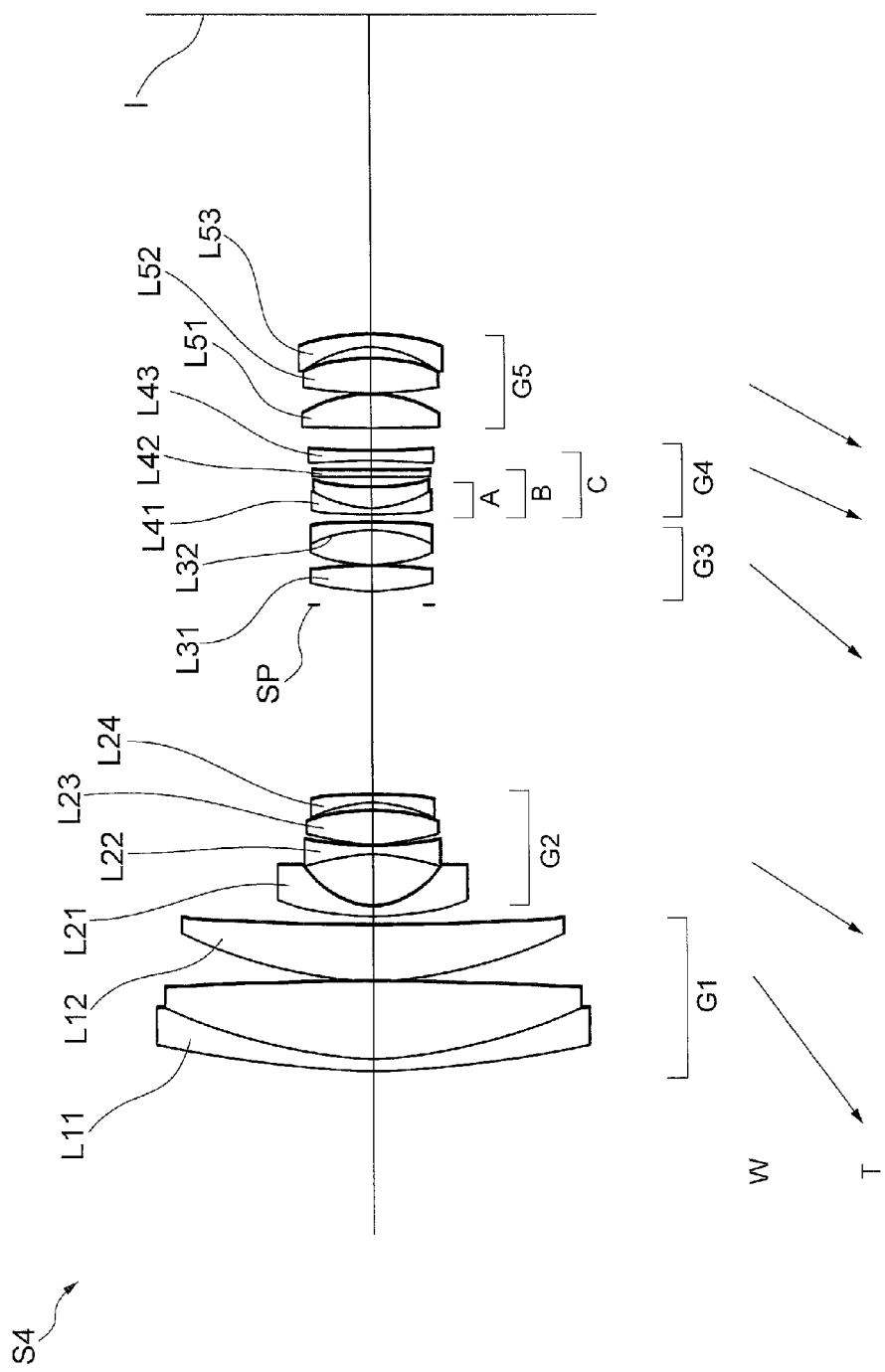

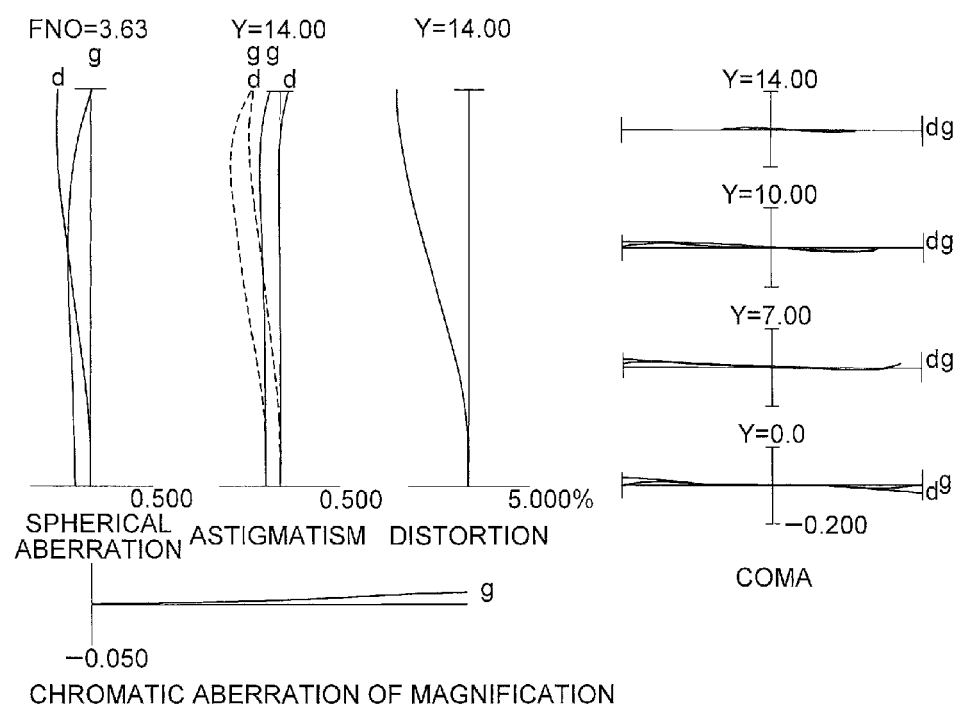
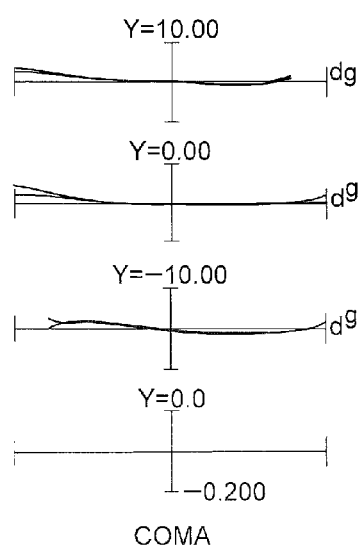
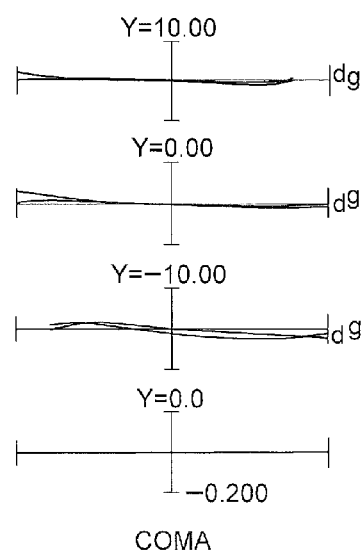

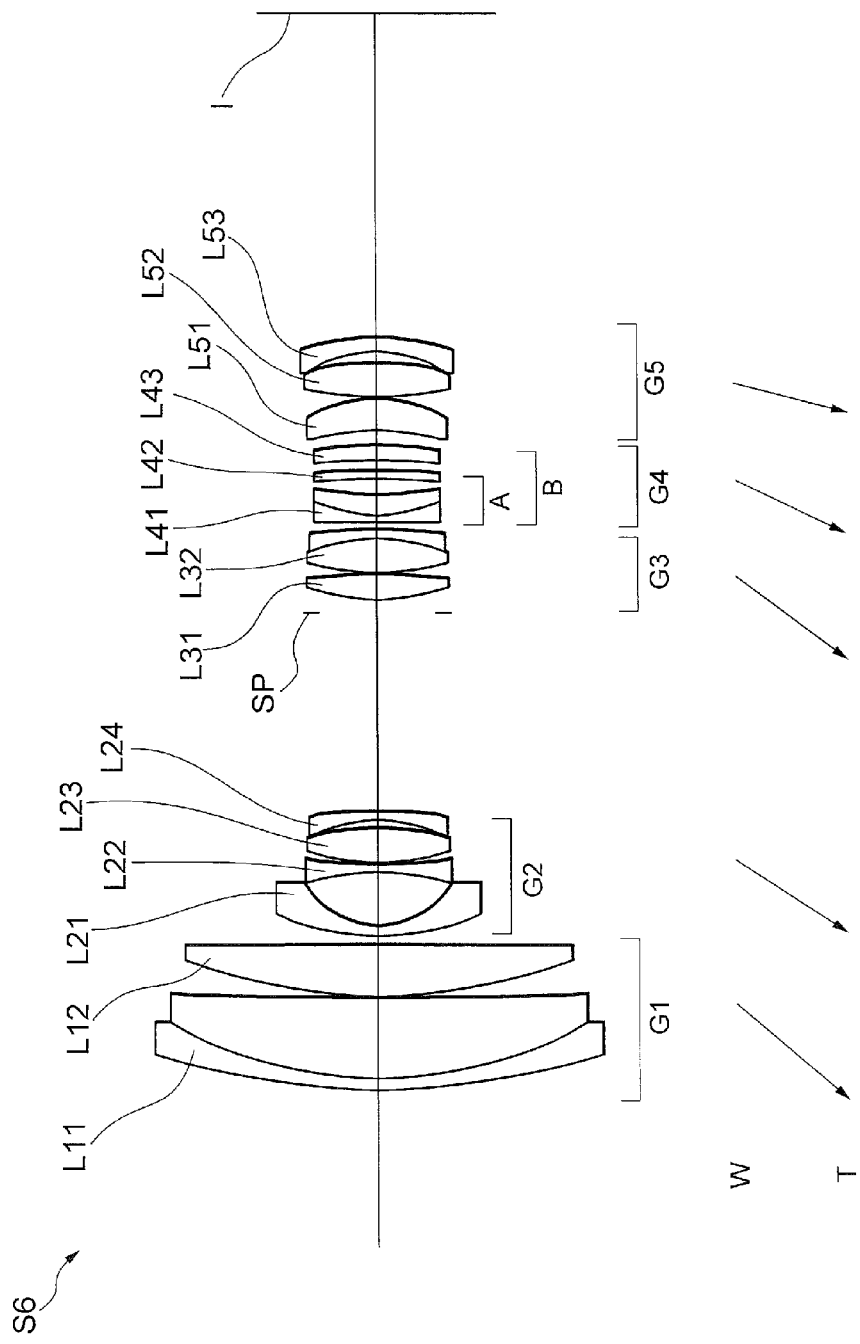

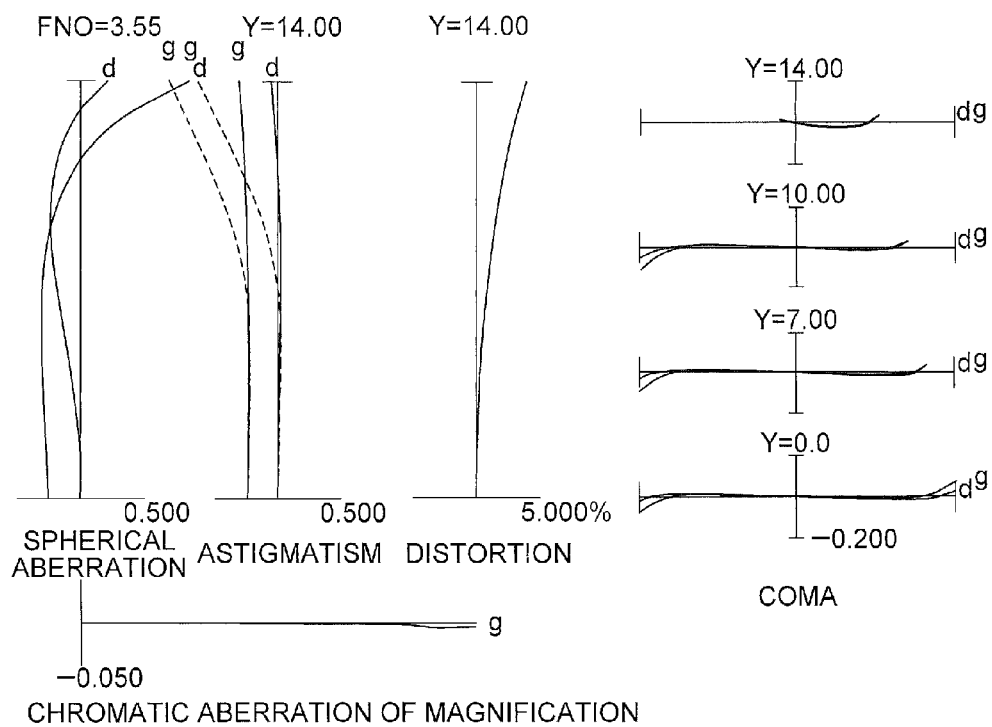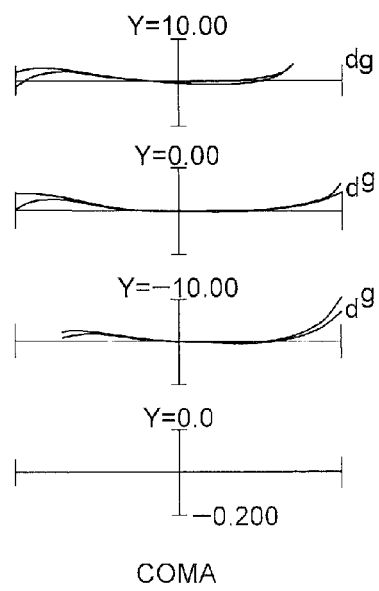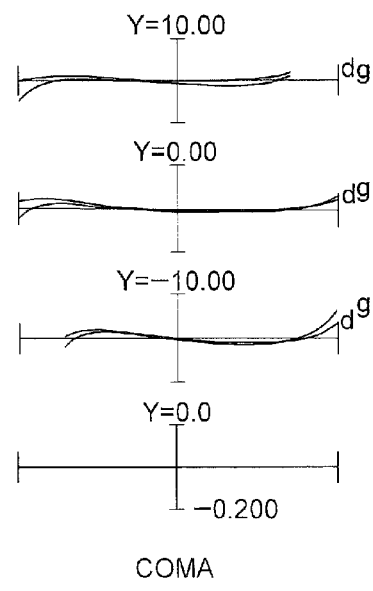

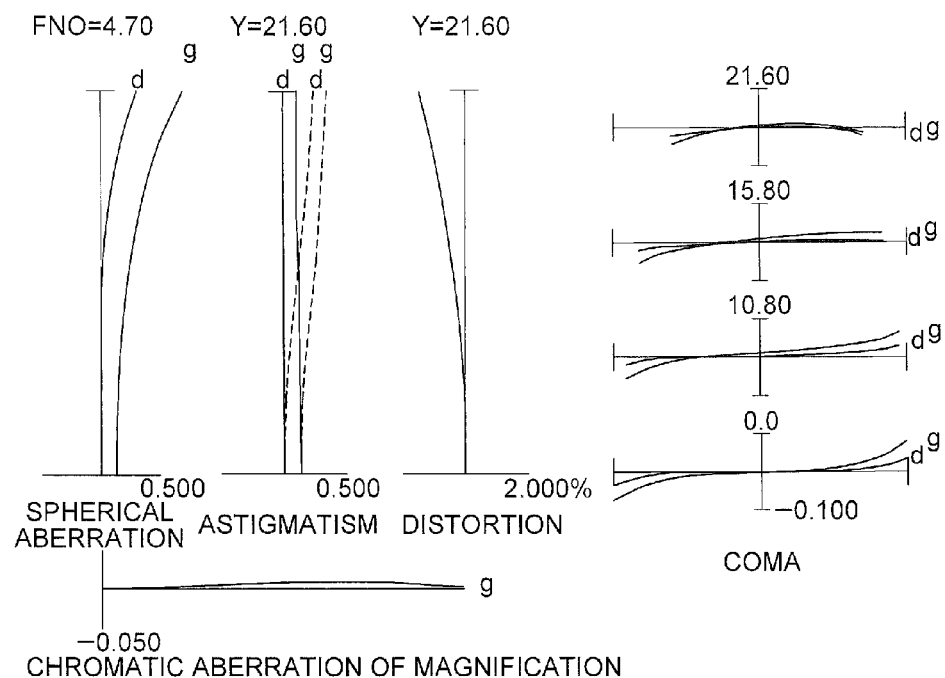
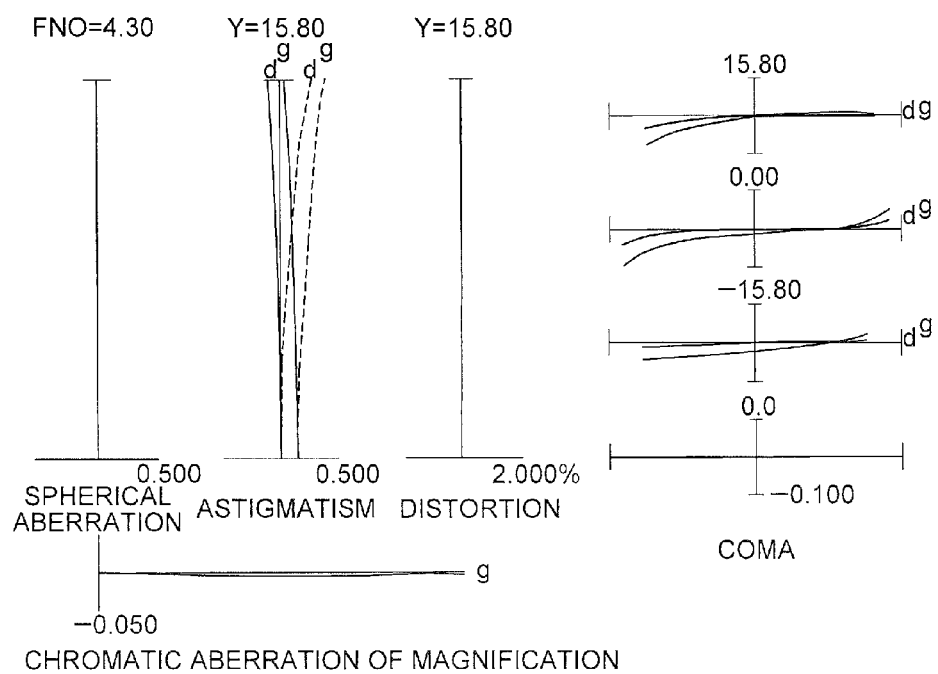

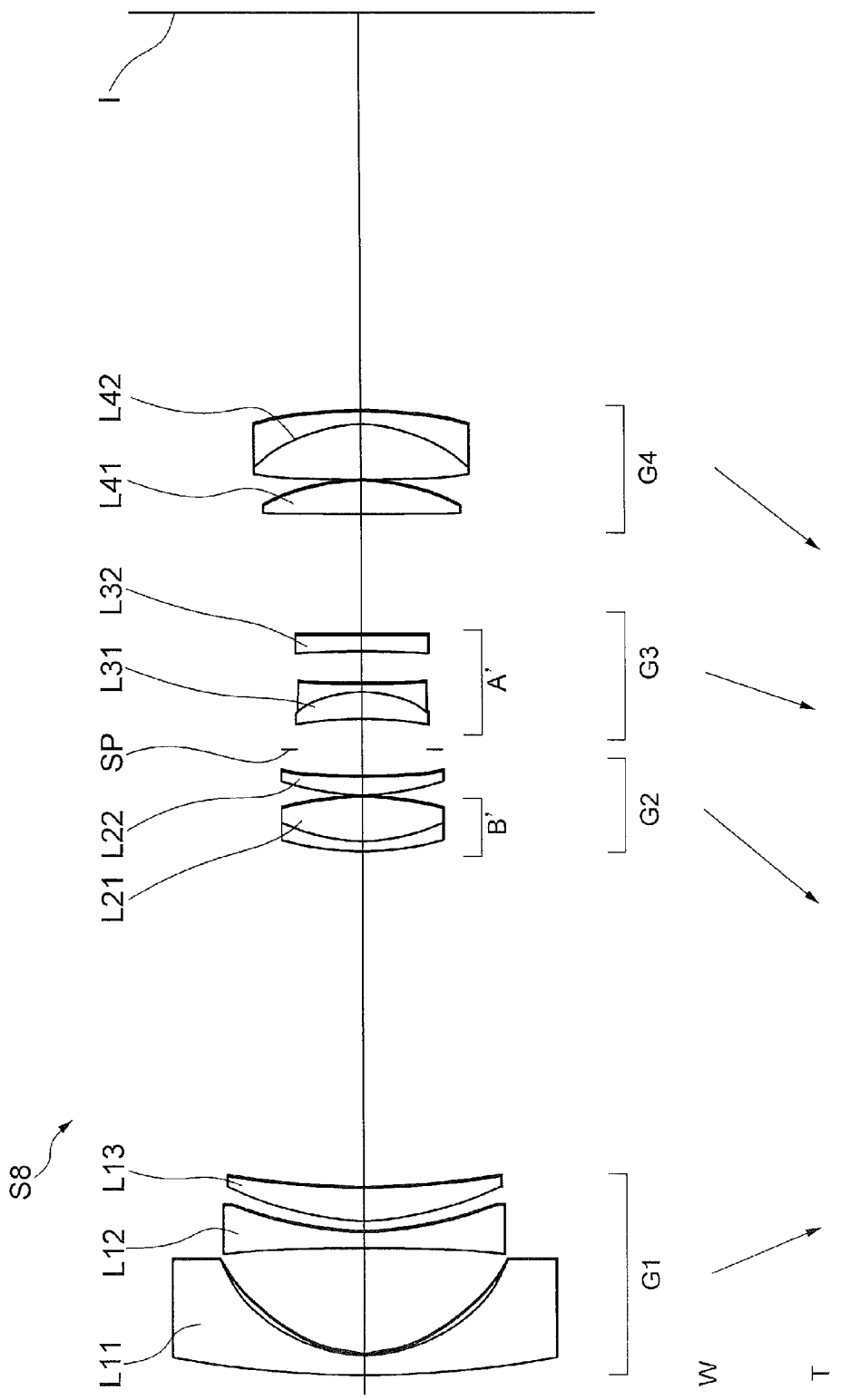

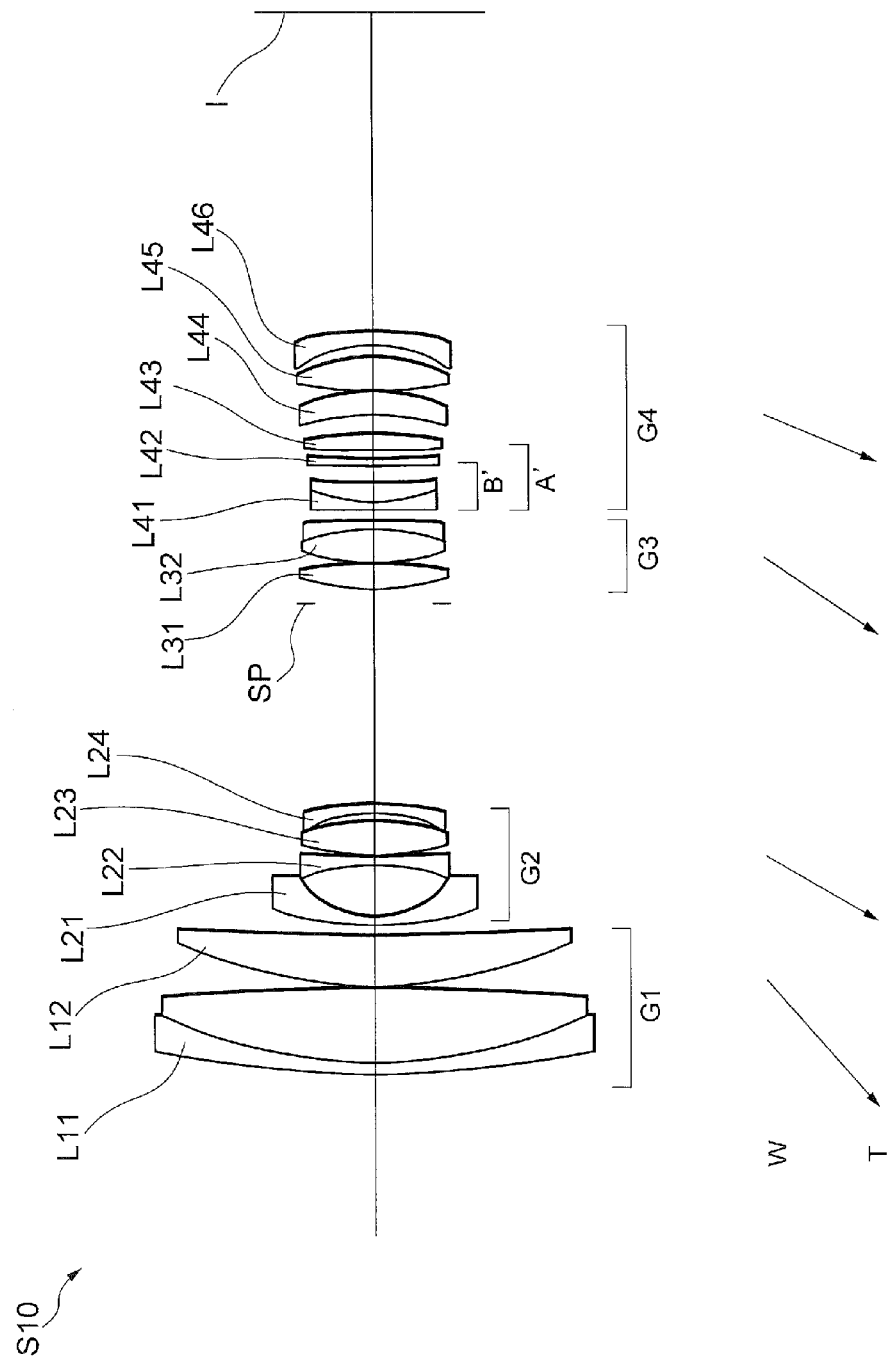

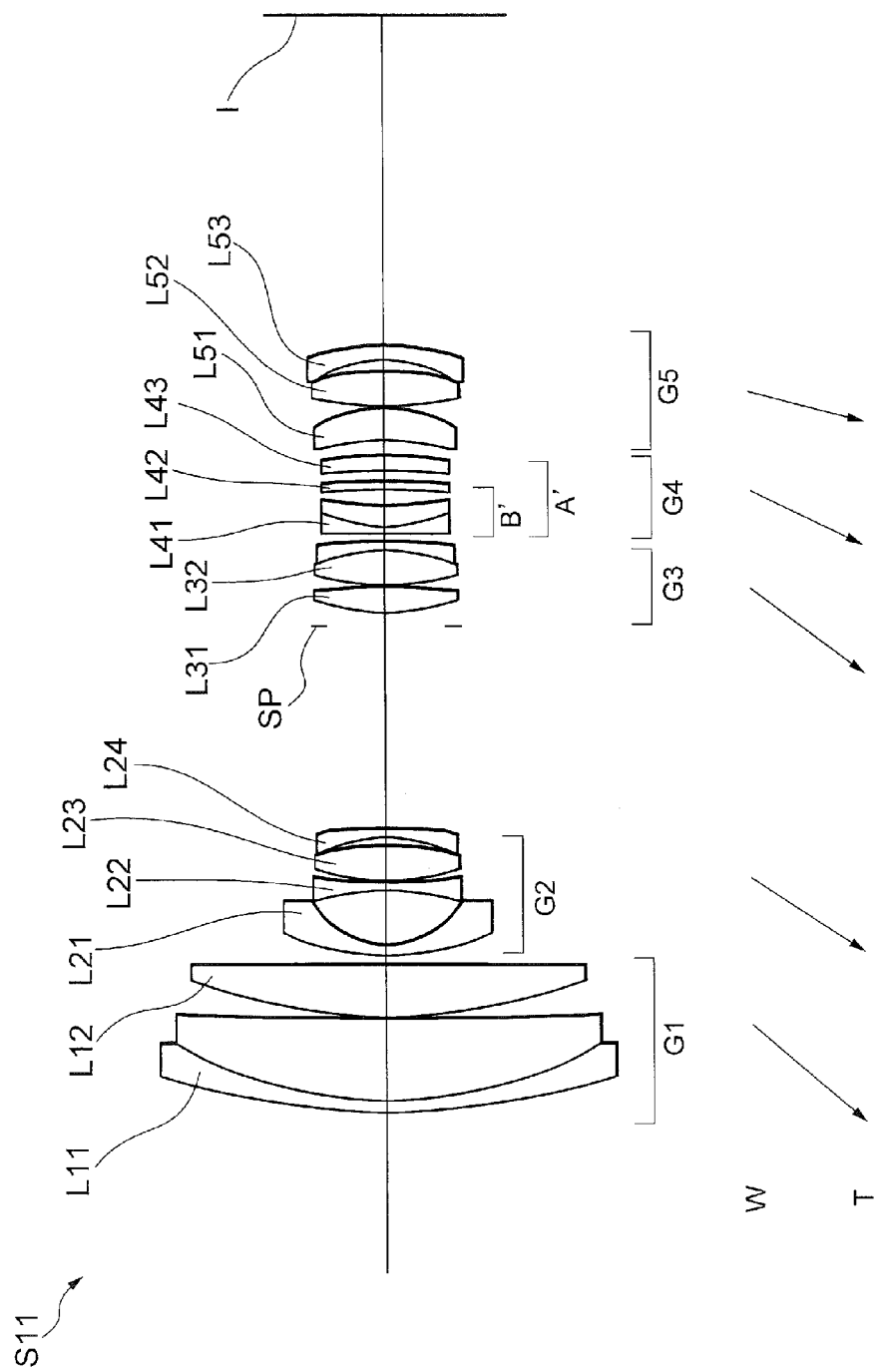

OPTICAL SYSTEM, IMAGING APPARATUS AND METHOD FOR MANUFACTURING THE OPTICAL SYSTEM

TECHNICAL FIELD OF THE INVENTION

The present invention relates to an optical system having a vibration reduction function, an image apparatus with this optical system, and a method of manufacturing the optical system.

BACKGROUND ART

There are hitherto-proposed optical systems having a vibration reduction function, to be used for imaging devices, such as cameras (e.g., refer to Patent Document 1).

PRIOR ART DOCUMENT

Patent Document

Patent Document 1: Japanese Patent Application Laid-Open No. 2001-249276

SUMMARY OF THE INVENTION

However, the conventional optical system having a vibration reduction function had a problem that, when an amount of correction of an image plane increases, a shifting amount of a lens increases so that it becomes difficult to control.

The present invention has been accomplished in light of the problem as described above, and an object of the present invention is to provide an optical system having a suitable vibration reduction function, an imaging apparatus with this optical system, and a method of manufacturing the optical system.

Means for Solving the Problem

For purposes of attaining the above object, according to a first aspect of the present invention, there is provided an optical system comprising a first lens element and a second lens element which are respectively shiftable to have a component in a direction perpendicular to the optical axis, said second lens element being composed of said first lens element and other element, and said first lens element or said second lens element being shifted to have a component in a direction perpendicular to the optical axis, thereby carrying out correction of the image plane.

According to a second aspect of the present invention, there is provided an imaging apparatus equipped with an optical system according to the first aspect of the present invention.

According to a third aspect of the present invention, there is provided an optical system comprising a first lens element and a second lens element which are respectively shiftable to have a component in a direction perpendicular to the optical axis, wherein, upon zooming from a wide angle end state to a telephoto end state, in accordance with variation in a focal length from the wide angle end state to the telephoto end state, either said first lens element or said second lens element is shifted to have a component in a direction perpendicular to the optical axis, thereby carrying out correction of the image plane, and the following conditional expressions are satisfied:

$$|fB'|<|fA'|$$

$$fw \leq fh \leq (|fB'|/|fA'|) \times ft \times 1.50$$

$$(|fB'|/|fA'|) \times ft \times 0.50 \leq fk \leq ft$$

where fA' denotes a focal length of a first lens element,
fB' denotes a focal length of a second lens element,
fw denotes a focal length of an entire optical system in a wide angle end state,
ft denotes a focal length of the entire optical system in a telephoto end state, and
fh denotes a focal length of the entire optical system upon performing a correction of the image plane by the first lens element, and
fk denotes a focal length of the entire optical system upon performing a correction of the image plane by the second lens element.

Further, according to a fourth aspect of the present invention, there is provided an optical system comprising a first lens element, a second lens element and a third lens element which are respectively shiftable to have a component in a direction perpendicular to the optical axis, wherein any one of said first lens element, said second lens element and said third lens element is shifted to have a component in a direction perpendicular to the optical axis, thereby carrying out a correction of the image plane, upon zooming from a wide angle end state to a telephoto end state, in accordance with variation in the focal length from said wide angle end state to said telephoto end state.

Further, according to a fifth aspect of the present invention, there is provided an imaging apparatus equipped with an optical system according to the third aspect of the present invention.

Furthermore, according to a sixth aspect of the present invention, there is provided an imaging apparatus equipped with an optical system according to the fourth aspect of the present invention.

Further, according to a seventh aspect of the present invention, there is provided a method for manufacturing an optical system comprising a first lens element and a second lens element, comprising steps of constructing said second lens element by said first lens element and other lens element, disposing said first lens element and said second lens element to be respectively shiftable to have a component in a direction perpendicular to the optical axis such that either said first lens element or said second lens element may be shifted to have a component in a direction perpendicular to the optical axis, thereby carrying out a correction of the image plane.

Further, according to the seven aspect of the present invention, there is provided a method for manufacturing an optical system comprising a first lens element and a second lens element, comprising steps of constructing said second lens element by said first lens element and other lens element, disposing said first lens element and said second lens element to be respectively able to be shifted to have a component in a direction perpendicular to the optical axis such that either said first lens element or said second lens element may be shifted to have a component in a direction perpendicular to the optical axis, thereby carrying out correction of the image plane.

Further, according to an eighth aspect of the present invention, there is provided a method for manufacturing an optical system comprising a first lens element and a second lens element, comprising steps of constructing said first lens element and said second lens element to be shiftable respectively to have a component in a direction perpendicular to the optical axis such that, upon zooming from a wide angle end state to a telephoto end state, in accordance with variation in focal length from the wide angle end state to the telephoto end state, either said first lens element or said second lens element may be shifted to have a component in a direction perpendicular to the optical axis, thereby carrying out correction of the image plane, and the following conditional expressions may be satisfied:

$$|fB'|<|fA'|$$

$$fw \leq fh \leq (|fB'|/|fA'|) \times ft \times 1.50$$

$$(|fB'|/|fA'|) \times ft \times 0.50 \leq fk \leq ft$$

where fA' denotes a focal length of the first lens element, fB' denotes a focal length of the second lens element, fw denotes a focal length of an entire optical system in a wide angle end state, ft denotes a focal length of the entire optical system in a telephoto end state, and fh denotes a focal length of the entire optical system upon performing a correction of the image plane by the first lens element, and fk denotes a focal length of the entire optical system upon performing a correction of the image plane by the second lens element.

Further, according to a ninth aspect of the present invention, there is provided a method for manufacturing an optical system comprising a first lens element, a second lens element and a third lens element, comprising steps of constructing such that said first lens element, said second lens element and said third lens element may be respectively shiftable to have a component in a direction perpendicular to the optical axis, and constructing such that any one of said first lens element, said second lens element and said third lens element may be shifted in the direction perpendicular to the optical axis to carry out correction of the image plane, upon zooming from a wide angle end state to a telephoto end state, in accordance with variation in the focal length from said wide angle end state to said telephoto end state.

Effect of the Invention

According to the present invention, there can be provided an optical system having a suitable vibration reduction function, an image apparatus with this optical system, and a method of manufacturing the optical system.

BRIEF DESCRIPTION OF THE DRAWINGS

FIGS. 2A, 2B, 2C and 2D show diagrams of aberrations of the optical system relating to the first example in a wide angle end state upon focusing on infinity, wherein FIG. 2A shows various aberrations, FIG. 2B shows meridional transverse aberration at the time when a correction of an image blur is performed by a lens element A, FIG. 2C shows meridional transverse aberration at the time when a correction of an image blur is performed by a lens element B, and FIG. 2D shows meridional transverse aberration at the time when a correction of an image blur is performed by a lens element C.

FIGS. 3A, 3B, 3C and 3D show diagrams of aberrations of the optical system relating to the first example in an intermediate focal length state upon focusing on infinity, wherein FIG. 3A shows various aberrations, FIG. 3B shows meridional transverse aberration at the time when the correction of the image blur is performed by the lens element A, FIG. 3C shows meridional transverse aberration at the time when the correction of the image blur is performed by the lens element B, and FIG. 3D shows meridional transverse aberration at the time when the correction of the image blur is performed by the lens element C.

FIGS. 4A, 4B, 4C and 4D show diagrams of aberrations of the optical system relating to the first example in a telephoto end state upon focusing on infinity, wherein FIG. 4A shows various aberrations, FIG. 4B shows meridional transverse aberration at the time when the correction of the image blur is performed by the lens element A, FIG. 4C shows meridional transverse aberration at the time when the correction of the image blur is performed by the lens element B, and FIG. 4D shows meridional transverse aberration at the time when the correction of the image blur is performed by the lens element C.

FIG. 5 is a view showing a configuration of an optical system relating to a second example according to the first embodiment of the present invention.

FIGS. 6A, 6B and 6C show diagrams of aberrations of the optical system relating to the second example in a wide angle end state upon focusing on infinity, wherein FIG. 6A shows various aberrations, FIG. 6B shows meridional transverse aberration at the time when a correction of an image blur is performed by a lens element A, and FIG. 6C shows meridional transverse aberration at the time when the correction of the image blur is performed by a lens element B.

FIGS. 7A, 7B and 7C show diagrams of aberrations of the optical system relating to the second example in an intermediate focal length state upon focusing on infinity, wherein FIG. 7A shows various aberrations, FIG. 7B shows meridional transverse aberration at the time when correction of image blur is performed by the lens element A, and FIG. 7C shows meridional transverse aberration at the time when the correction of the image blur is performed by the lens element B.

FIGS. 8A, 8B and 8C diagrams of aberrations of the optical system relating to the second example in a telephoto end state upon focusing on infinity, wherein FIG. 8A shows various aberrations, FIG. 8B shows meridional transverse aberration at the time when the correction of the image blur is performed by the lens element A, and FIG. 8C shows meridional transverse aberration at the time when the correction of the image blur is performed by the lens element B.

FIGS. 10A, 10B and 10C show diagrams of aberrations of the optical system relating to the third example in a wide angle end state upon focusing on infinity, wherein FIG. 10A shows various aberrations, FIG. 10B shows meridional transverse aberration at the time when a correction of an image blur is performed by a lens element A, and FIG. 10C shows meridional transverse aberration at the time when the correction of the image blur is performed by a lens element B.

FIGS. 11A, 11B and 11C show diagrams of aberrations of the optical system relating to the third example in an intermediate focal length state upon focusing on infinity, wherein FIG. 11A shows various aberrations, FIG. 11B shows meridional transverse aberration at the time when the correction of image blur is performed by the lens element A, and FIG. 11C shows meridional transverse aberration at the time when the correction of the image blur is performed by the lens element B.

FIGS. 12A, 12B and 12C show diagrams of aberrations of the optical system relating to the third example in a telephoto end state upon focusing on infinity, wherein FIG. 12A shows various aberrations, FIG. 12B shows meridional transverse aberration at the time when the correction of the image blur is performed by the lens element A, and FIG. 12C shows meridional transverse aberration at the time when the correction of the image blur is performed by the lens element B.

FIG. 13 is a view showing a configuration of an optical system relating to a fourth example according to the first embodiment of the present invention.

FIGS. 14A, 14B, 14C and 14D show diagrams of aberrations of the optical system relating to the fourth example in a wide angle end state upon focusing on infinity, wherein FIG. 14A shows various aberrations, FIG. 14B shows meridional transverse aberration at the time when the correction of the image blur is performed by a lens element A, FIG. 14C shows meridional transverse aberration at the time when the correction of the image blur is performed by a lens element B, and FIG. 14D shows meridional transverse aberration at the time when the correction of the image blur is performed by a lens element C.

FIGS. 15A, 15B, 15C and 15D show diagrams of aberrations of the optical system relating to the fourth example in an intermediate focal length state upon focusing on infinity, wherein FIG. 15A shows various aberrations, FIG. 15B shows meridional transverse aberration at the time when the correction of the image blur is performed by the lens element A, FIG. 15C shows meridional transverse aberration at the time when the correction of the image blur is performed by the lens element B, and FIG. 15D shows meridional transverse aberration at the time when the correction of the image blur is performed by the lens element C.

FIGS. 16A, 16B, 16C and 16D show diagrams of aberrations of the optical system relating to the fourth example in a telephoto end state upon focusing on infinity, wherein FIG. 16A shows various aberrations, FIG. 16B shows meridional transverse aberration at the time when the correction of the image blur is performed by the lens element A, FIG. 16C shows meridional transverse aberration at the time when the correction of the image blur is performed by the lens element B, and FIG. 16D shows meridional transverse aberration at the time when the correction of the image blur is performed by the lens element C.

FIGS. 18A, 18B and 18C show diagrams of aberrations of the optical system relating to the fifth example in a wide angle end state upon focusing on infinity, wherein FIG. 18A shows various aberrations, FIG. 18B shows meridional transverse aberration at the time when a correction of an image blur is performed by a lens element A, and FIG. 18C shows meridional transverse aberration at the time when the correction of the image blur is performed by a lens element B.

FIGS. 19A, 19B and 19C show diagrams of aberrations of the optical system relating to the fifth example in an intermediate focal length state upon focusing on infinity, wherein FIG. 19A shows various aberrations, FIG. 19B shows meridional transverse aberration at the time when the correction of the image blur is performed by the lens element A, and FIG. 19C shows meridional transverse aberration at the time when the correction of the image blur is performed by the lens element B.

FIGS. 20A, 20B and 20C show diagrams of aberrations of the optical system relating to the fifth example in a telephoto end state upon focusing on infinity, wherein FIG. 20A shows various aberrations, FIG. 20B shows meridional transverse aberration at the time when the correction of the image blur is performed by the lens element A, and FIG. 20C shows meridional transverse aberration at the time when the correction of the image blur is performed by the lens element B.

FIG. 21 is a view showing a configuration of an optical system relating to a sixth example according to the first embodiment of the present invention.

FIGS. 22A, 22B and 22C show diagrams of aberrations of the optical system relating to the sixth example in a wide angle end state upon focusing on infinity, wherein FIG. 22A shows various aberrations, FIG. 22B shows meridional transverse aberration at the time when a correction of an image blur is performed by a lens element A, and FIG. 22C shows meridional transverse aberration at the time when the correction of the image blur is performed by a lens element B.

FIGS. 23A, 23B and 23C show diagrams of aberrations of the optical system relating to the sixth example in an intermediate focal length state upon focusing on infinity, wherein FIG. 23A shows various aberrations, FIG. 23B shows meridional transverse aberration at the time when the correction of the image blur is performed by the lens element A, and FIG. 23C shows meridional transverse aberration at the time when the correction of the image blur is performed by the lens element B.

FIGS. 24A, 24B and 24C show diagrams of aberrations of the optical system relating to the sixth example in a telephoto end state upon focusing on infinity, wherein FIG. 24A shows various aberrations, FIG. 24B shows meridional transverse aberration at the time when the correction of the image blur is performed by the lens element A, and FIG. 24C shows meridional transverse aberration at the time when the correction of the image blur is performed by the lens element B.

FIGS. 28A and 28B show diagrams of aberrations of the optical system relating to the seventh example in a wide angle end state upon focusing on infinity, wherein FIG. 28A shows various aberrations, and FIG. 2B shows various aberration at the time when a correction of an image blur is performed by a lens element A'.

FIGS. 29A and 29B show diagrams of aberrations of the optical system relating to the seventh example in an intermediate focal length state upon focusing on infinity, wherein FIG. 29A shows various aberrations, and FIG. 29B shows various aberration at the time when the correction of the image blur is performed by the lens element B'.

FIGS. 30A and 30B show diagrams of aberrations of the optical system relating to the seventh example in a telephoto end state upon focusing on infinity, wherein FIG. 30A shows various aberrations, and FIG. 30B shows various aberration at the time when the correction of the image blur is performed by the lens element C'.

FIG. 31 is a view showing a configuration of an optical system relating to an eighth example according to the second embodiment of the present invention.

FIGS. 32A, and 32B show diagrams of aberrations of the optical system relating to the eighth example in a wide angle end state upon focusing on infinity, wherein FIG. 32A shows various aberrations, and FIG. 32B shows various aberration at the time when a correction of an image blur is performed by a lens element A'.

FIGS. 33A and 33B show diagrams of aberrations of the optical system relating to the eighth example in an intermediate focal length state upon focusing on infinity, wherein FIG. 33A shows various aberrations, and FIG. 33B shows various aberration at the time when the correction of the image blur is performed by the lens element A'.

FIGS. 34A and 34B show diagrams of aberrations of the optical system relating to the eighth example in a telephoto end state upon focusing on infinity, wherein FIG. 34A shows various aberrations, and FIG. 34B shows various aberration at the time when the correction of the image blur is performed by the lens element B'.

FIGS. 36A and 36B show diagrams of aberrations of the optical system relating to the ninth example in a wide angle end state upon focusing on infinity, wherein FIG. 36A shows various aberrations, and FIG. 36B shows various aberration at the time when a correction of an image blur is performed by a lens element A'.

FIGS. 37A and 37B show diagrams of aberrations of the optical system relating to the ninth example in an intermediate focal length state upon focusing on infinity, wherein FIG. 37A shows various aberrations, and FIG. 37B shows various aberration at the time when the correction of the image blur is performed by the lens element B'.

FIGS. 38A and 38B show diagrams of aberrations of the optical system relating to the ninth example in a telephoto end state upon focusing on infinity, wherein FIG. 38A shows various aberrations, and FIG. 38B shows various aberration at the time when the correction of the image blur is performed by the lens element C'.

FIG. 39 is a view showing a configuration of an optical system relating to a tenth example according to the second embodiment of the present invention.

FIGS. 40A and 40B show diagrams of aberrations of the optical system relating to the tenth example in a wide angle end state upon focusing on infinity, wherein FIG. 40A shows various aberrations, and FIG. 40B shows various aberration at the time when a correction of an image blur is performed by a lens element A'.

FIGS. 41A and 41B show diagrams of aberrations of the optical system relating to the tenth example in an intermediate focal length state upon focusing on infinity, wherein FIG. 41A shows various aberrations, and FIG. 41B shows various aberration at the time when the correction of the image blur is performed by the lens element A'.

FIGS. 42A and 42B show diagrams of aberrations of the optical system relating to the tenth example in a telephoto end state upon focusing on infinity, wherein FIG. 42A shows various aberrations, and FIG. 42B shows various aberration at the time when the correction of the image blur is performed by the lens element B'.

FIG. 43 is a view showing a configuration of an optical system relating to an eleventh example according to the second embodiment of the present invention.

FIGS. 44A and 44B show diagrams of aberrations of the optical system relating to the eleventh example in a wide angle end state upon focusing on infinity, wherein FIG. 44A shows various aberrations, and FIG. 44B shows various aberration at the time when a correction of an image blur is performed by a lens element A'.

FIGS. 45A and 45B show diagrams of aberrations of the optical system relating to the eleventh example in an intermediate focal length state upon focusing on infinity, wherein FIG. 45A shows various aberrations, and FIG. 45B shows various aberration at the time when the correction of the image blur is performed by the lens element A'.

FIGS. 46A and 46B show diagrams of aberrations of the optical system relating to the eleventh example in a telephoto end state upon focusing on infinity, wherein FIG. 46A shows various aberrations, and FIG. 46B shows various aberration at the time when the correction of the image blur is performed by the lens element B'.

DESCRIPTION OF THE PREFERRED EMBODIMENTS

First Embodiment

An optical system and an imaging apparatus relating to the first embodiment according to the present invention are explained below.

At first, an optical system relating to the first embodiment according to the present invention is explained. The optical system relating to the first embodiment according to the present invention is an optical system which has a vibration reduction function.

The optical system relating to the first embodiment according to the present invention comprises a first lens element and a second lens element which can be respectively shifted such that a component in a direction perpendicular to the optical axis may be included, said second lens element being composed of said first lens element and other lens element. A correction of an image blur is carried out by shifting the first lens element or the second lens element such that a component in a direction perpendicular to the optical axis may be included.

Here, it is noted that the term "lens element" throughout the present specification means one unit that comprises a single lens or a plurality of lenses.

Figure 50:
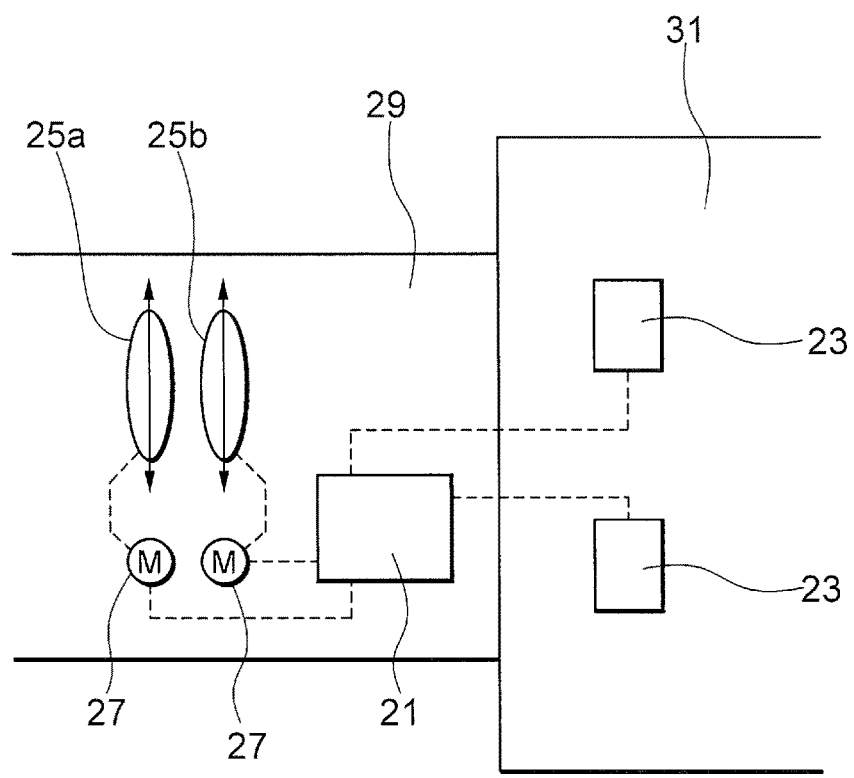
FIG. 50 is a schematic view showing an example of a configuration of a vibration reduction function in an optical system relating to the present invention.

A control section determines which one of the first lens element and the second lens element is shifted, based on an amount of the image blur detected by an angular velocity sensor or the like provided in an imaging apparatus. FIG. 50 shows a schematic view illustrating an example of a configuration on a vibration reduction function in the optical system according to the present invention. The control section 21 calculates a correcting amount of the image blur, based on angular velocity, that is, magnitude and orientation of inclination of an imaging apparatus body 31, detected by a plurality of angular velocity sensors 23, 23 and determined which of the lens element 25a or 25b is shifted. By the control section 21, a drive device 27 such as a motor drives the determined lens element (for example, lens element 25a)

in a direction in which the inclination of the imaging apparatus body 31 is eliminated. Incidentally, the control section 21 may be provided in the imaging apparatus body 31, or may be built in a lens barrel 29 in which the optical system is disposed.

By such a configuration, the optical system relating to the first embodiment according to the present invention can have, as an effect, a function of a plurality of image plane corrections, and an optical system having a suitable vibration reduction functions may be realized.

By such a configuration according to the present invention, an optical system having more suitable vibration reduction function may be realized.

The optical system relating to the first embodiment of the present application comprises the first lens element and the second lens element which can be respectively shifted such that a component in a direction perpendicular to the optical axis may be included, in which the first lens element and said other lens element in the second lens element have refractive powers of the same sign, and a correction of an image plane is conducted to effect a correction of an image blur by shifting the first lens element or the second lens element such that a component in a direction perpendicular to the optical axis may be included.

By such a configuration, an optical system having more suitable vibration reduction function may be realized.

Further, the optical system having further more suitable vibration reduction function may be realized by satisfying the following conditional expression (1).

$$|fB| < |fA| \tag{1}$$

where $|fA|$ denotes an absolute value of a focal length of the first lens element, $|fB|$ denotes an absolute value of a focal length of the second lens element, and fA and fB have the same sign.

With satisfying the conditional expression (1), when the sign of a focal length fA of the first lens element is the same as that of a focal length fB of the second lens element, a larger moving amount of the image plane may be attained by shifting the second lens element than by shifting the first lens element, even if the moving amount of the second lens element and the moving amount of the first lens element are the same, since the absolute value of the focal length fB is smaller than the absolute value of the focal length fA of the first lens element. Thus, shifting the second lens element can make more correction of the image blur than shifting the first lens element without increasing a lens moving amount, and can perform superb correction of large curvature of field.

Further, it is preferable that the optical system relating to the first embodiment according to the present invention satisfies the following conditional expression (2):

$$0.24 < |fB|/|fA| < 1.00 \tag{2}$$

where $|fA|$ denotes an absolute value of a focal length of the first lens element, $|fB|$ denotes an absolute value of a focal length of the second lens element, and fA and fB have the same sign, The conditional expression (2) defines a focal length of the first lens element and a focal length of the second lens element which are for correcting the image plane. With satisfying the conditional expression (2), a superb optical performance may be realized even upon correcting the image plane, when the focal length fA of the first lens element and the focal length fB of the second lens element have the same sign.

When the value $|fB|/|fA|$ for the conditional expression (2) falls below the lower limit, it becomes hard to correct coma upon correcting the image plane, so that it is not desirable, in order to secure the effect of the present invention, it is preferable to set the lower limit of the conditional expression (2) to 0.30.

When the value $|fB|/|fA|$ for the conditional expression (2) exceeds the upper limit, a focal length of the first lens element and a focal length of the second lens element which are for conducting correction of the image plane become close to each other, so that the effect for performing a plurality of the image plane correcting functions cannot be attained. This is undesirable. In order to secure the effect of the present invention, it is preferable to set the upper limit of the conditional expression (2) to 0.96.

Further, it is preferable that the optical system relating to the first embodiment according to the present invention further comprises a third lens element that is shiftable to have a component in a direction perpendicular to the optical axis, the third lens element being composed of the second lens element and other lens element having refractive power of the same sign as that of refractive power of the second lens element, and correction of the image blur being performed by shifting any one lens element among the first lens element, the second lens element and the third lens element to have a component in a direction perpendicular to the optical axis. Such a configuration makes it possible to realize an optical system having more suitable vibration reduction function.

Furthermore, it is preferable to satisfy the following conditional expression (3):

$$|fC| < |fB| < |fA| \tag{3}$$

where $|fA|$ denotes an absolute value of a focal length of the first lens element, $|fB|$ denotes an absolute value of a focal length of the second lens element, $|fC|$ denotes an absolute value of a focal length of the third lens element, and fA, fB and fC have the same sign.

By such a configuration, the optical system relating to the first embodiment according to the present invention can realize an optical system having more suitable vibration reduction function.

A control section determines which one of the first lens element, the second lens element and the third lens element is shifted, based on an amount of an image blur detected by an angular velocity sensor or the like, in the same manner as described hereinbefore with reference to FIG. 50.

By such a configuration according to the present invention, an optical system having more suitable vibration reduction function may be realized with satisfying the conditional expression (3).

With satisfying the conditional expression (3), when a focal length fA of the first lens element, a focal length fB of the second lens element and a focal length fC of the third lens element have the same sign, a larger amount of the image plane movement may be attained by shifting the third lens element, even if the amount of movement of the third lens element and the amount of movement of the second lens element are the same, since the absolute value of the focal length fC of the third lens element is smaller than the absolute value of the focal length fB of the second lens element. As a result, shifting the third lens element can make more correction of an image blur than shifting the second lens element without increasing an amount of lens movement, and can perform superb correction of large curvature of field.

Further, it is preferable that the optical system of the first embodiment according to the present intention satisfies the following conditional expression (4):

$$0.24 < |fC|/|fA| < 1.00 \tag{4}$$

where |fA| denotes an absolute value of a focal length of the first lens element,

|fC| denotes an absolute value of a focal length of the third lens element, and fA and fC have the same sign.

The conditional expression (4) defines a focal length of the first lens element and a focal length of the third lens element which are for correcting the image plane. With satisfying the conditional expression (4), a superb optical performance may be realized even upon correcting the image plane.

When the value |fC|/|fA| for the conditional expression (4) falls below the lower limit, it becomes hard to correct coma upon correcting the image plane, so that it is not desirable. In order to secure the effect of the present invention, it is preferable to set the lower limit value of the conditional expression (4) to 0.30.

When the value |fC|/|fA| for the conditional expression (4) exceeds the upper limit value, a focal length of the first lens element, a focal length of the second lens element and a focal length of the third lens element which are respectively for conducting the correction of the image plane become close to each other, so that the effect for performing a plurality of the image plane correcting functions cannot be attained. This is undesirable. In order to secure the effect of the present invention, it is preferable to set the upper limit value for the conditional expression (4) to 0.96.

Further, it is preferable that, in the optical system according to the first embodiment of the present invention, the first and the second lens elements each comprises a cemented lens. Such a configuration makes it possible to maintain a superb chromatic aberration of magnification upon correcting the image plane.

Further, it is preferable that, in the optical system of the present invention, the third lens element comprises a cemented lens. Such a configuration makes it possible to maintain a superb chromatic aberration of magnification upon correcting the image plane.

Further, it is preferable that the optical system according to the first embodiment of the present invention comprises at least four lens elements, in which at least the first and the second lens elements are included in any one lens group among the four lens groups. Such a configuration makes coma upon correcting the image plane small.

Further, it is preferable that the optical system according to the first embodiment of the present invention comprises, in order from an object side, a first lens group, a second lens group, a third lens group and a fourth lens group, wherein, upon zooming, a distance between the first lens element and the second lens element, a distance between the second lens element and the third lens element and a distance between the third lens element and the fourth lens element, are varied. Such a configuration makes it possible to realize a high zooming ratio and attain a superb correction of spherical aberration.

Further, the optical system relating to the first embodiment according to the present invention further may comprise a first lens element and a second lens element which can be respectively shifted to include a component in a direction perpendicular to the optical axis, in which the first lens element and said other lens element in the second lens element have refractive powers of the different sign, and correction of the image plane is conducted to effect a correction of an image blur by shifting the first lens element or the second lens element to have a component in a direction perpendicular to the optical axis.

By such a configuration, an optical system having more suitable vibration reduction function may be realized.

Further, an optical system having further more suitable vibration reduction function may be realized by satisfying the following conditional expression (5).

$$|fA| < |fB| \tag{5}$$

where |fA| denotes an absolute value of a focal length of the first lens element,

|fB| denotes an absolute value of a focal length of the second lens element, and fA and fB have different signs.

A control section determines which one of the first lens element and the second lens element is shifted, based on an amount of an image blur detected by an angular velocity sensor or the like, in the same manner as described hereinbefore with reference to FIG. 50.

By such a configuration, an optical system relating to the first embodiment according to the present invention can have, as an effect, a plurality of image plane correcting functions, and an optical system having suitable vibration reduction functions may be provided.

By such a configuration according to the first embodiment of the present invention, an optical system having more suitable vibration reduction functions may be realized with satisfying the conditional expression (5).

With satisfying the conditional expression (5), when signs of fA and fB are different from each other, a larger moving amount of the image plane may be attained by shifting the first lens element, even if the moving amount of the first lens element and the moving amount of the second lens element are the same, since the absolute value of the focal length fA of the first lens element is smaller than the absolute value of the focal length fB of the second lens element. As a result, shifting the first lens element can make more correction of an image blur than shifting the second lens element without increasing an amount of lens movement, and can perform a superb correction of large curvature of field.

Further, it is preferable that the optical system relating to the first embodiment of the present application satisfies the following conditional expression (6).

$$0.24 < |fA|/|fB| < 1.00 \tag{6}$$

where |fA| denotes an absolute value of a focal length of the first lens element,

|fB| denotes an absolute value of a focal length of the second lens element, and fA and fB have the different signs.

The conditional expression (6) defines a focal length of the first lens element and a focal length of the second lens element which are for correcting the image plane. With satisfying the conditional expression (6), a superb optical performance may be realized even upon correcting the image plane, when fA and fB have the different signs.

When the value |fA|/|fB| for the conditional expression (6) falls below the lower limit value, it becomes hard to correct coma upon correcting the image plane, so that it is not desirable. In order to secure the effect of the present invention, it is preferable to set the lower limit value for the conditional expression (6) to 0.30.

When the value |fA|/|fB| for the conditional expression (6) exceeds the upper limit value, a focal length of the first lens element and a focal length of the second lens element which are for conducting correction of the image plane become close to each other, so that the effect for performing a plurality of the image plane correcting functions cannot be attained. This is undesirable. In order to secure the effect of the present invention, it is preferable to set the upper limit value for the conditional expression (6) to 0.96.

Further, it is preferable that, in the optical system according to the first embodiment of the present invention, the first and the second lens elements comprise a cemented lens. Such a configuration makes it possible to maintain a superb chromatic aberration of magnification upon correcting the image plane.

Further, it is preferable that the optical system according to the first embodiment of the present invention comprises at least four lens groups, and in which the first and the second lens elements are included in any one lens group among the four lens groups. Such a configuration makes coma upon correcting the image plane small.

Further, it is preferable that the optical system according to the first embodiment of the present invention comprises, in order from an object side, a first lens group, a second lens group, a third lens group and a fourth lens group, wherein, upon zooming, a distance between the first lens element and the second lens element, a distance between the second lens element and the third lens element and a distance between the third lens element and the fourth lens element, are varied. Such a configuration makes it possible to realize high zooming ratio and attain a superb correction of spherical aberration.

Further, an imaging apparatus of the first embodiment according to the present invention is characterized in being equipped with the optical system having a configuration described above, whereby a suitable imaging apparatus may be realized.

Figure 25:
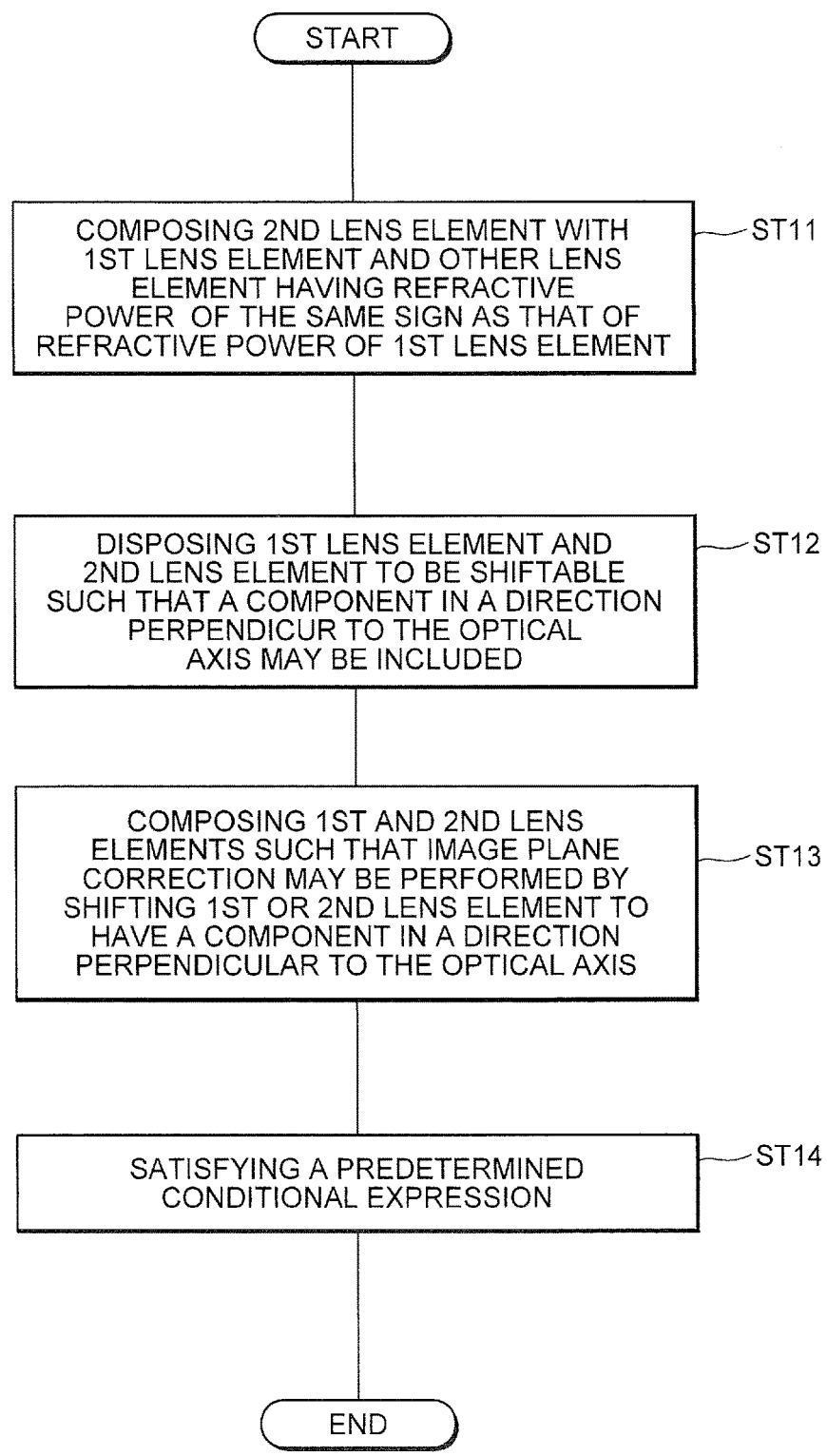
FIG. 25 is a view showing schematically a method for manufacturing an optical system relating to the first embodiment of the present invention.
Figure 26:
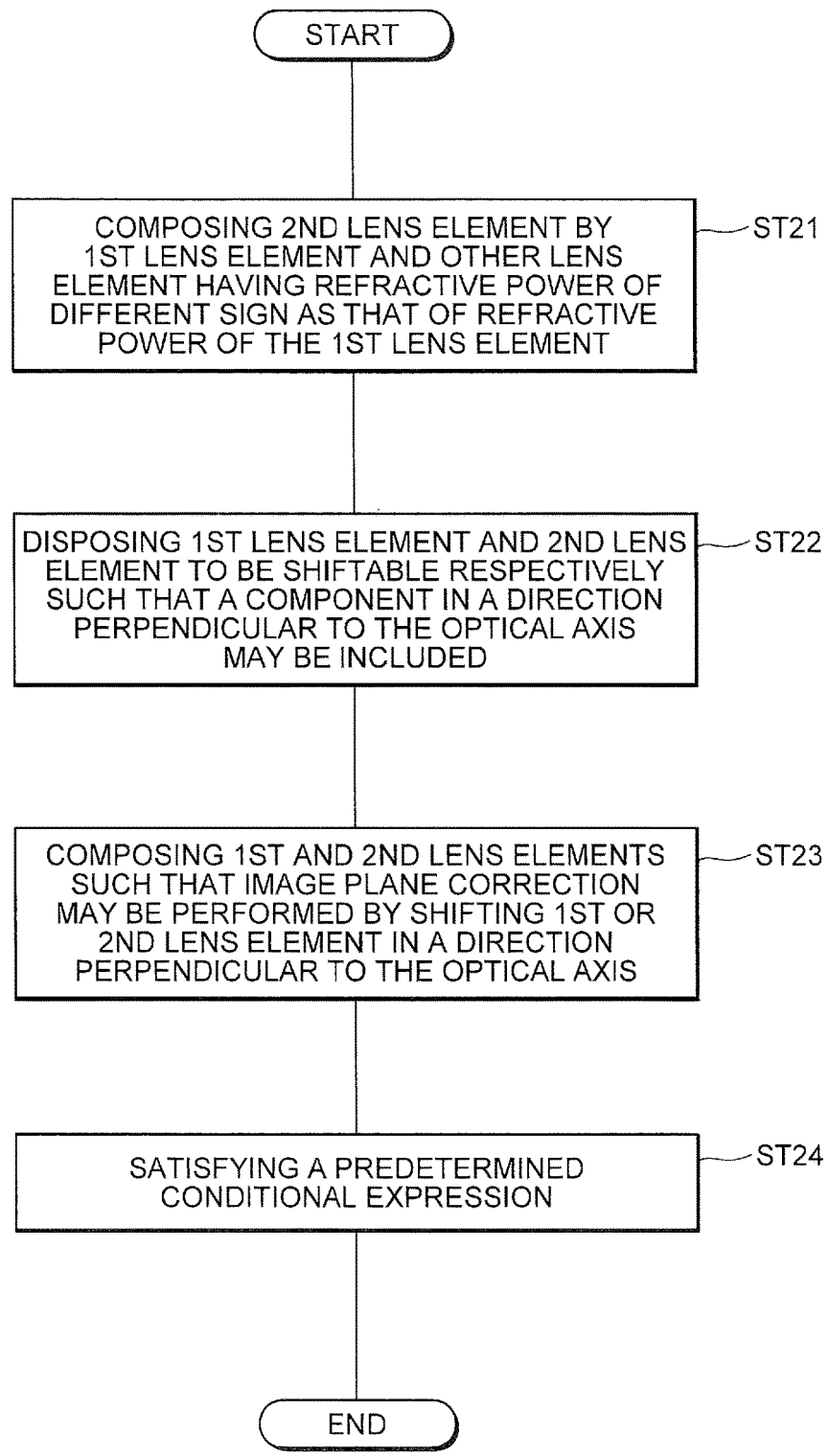
FIG. 26 is a view showing schematically a method for manufacturing an optical system relating to the first embodiment of the present invention.

Next, a method for manufacturing an optical system according to the first embodiment of the present invention, is explained. FIGS. 25 and 26 are views schematically showing respectively methods for manufacturing the optical systems according to the first embodiment of the present invention.

The method for manufacturing an optical system according to the first embodiment of the present invention is for manufacturing an optical system comprising a first lens element and a second lens element, as shown in FIG. 25 and comprises the following steps ST11 to ST14:

(Step ST11): Composing said second lens element with said first lens element and other lens element having refractive power of the same sign as that of refractive power of said first lens element.

(Step ST12): Disposing said first lens element and said second lens element to be shiftable respectively such that a component in a direction perpendicular to the optical axis may be included.

(Step ST13): Composing the respective lens elements such that a correction of the image plane may be performed by shifting either said first lens element or said second lens element to have a component in a direction perpendicular to the optical or axis.

(Step ST14): Arranging such that the following conditional expression (1) may be satisfied:

$$|fB|<|fA| \quad (1)$$

where |fA| denotes an absolute value of a focal length of the first lens element,

|fB| denotes an absolute value of a focal length of the second lens element, and fA and fB have the same sign.

Further, a method for manufacturing an optical system according to the first embodiment of the present invention is for manufacturing an optical system comprising a first lens element and a second lens element, as shown in FIG. 26 and comprises the following steps ST21 to ST24:

(Step ST21): Composing said second lens element with said first lens element and other lens element having refractive power of a different sign from that of refractive power of said first lens element.

(Step ST22): Disposing each lens element such that said first lens element and said second lens element may be able to be shifted respectively to have a component in a direction perpendicular to the optical axis.

(Step ST23): Composing each lens element such that a correction of the image plane may be performed by shifting either said first lens element or said second lens element to have a component in a direction perpendicular to the optical axis.

(Step ST24): Arranging such that the following conditional expression (5) may be satisfied:

$$|fA|<|fB| \quad (5)$$

where |fA| denotes an absolute value of a focal length of the first lens element,

|fB| denotes an absolute value of a focal length of the second lens element, and fA and fB have the different signs.

According to the methods for manufacturing an optical system according to the first embodiment of the present invention, as described above, it is possible to manufacture an optical system with a suitable vibration reduction function.

Numerical Examples

Next, optical systems relating to numerical examples according to the first embodiment of the present invention are explained with reference to the accompanying drawings. FIG. 1, FIG. 5, FIG. 9, FIG. 13, FIG. 17 and FIG. 21 show respectively cross sections of configurations of optical systems S1 to S6 relating to the respective examples, in which arrows show variations in focusing states from wide angle end states to telephoto end states upon focusing on infinity of these optical systems S1 to S6.

First Example

Figure 1:
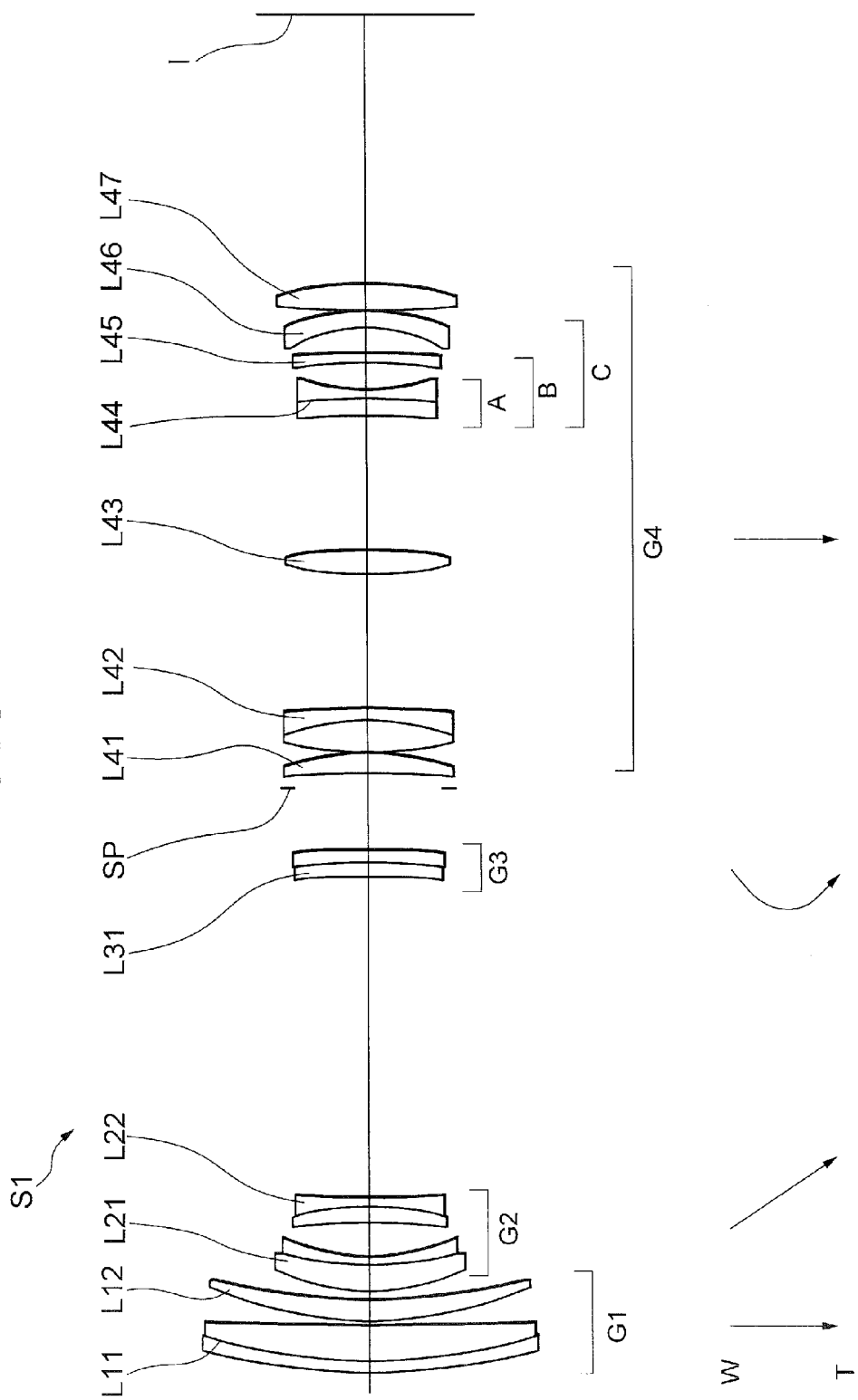
FIG. 1 is a view showing a configuration of an optical system relating to a first example according to a first embodiment of the present invention.

FIG. 1 shows a configuration of an optical system S1 relating to the first Example according to the first embodiment of the present invention.

As shown in FIG. 1, the optical system S1 relating to the first Example is composed of, in order from an unillustrated object side, a first lens group G1 having positive refractive power, a second lens group G2 having negative refractive power, a third lens group G3 having negative refractive power, an aperture stop SP and a fourth lens group G4 having positive refractive power.

The first lens group G1 is composed of, in order from the object side, a cemented lens L11 constructed by a negative meniscus lens having a convex surface facing the object cemented with a positive meniscus lens having a convex surface facing the object, and a positive meniscus lens L12 having a convex surface facing the object side.

The second lens group G2 is composed of, in order from the object side, a cemented lens L21 constructed by a positive meniscus lens having a convex surface facing the object side cemented with a negative meniscus lens having a convex surface facing the object side, and a cemented lens L22 constructed by a positive meniscus lens having a concave surface facing the object side cemented with a double concave negative lens.

The third lens group G3 is composed of a cemented lens L31 constructed, in order from the object side, by a positive meniscus lens having a concave surface facing the object side cemented with a negative meniscus lens having concave surface facing the object side.

The fourth lens group G4 is composed of, in order from the object side, a positive meniscus lens L41 having a concave surface facing the object side, a cemented lens L42 constructed by a double convex positive lens cemented with a negative meniscus lens having a convex surface facing the image plane I side, a double convex positive lens L43, a cemented lens L44 constructed by a positive meniscus lens having a concave surface facing the object side cemented with a double concave negative lens, a negative meniscus lens L45 having a concave surface facing the object side, a negative meniscus lens L46 having a concave surface facing the object side, and a double convex positive lens L47.

An imaging device (not shown) constructed by CCD, CMOS or the like is disposed on the image plane I. The aperture stop SP is disposed between the third lens group G3 and the fourth lens group G4. The arrangement of the imaging device and the aperture stop SP is the same in the respective Examples described hereinafter.

In the optical system S1 relating to the first Example, upon zooming from a wide angle end state to a telephoto end state, the first lens group G1 is fixed with respect to the image plane I, the second lens group G2 is moved to the image plane I side, the third lens group G3 is moved to the image plane I side with a substantially concave trajectory, and the fourth lens group G4 is fixed with respect to the image plane I.

Further, the optical system S1 relating to the first Example is so configured that, as shown in FIG. 1, the cemented lens L44 in the fourth lens group G4 is made as a lens element A, a lens element B is composed of the lens element A and the negative meniscus lens L45 having refractive power of the same sign as that of refractive power of the lens element A, a lens element C is composed of the lens element B and the negative meniscus lens L46 having refractive power of the same sign as that of refractive power of the lens element B, and vibration reduction lens groups are made, respectively, by these lens element A, lens element B and lens element C. Image blur is prevented by shifting any one of those vibration reduction lens groups in a direction perpendicular to the optical axis.

In the optical system S1 relating to the first Example 1, a lens group for correcting image blur may be shifted by (f·tan θ)/K in a direction perpendicular to the optical axis in order to correct rotational shake of an angle θ, where f denotes a focal length of the entire optical system S1, and K denotes a ratio of a moving amount of an image on the image plane I with respect to a moving amount of the vibration reduction lens group upon correcting the image blur (herein after, this ratio is called as vibration reduction coefficient K).

In the optical system S1 relating to the first Example 1, focal lengths of the entire system in an wide angle end state, in an intermediate focal length state and in a telephoto end state are, respectively, 95.0 mm, 163.1 mm, and 226.6 mm (refer to Table 1 below). Correcting amounts of image blurs by the lens elements A, B, and C in the respective focal lengths and moving amounts of the respective lens elements A, B and C are, as follows:

In the wide angle end state of the optical system S1 relating to the first Example, in the case of the lens element A, the vibration reduction coefficient K upon correcting the image blur is 1.26 and the focal length is 95.0 mm, so the moving amount of the lens element A for correcting rotational shake of 0.324° is 0.428 mm; in the case of the lens element B, the vibration reduction coefficient K upon correcting the image blur is 1.37 and the focal length is 95.0 mm, so the moving amount of the lens element B for correcting rotational shake of 0.354° is 0.428 mm; and in the case of the lens element C, the vibration reduction coefficient K upon correcting the image blur is 1.69 and the focal length is 95.0 mm, so the moving amount of the lens element C for correcting rotational shake of 0.435° is 0.428 mm.

Further, in the intermediate focal length state of the optical system S1 relating to the first Example, in the case of the lens element A, the vibration reduction coefficient K upon correcting the image blur is 1.26 and the focal length is 163.1 mm, so the moving amount of the lens element A for correcting rotational shake of 0.301° is 0.680 mm; in the case of the lens element B, the vibration reduction coefficient K upon correcting the image blur is 1.37 and the focal length is 163.1 mm, so the moving amount of the lens element B for correcting rotational shake of 0.326° is 0.680 mm; and in the case of the lens element C, the vibration reduction coefficient K is 1.69 and the focal length is 163.1 mm, so the moving amount of the lens element C for correcting rotational shake of 0.403° is 0.680 mm.

Further, in the telephoto end state of the optical system S1 relating to the first Example, in the case of the lens element A, the vibration reduction coefficient K upon correcting the image blur is 1.26 and the focal length is 226.6 mm, so the moving amount of the lens element A for correcting rotational shake of 0.210° is 0.944 mm; in the case of the lens element B, the vibration reduction coefficient K upon correcting the image blur is 1.37 and the focal length is 226.6 mm, so the moving amount of the lens element B for correcting rotational shake of 0.326° is 0.944 mm; and in the case of the lens element C, the vibration reduction coefficient K upon correcting the image blur is 1.69 and the focal length is 226.6 mm, so the moving amount of the lens element C for correcting rotational shake of 0.403° is 0.944 mm.

As described above, in the respective focal lengths, the vibration reduction coefficients K of the lens elements A, the lens elements B and the lens elements C become larger in this order, so more corrections become possible. In other words, if the focal lengths are the same and the moving amounts are the same, correcting amount by the lens element B is more than that by the lens element A, and correcting amount by the lens element C is more than that by the lens element B. Accordingly, control is made such that when correcting amount is small, the lens element A is driven; when correcting amount increases and reaches a predetermined value, the lens element B is driven; and when correcting amount increases further and reaches another predetermined value that is larger than said predetermined value, the lens element C is driven. Such a control makes it possible to conduct more corrections without increasing the moving amount of the vibration reduction lens even if correcting amount becomes larger. As a result, it becomes possible to make the shifting amount proper without shifting largely the vibration lens group from the wide angle end state to the telephoto end state.

Various values associated with the optical system S1 relating to the first Example of the first embodiment according to the present invention are listed in Table 1 below.

In [Entire Specifications] in Table 1, f denotes a focal length, FNO denotes an f number, TL denotes a total length, W denotes a wide angle end state, M denotes an intermediate focal length state, and T denotes a telephoto end state.

In [Lens Data], the lens surface number "m" shows order of lens surface counted from the object side, "r" shows a radius of curvature of the lens surface, "d" shows a distance to the next surface, "nd" shows a refractive index of a material at d-line (wavelength λ=587.6 nm), and "vd" shows an Abbe number of the material at d-line (wavelength λ=587.6 nm). "Object Surface Op" shows the object surface, (Stop) shows an aperture stop SP, and "I" shows the image plane I. Incidentally, curvature radius r=∞ shows a plane surface, and refractive index of air d=1. 00000 is omitted. An aspherical surface is expressed by attaching "*" to the surface number, and in the column "r" of radius of curvature shows paraxial radius of curvature.

In [Aspherical Data], with respect to an aspherical surface shown in (Surface Data), paraxial radius of curvature "r", conical coefficient "K" and aspherical surface coefficients A4 to A12 are shown in the case where the contour of the aspherical surface is exhibited by the following expression:

$$x=(h^2/r)/[1+[1-\kappa(h/r)^2]^{1/2}]+A4 \times h^4+A6 \times h^6+A8 \times h^8+A10 \times h^{10}+A12 \times h^{12}$$

where x denotes a distance in the direction of the optical axis at a height h from the optical axis with the vertex of the surface being made as a reference, "E-n" denotes "×10$^{-n}$", for example, "1.234E-05" denotes "1.234×10$^{-5}$".

In [Variable Distances], a focal length f and a value of variable distance are shown.

In [values for Conditional Expressions], values corresponding to respective conditional expressions are shown.

In the tables for various values, "mm" is generally used for the unit of length such as the focal length "f", the radius of curvature "r" and others. However, since similar optical performance can be obtained by an optical system proportionally enlarged or reduced its dimension, the unit is not necessarily to be limited to "mm".

The reference symbols used in Table 1 are the same in the other Examples described later.

TABLE 1

First Example (Entire Specification)

|  | W | M | T |
|---|---|---|---|
| f = | 95.0 | 163.1 | 226.6 |
| FNO = | 4.68 | 4.68 | 4.70 |
| TL = | 259.3 | 259.3 | 259.3 |

(Surface Data)

| m | r | d | vd | nd |
|---|---|---|---|---|
| op | ∞ |  |  |  |
| 1) | 134.560 | 1.8 | 25.43 | 1.80518 |
| 2) | 101.277 | 7.0 | 82.51 | 1.49782 |
| 3) | 546.812 | 1.0 |  |  |
| 4) | 77.194 | 4.0 | 82.51 | 1.49782 |
| 5) | 124.044 | D5 |  |  |
| 6) | 40.981 | 5.0 | 25.68 | 1.78472 |
| 7) | 59.996 | 1.5 | 40.77 | 1.88300 |
| 8) | 36.961 | 6.7 |  |  |
| 9) | −131.117 | 3.4 | 25.43 | 1.80518 |

TABLE 1-continued

First Example

| 10) | −53.784 | 1.5 | 40.77 | 1.88300 |
|---|---|---|---|---|
| 11) | 197.416 | D11 |  |  |
| 12) | −172.226 | 3.0 | 27.51 | 1.75520 |
| 13) | −80.000 | 2.0 | 43.69 | 1.72000 |
| 14) | −364.448 | D14 |  |  |
| 15> | ∞ | 3.0 |  | Aperture Stop |
| 16) | −636.174 | 4.0 | 82.51 | 1.49782 |
| 17) | −57.515 | 0.3 |  |  |
| 18) | 84.998 | 6.0 | 70.45 | 1.48749 |
| 19) | −47.705 | 2.0 | 35.04 | 1.74950 |
| 20) | −289.998 | 25.9 |  |  |
| 21) | 70.499 | 4.6 | 82.56 | 1.49782 |
| 22) | −117.909 | 25.9 |  |  |
| 23) | −188.780 | 3.5 | 28.46 | 1.72825 |
| 24) | −111.267 | 1.5 | 47.38 | 1.78800 |
| 25) | 46.602 | 5.0 |  |  |
| 26) | −119.084 | 2.0 | 58.89 | 1.51823 |
| 27) | −220.000 | 5.0 |  |  |
| 28) | −30.419 | 3.0 | 64.12 | 1.51680 |
| 29) | −48.713 | 0.2 |  |  |
| 30) | 228.879 | 5.0 | 44.79 | 1.74400 |
| 31) | −64.531 | BF |  |  |
| I | ∞ |  |  |  |

(Variable Distance Data)

|  | W | M | T |
|---|---|---|---|
| D5 | 1.6 | 46.7 | 68.9 |
| D11 | 61.4 | 2.5 | 3.4 |
| D14 | 11.8 | 25.7 | 2.7 |
| BF | 50.6 | 50.6 | 50.6 |

(Values for Conditional Expressions)

fA = −46.5
fB = −42.3
fC = −32.5
(1) |fB| < |fA|: 42.3 < 46.5
(2) |fB|/|fA| = 0.91
(3) |fC| < |fB| < |fA|: 32.5 < 42.3 < 46.5
(4) |fC|/|fA| = 0.70

Figure 2A:
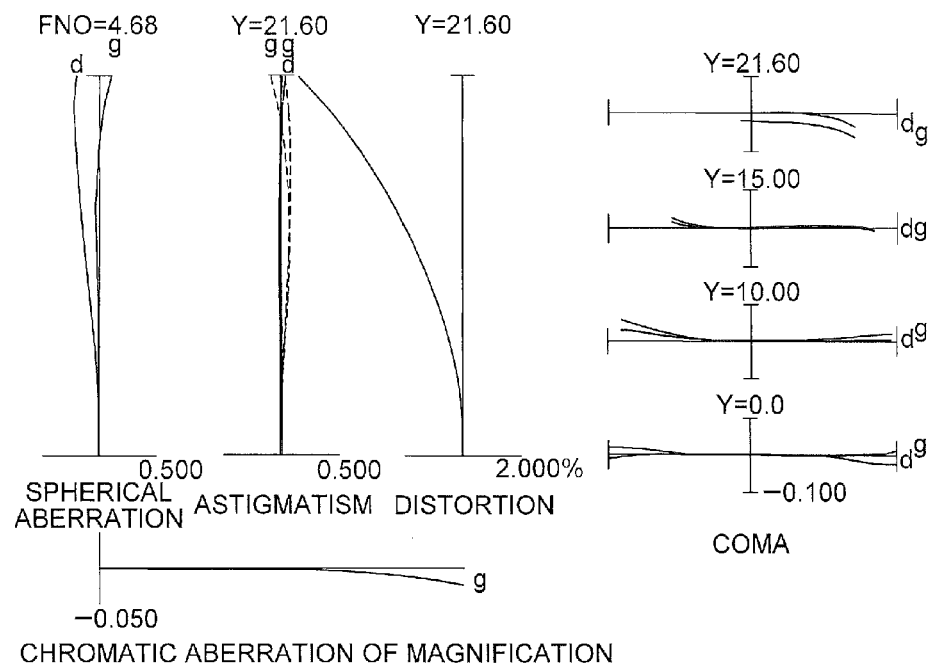
Figures 2B, 2C, 2D:
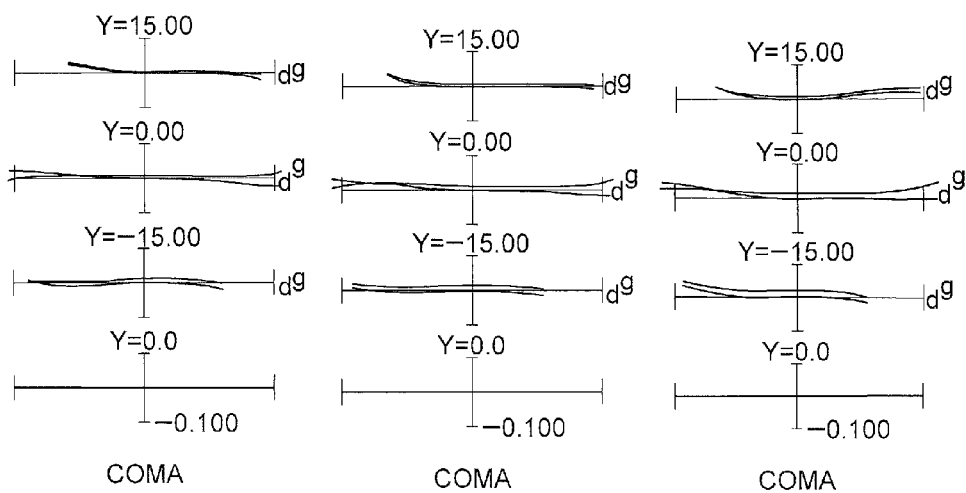

FIGS. 2A, 2B, 2C and 2D are graphs showing various aberrations of the optical system according to the first Example in the wide-angle end state upon focusing on infinity, in which FIG. 2A shows various aberrations, FIG. 2B shows meridional transverse aberration upon performing a correction of an image blur with using the lens element A, FIG. 2C shows meridional transverse aberration upon performing the correction of the image blur with using the lens element B and FIG. 2D shows meridional transverse aberration upon performing the correction of the image blur with using the lens element C.

Figure 3A:
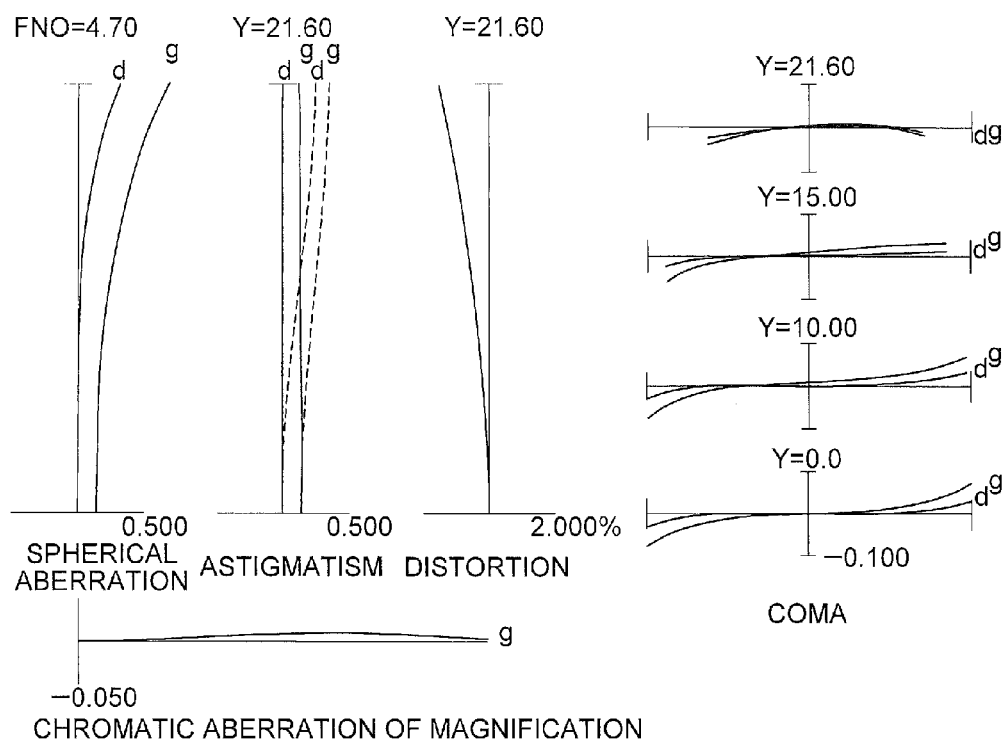
Figure 3B:
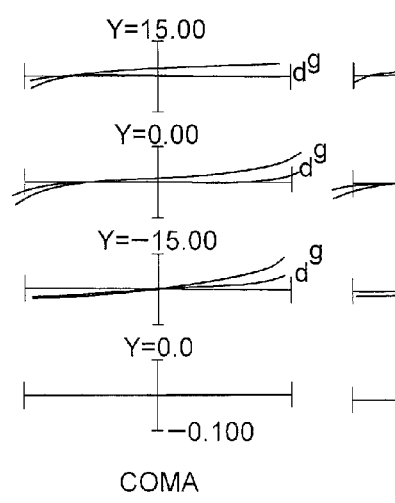
Figure 3C:
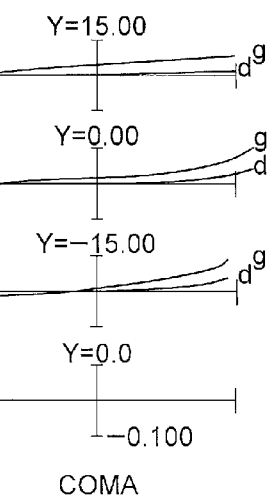
Figure 3D:
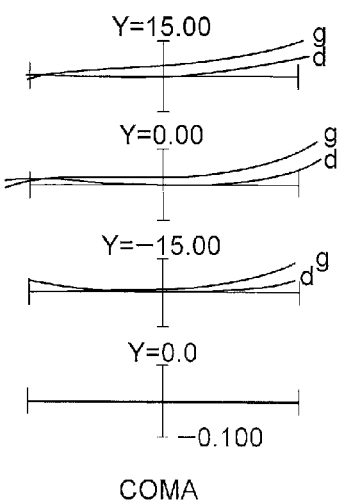

FIGS. 3A, 3B, 3C and 3D are graphs showing various aberrations of the optical system according to the first Example in the intermediate focal length state upon focusing on infinity, in which FIG. 3A shows various aberrations, FIG. 3B shows meridional transverse aberration upon performing the correction of the image blur with using the lens element A, FIG. 3C shows meridional transverse aberration upon performing the correction of the image blur with using the lens element B and FIG. 3D shows meridional transverse aberration upon performing the correction of the image blur with using the lens element C.

Figure 4A:
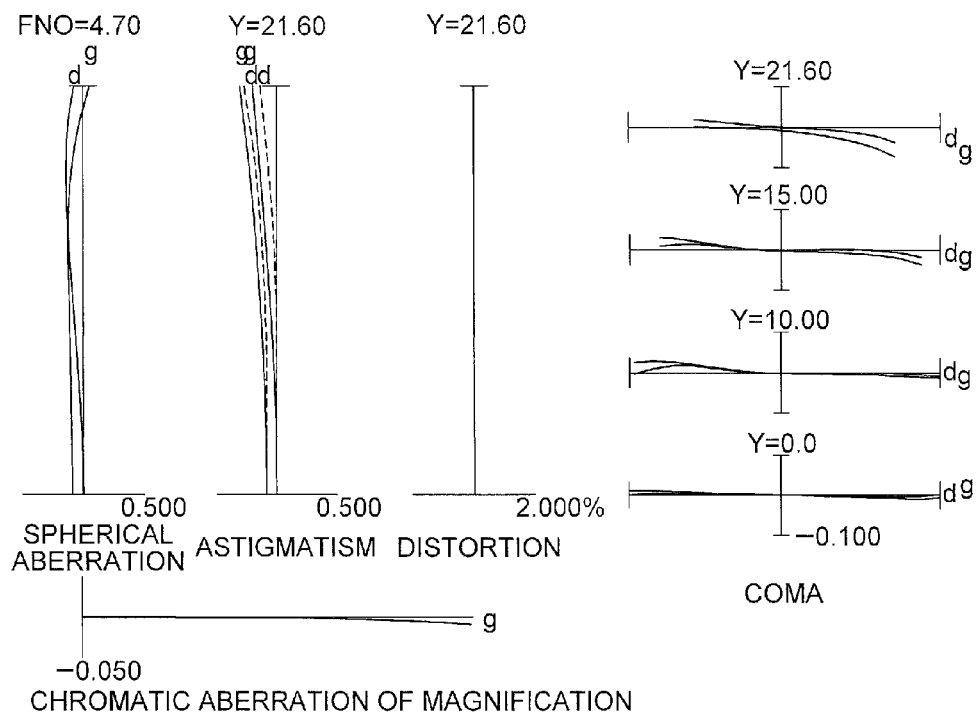
Figure 4B:
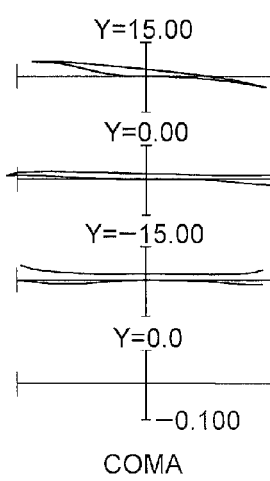
Figure 4C:
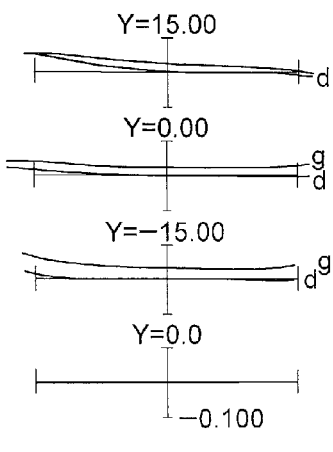

FIGS. 4A, 4B, 4C and 4D are graphs showing various aberrations of the optical system according to the first Example in the telephoto end state upon focusing on infinity, in which FIG. 4A shows various aberrations, FIG. 4B shows meridional transverse aberration upon performing the correction of the image blur with using the lens element A, FIG.

Figure 4D:
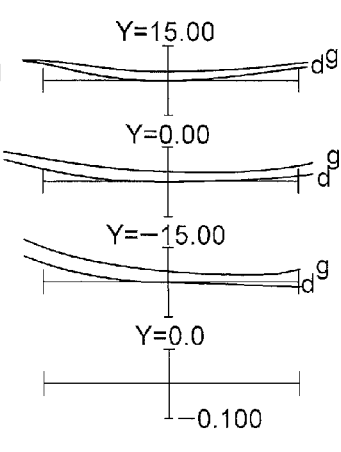

4C shows meridional transverse aberration upon performing the correction of the image blur with using the lens element B and FIG. 4D shows meridional transverse aberration upon performing the correction of the image blur with using the lens element C.

In respective graphs showing aberrations, FNO denotes an f-number, Y denotes an image height. In respective graphs, d denotes aberration curve at d-line (wavelength $\lambda$=587.6 nm), and g denotes aberration curve at g-line (wavelength $\lambda$=435.8 nm). In graphs showing astigmatism, a solid line indicates a sagittal image plane, and a broken line indicates a meridional image plane.

The above-described explanation regarding various aberration graphs is the same as the other Examples.

As is apparent from the respective graphs, it is understood that according to Example 1, a superb optical performance as a result of good corrections to various aberrations from the wide-angle end state to the telephoto end state.

Second Example

FIG. 5 shows a configuration of an optical system S2 relating to the second Example according to the first embodiment of the present invention.

As shown in FIG. 5, the optical system S2 relating to the second Example is composed of, in order from an unillustrated object side, a first lens group G1 having negative refractive power, a second lens group G2 having positive refractive power, an aperture stop SP, a third lens group G3 having negative refractive power, and a fourth lens group G4 having positive refractive power.

The first lens group G1 is composed of, in order from the object side, a negative meniscus lens L11 having a convex surface facing the object side, a double concave negative lens L12, and a positive meniscus lens L13 having a convex surface facing the object side, the most object side negative meniscus lens L11 being an aspherical lens in which an aspherical surface is formed by a layer provided on the glass lens surface at the image plane I side.

The second lens group G2 is composed of, in order from the object side, a cemented lens L21 constructed by a negative meniscus lens having a convex surface facing the object side cemented with a double convex positive lens, and a positive meniscus lens L22 having a convex surface facing the object side.

The third lens group G3 is composed of, in order from the object side, a cemented lens L31 constructed by a positive meniscus lens having a concave surface facing the object side cemented with a double concave negative lens, and a plano-concave lens L32 having concave surface facing the object side.

The fourth lens group G4 is composed of, in order from the object side, a plano-convex lens L41 having a plane surface facing the object side, and a cemented lens L42 constructed by a double convex positive lens cemented with a negative meniscus lens having a convex surface facing the image plane I side.

An imaging device (not shown) constructed by CCD, CMOS or the like is disposed on the image plane I. The aperture stop SP is disposed between the second lens group G2 and the third lens group G3, and is moved together with the third lens group G3 upon zooming from a wide angle end state to a telephoto end state.

In the optical system S2 relating to the second Example, upon zooming from the wide angle end state to the telephoto end state, the first lens group G1 is moved to the image plane I side, the second lens group G2 and the fourth lens group G4 are moved in a body to the object side, and the third lens group G3 is moved to the object side.

Further, the optical system S2 relating to the second Example is so configured that the cemented lens L31 in the third lens group G3 is made as a lens element A, a lens element B is composed of the lens element A and the plano-concave lens L32 having refractive power of the same sign as that of refractive power of the lens element A, and vibration reduction lens groups are made by the lens element A and the lens element B, respectively. Image blur is prevented by shifting either one of those vibration reduction lens groups in a direction perpendicular to the optical axis.

In the optical system S2 relating to the second Example, the lens group for correcting image blur may be shifted by ($f \cdot \tan \theta$)/K in a direction perpendicular to the optical axis in order to correct rotational shake of an angle $\theta$, where f denotes a focal length of the entire optical system S2, and K denotes a vibration reduction coefficient upon correcting the image blur.

In the optical system S2 relating to the second Example, focal lengths f of the entire system in the wide angle end state, in the intermediate focal length state and in the telephoto end state are, respectively, 18.5 mm, 35.0 mm, and 53.5 mm (refer to Table 2 below). Correcting amounts of image blurs by the lens elements A and B in the respective focal lengths and moving amounts of the respective lens elements A and B are, as below, for example:

In the wide angle end state of the optical system S2 relating to the second Example, in the case of the lens element A, the vibration reduction coefficient K upon correcting the image blur is 1.04 and the focal length is 18.5 mm, so the moving amount of the lens element A for correcting rotational shake of 0.735° is 0.227 mm; and in the case of the lens element B, the vibration reduction coefficient K upon correcting the image blur is 1.39 and the focal length is 18.5 mm, so the moving amount of the lens element B for correcting rotational shake of 0.927° is 0.216 mm.

Further, in the intermediate focal length state of the optical system S2 relating to the second Example, in the case of the lens element A, the vibration reduction coefficient K upon correcting the image blur is 1.29 and the focal length is 35.0 mm, so the moving amount of the lens element A for correcting rotational shake of 0.534° is 0.252 mm; and in the case of the lens element B, the vibration reduction coefficient K upon correcting the image blur is 1.71 and the focal length is 35.0 mm, so the moving amount of the lens element B for correcting rotational shake of 0.681° is 0.243 mm.

Further, in the telephoto end state of the optical system S2 relating to the second Example, in the case of the lens element A, the vibration reduction coefficient K upon correcting the image blur is 1.66 and the focal length is 53.5 mm, so the moving amount of the lens element A for correcting rotational shake of 0.432° is 0.243 mm; and in the case of the lens element B, the vibration reduction coefficient K upon correcting the image blur is 2.18 and the focal length is 53.5 mm, so the moving amount 1.5 of the lens element B for correcting rotational shake of 0.553° is 0.236 mm.

As described above, the vibration reduction coefficients K of the lens elements A and B become larger in this order, so more corrections become possible. In other words, if the focal lengths are the same as described above, correcting amount of the lens element B whose moving amount is smaller than the lens element A is larger than correcting amount of the lens element A. Accordingly, control is made such that when correcting amount is small, the lens element A is driven, and when correcting amount increases and reaches a predetermined value, the lens element B is driven. Such a control makes it possible to conduct more corrections without increasing the moving amount of the vibration reduction lens even if correcting amount becomes larger. As a result, it becomes possible to make the shifting amount proper without shifting largely the vibration lens group from the wide angle end state to the telephoto end state.

Various values associated with the optical system S2 relating to second Example of the first embodiment according to the present invention are listed in Table 2 below.

TABLE 2

Second Example (Entire Specification)

|  | W | M | T |
|---|---|---|---|
| f = | 18.5 | 35.0 | 53.5 |
| FNO = | 3.6 | 4.1 | 5.3 |
| TL = | 130.2 | 122.3 | 131.5 |

(Surface Data)

| m | r | d | vd | nd |
|---|---|---|---|---|
| op | ∞ | | | |
| 1) | 115.556 | 1.9 | 64.12 | 1.51680 |
| 2) | 15.601 | 0.2 | 38.09 | 1.55389 |
| *3) | 13.300 | 10.0 | | |
| 4) | −159.479 | 1.5 | 58.22 | 1.62299 |
| 5) | 35.685 | 1.1 | | |
| 6) | 28.207 | 3.1 | 25.68 | 1.78472 |
| 7) | 77.398 | D7 | | |
| 8) | 32.321 | 0.9 | 23.78 | 1.84666 |
| 9) | 17.691 | 4.3 | 58.89 | 1.51823 |
| 10) | −32.688 | 0.1 | | |
| 11) | 23.144 | 1.8 | 64.10 | 1.5168 |
| 12) | 59.408 | D12 | | |
| 13> | ∞ | 2.9 | | Aperture Stop |
| 14) | −40.000 | 2.75 | 32.40 | 1.85026 |
| 15) | −12.280 | 0.8 | 46.60 | 1.804 |
| 16) | 114.994 | 3.0 | | |
| 17) | −90.000 | 1.4 | 70.50 | 1.48749 |
| 18) | ∞ | D18 | | |
| 19) | ∞ | 3.2 | 52.30 | 1.51742 |
| 20) | −21.120 | 0.1 | | |
| 21) | 128.036 | 5.3 | 70.50 | 1.48749 |
| 22) | −15.933 | 1.3 | 32.40 | 1.85026 |
| 23) | −44.265 | BF | | |
| I | ∞ | | | |

(Aspherical Surface data)
Surface Number: 3

κ = 1
A4 = 2.63599E−05
A6 = 7.76960E−08
A8 = −1.94524E−10
A10 = 1.27950E−12

(Variable Distance Data)

|  | W | M | T |
|---|---|---|---|
| D7 | 32.3 | 20.8 | 9.7 |
| D12 | 2.6 | 4.3 | 8.0 |
| D18 | 9.6 | 7.8 | 4.2 |
| BF | 38.1 | 43.4 | 52.8 |

(Values for Conditional Expressions)

fA = −40.6
fB = −32.6
(1) |fB| < |fA|: 32.6 < 40.6
(2) |fB|/|fA| = 0.80

Figure 6A:
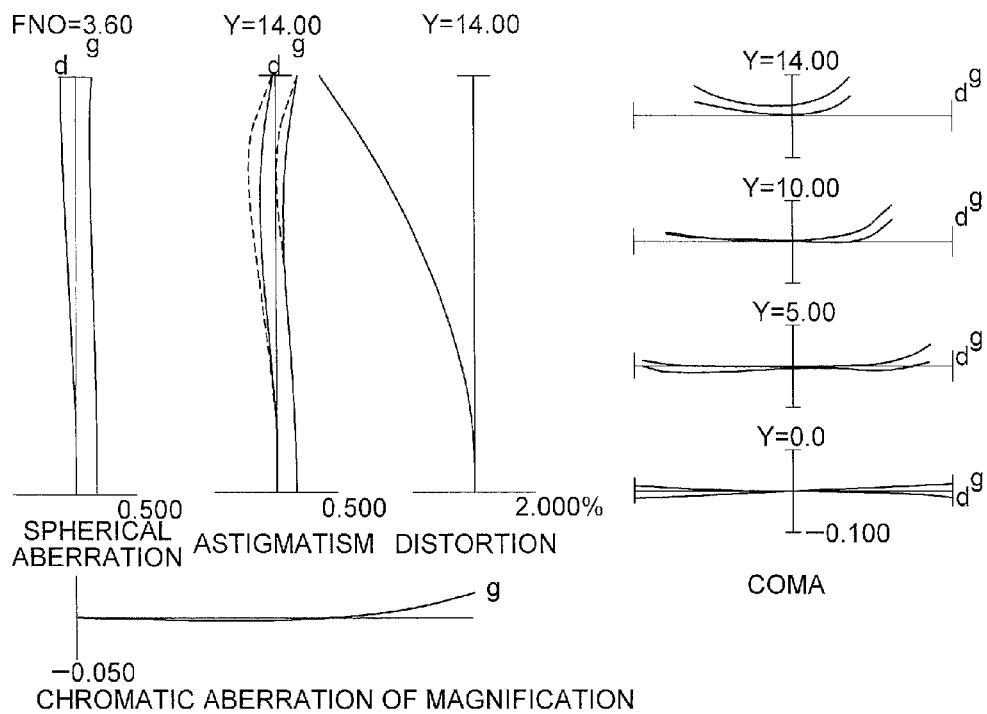
Figure 6B:
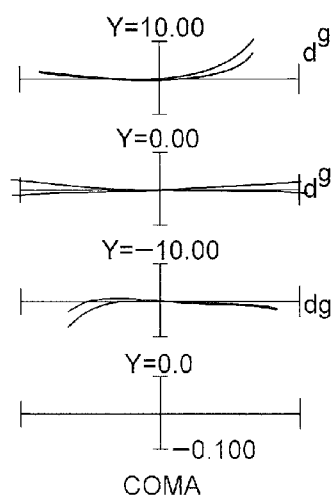
Figure 6C:
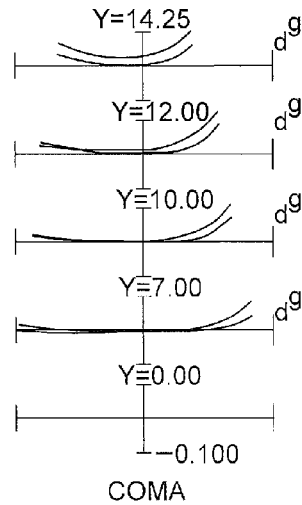

FIGS. 6A, 6B and 6C are graphs showing various aberrations of the optical system according to the second Example in the wide-angle end state upon focusing on infinity, in which FIG. 6A shows various aberrations, FIG. 6B shows meridional transverse aberration upon performing a correction of an image blur with using the lens element A, and FIG. 6C shows meridional transverse aberration upon performing the correction of the image blur with using the lens element B.

FIGS. 7A, 7B and 7C are graphs showing various aberrations of the optical system according to the second Example in the intermediate focal length state upon focusing on infinity, in which FIG. 7A shows various aberrations, FIG. 7B shows meridional transverse aberration upon performing the correction of the image blur with using the lens element A, and FIG. 7C shows meridional transverse aberration upon performing the correction of the image blur with using the lens element B.

FIGS. 8A, 8B and 8C are graphs showing various aberrations of the optical system according to the first Example in the telephoto end state upon focusing on infinity, in which FIG. 8A shows various aberrations, FIG. 8B shows meridional transverse aberration upon performing the correction of the image blur with using the lens element A, and FIG. 8C shows meridional transverse aberration upon performing the correction of the image blur with using the lens element B.

As is apparent from the respective graphs, it is understood that the optical system S2 of the second Example has a superb optical performance from the wide-angle end state to the telephoto end state.

Third Example

Figure 9:
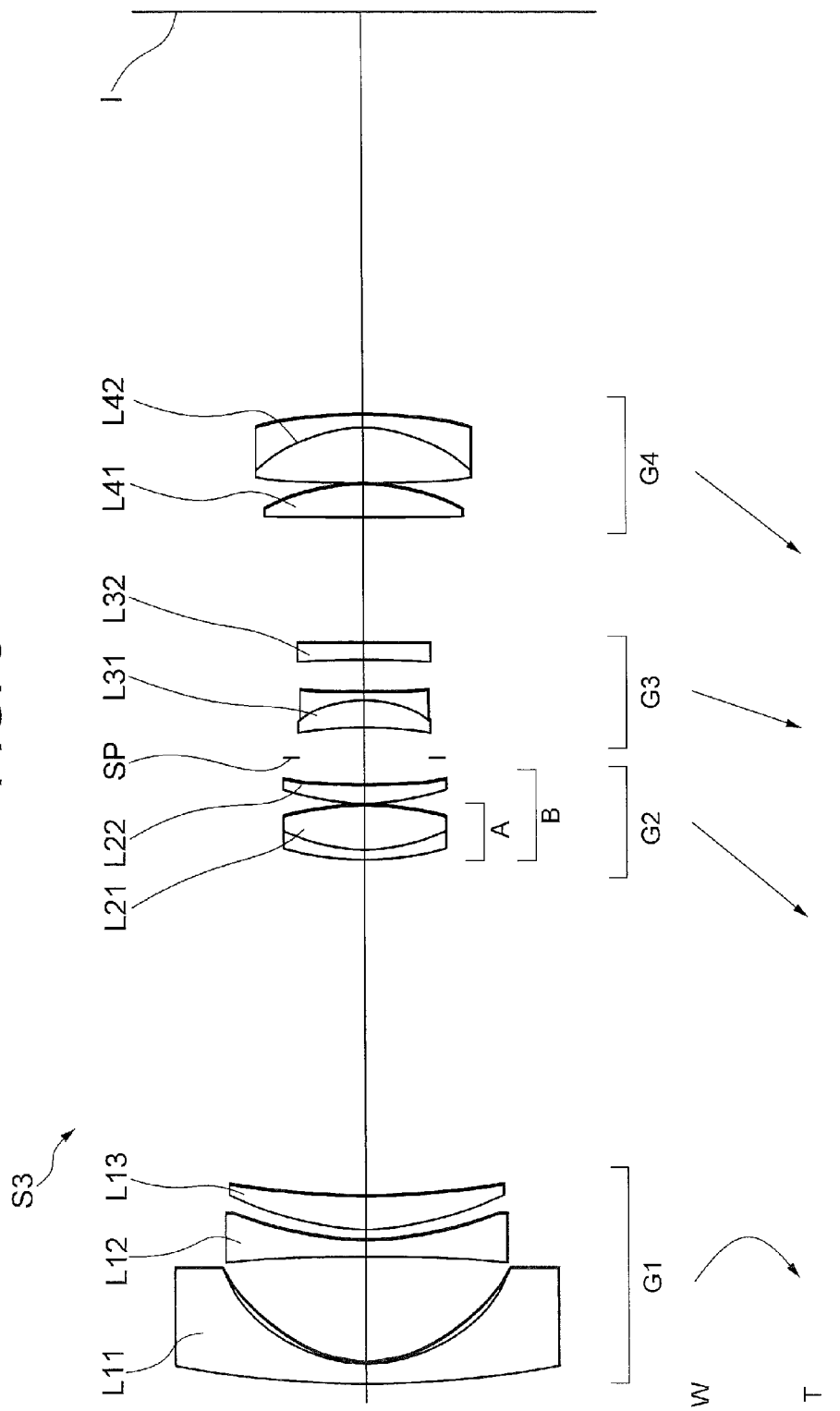
FIG. 9 is a view showing a configuration of an optical system relating to a third example according to the first embodiment of the present invention.

FIG. 9 shows a configuration of an optical system S3 relating to the third Example according to the first embodiment of the present invention.

As shown in FIG. 9, the optical system S3 relating to the third Example is composed of, in order from an unillustrated object side, a first lens group G1 having negative refractive power, a second lens group G2 having positive refractive power, an aperture stop SP, a third lens group G3 having negative refractive power, and a fourth lens group G4 having positive refractive power.

The first lens group G1 is composed of, in order from the object side, a negative meniscus lens having a convex surface facing the object, a double concave lens negative lens L12, and a positive meniscus lens L13 having a convex surface facing the object side, the negative meniscus lens L11 at the most object side is an aspherical lens in which a resin layer is provided on the glass lens surface at the image plane I side and an aspherical surface is formed on the resin layer.

The second lens group G2 is composed of, in order from the object side, a cemented lens L21 constructed by a negative meniscus lens having a convex surface facing the object side cemented with a double convex positive lens, and a positive meniscus lens L22 having a convex surface facing the object side.

The third lens group G3 is composed of, in order from the object side, a cemented lens L31 constructed by a positive meniscus lens having a concave surface facing the object side cemented with a double concave negative lens, and a plano-concave lens L32 having a concave surface facing the object side.

The fourth lens group G4 is composed of, in order from the object side, a plano-convex lens L41 having a plane surface facing the object side, and a cemented lens L42 constructed by a double convex positive lens cemented with a negative meniscus lens having a convex surface facing the image plane I side.

An imaging device (not shown) constructed by a COD, a CMOS or the like is disposed on the image plane I. The aperture stop SP is disposed between the second lens group G2 and the third lens group G3 and is moved together with the third lens group G3 upon zooming from a wide angle end state to a telephoto end state.

In the optical system S3 relating to the third Example, upon zooming from the wide angle end state to the telephoto end state, the first lens group G1 is moved to image plane I side with a substantially convex trajectory toward the image plane I, the second lens group G2 and the fourth lens group G4 are moved in a body to the object side, and the third lens group G3 is moved to the object side.

Further, the optical system S3 relating to the third Example is so configured that the cemented lens L21 in the second lens group G2 is made as a lens element A, a lens element B is composed of the lens element A and the positive meniscus lens L22 having refractive power of the same sign as that of refractive power of the lens element A, and vibration reduction lens groups are made, respectively, by the lens element A and the lens element Image blur is prevented by shifting either one of those vibration reduction lens groups in a direction perpendicular to the optical axis.

In the optical system S3 relating to the third Example, the lens group for correcting image blur may be shifted by (f·tan θ)/K in a direction perpendicular to the optical axis in order to correct rotational shake of an angle θ, where f denotes a focal length of the entire optical system S3, and K denotes a vibration reduction coefficient upon correcting the image blur.

In the optical system S3 relating to the third Example, focal lengths of the entire system in an wide angle end state, in an intermediate focal length state and in a telephoto end state are, respectively, 18.5 mm, 35.0 mm, and 53.5 mm (refer to Table 3 below). Correcting amounts of image blurs by the lens elements A and B in the respective focal lengths and moving amounts of the respective lens elements A and B are, as follows, for example:

In the wide angle end state of the optical system S3 relating to the third Example, in the case of the lens element A, the vibration reduction coefficient K upon correcting the image blur is 1.39 and the focal length is 18.5 mm, so the moving amount of the lens element A for correcting rotational shake of 0.735° is 0.170 mm; in the case of the lens element B, the vibration reduction coefficient K upon correcting the image blur is 1.92 and the focal length is 18.5 mm, so the moving amount of the lens element B for correcting rotational shake of 1.014° is 0.170 mm.

Further, in the intermediate focal length state of the optical system S3 relating to the third Example, in the case of the lens element A, the vibration reduction coefficient K upon correcting the image blur is 1.80 and the focal length is 35.0 mm, so the moving amount of the lens element A for correcting rotational shake of 0.534° is 0.181 mm; in the case of the lens element B, the vibration reduction coefficient K upon correcting the image blur is 1.92 and the focal length is 35.0 mm, so the moving amount of the lens element B for correcting rotational shake of 0.742° is 0.181 mm.

Further, in the telephoto end state of the optical system S3 relating to the third Example, in the case of the lens element A, the vibration reduction coefficient K upon correcting the image blur is 2.31 and the focal length is 53.5 mm, so the moving amount of the lens element A for correcting rotational shake of 0.432° is 0.174 mm; in the case of the lens element B, the vibration reduction coefficient K upon correcting the image blur is 321 and the focal length is 53.5 mm, so the moving amount of the lens element B for correcting rotational shake of 0.600° is 0.174 mm.

As described above, the vibration reduction coefficients K of the lens element A and the lens element B become larger in this order, so more corrections become possible. In other words, if the focal lengths are the same and the moving amounts of the lens elements A and B are the same, as described above, the correcting amount by the lens element B is more than that by the lens element A. Accordingly, control is made such that when correcting amount is small, the lens element A is driven; when correcting amount increases and reaches a predetermined value, the lens element B is driven. Such a control makes it possible to conduct more corrections without increasing the moving amount of the vibration reduction lens even if correcting amount becomes larger. As a result, it becomes possible to make the shifting amount proper without shifting largely the vibration lens group from the wide angle end state to the telephoto end state.

Various values associated with the optical system S3 relating to the third Example of the first embodiment according to the present invention are listed in Table 3 below.

TABLE 3

Third Example (Entire Specification)

| | W | M | T |
|---|---|---|---|
| f = | 18.5 | 35.0 | 53.5 |
| FNO = | 3.6 | 4.0 | 5.2 |
| TL = | 130.8 | 121.9 | 130.2 |

(Surface Data)

| m | r | d | vd | nd |
|---|---|---|---|---|
| op | ∞ | | | |
| 1) | 115.450 | 1.9 | 64.12 | 1.51680 |
| 2) | 15.601 | 0.2 | 38.09 | 1.55389 |
| *3) | 13.300 | 10.0 | | |
| 4) | −145.545 | 1.5 | 58.22 | 1.62299 |
| 5) | 39.812 | 1.1 | | |
| 6) | 28.306 | 3.1 | 25.68 | 1.78472 |
| 7) | 67.883 | D7 | | |
| 8) | 29.022 | 0.9 | 23.78 | 1.84666 |
| 9) | 16.347 | 4.3 | 58.89 | 1.51823 |
| 10) | −31.176 | 0.1 | | |
| 11) | 23.440 | 1.8 | 64.12 | 1.51680 |
| 12) | 59.408 | D12 | | |
| 13> | ∞ | 2.9 | | Aperture Stop |
| 14) | −36.200 | 2.8 | 32.35 | 1.85026 |
| 15) | −11.078 | 0.8 | 46.58 | 1.80400 |
| 16) | 114.994 | 3.0 | | |
| 17) | −68.000 | 1.4 | 70.45 | 1.48749 |
| 18) | ∞ | D18 | | |
| 19) | −125.598 | 3.2 | 52.32 | 1.51742 |
| 20) | −20.199 | 0.1 | | |
| 21) | 72.314 | 5.3 | 70.45 | 1.48749 |
| 22) | −16.608 | 1.3 | 32.35 | 1.85026 |
| 23) | −44.265 | BF | | |
| I | ∞ | | | |

(Aspherical Surface data)
Surface Number: 3

κ = 1
A4 = 2.71636E−05
A6 = 7.76960E−08
A8 = −1.73581E−10
A10 = 1.27950E−12

TABLE 3-continued

Third Example (Variable Distance Data)

|     | W    | M    | T    |
|-----|------|------|------|
| D7  | 32.3 | 9.7  | 2.2  |
| D12 | 2.6  | 8.0  | 12.2 |
| D18 | 12.1 | 6.7  | 2.5  |
| BF  | 38.1 | 54.0 | 67.7 |

(Values for Conditional Expressions)

fA = +39.5
fB = +25.9
(1) |fB| < |fA|: 25.9 < 39.5
(2) |fB|/|fA| = 0.66

FIGS. 10A, 10B and 10C are graphs showing various aberrations of the optical system according to the third Example in the wide-angle end state upon focusing on infinity, in which FIG. 10A shows various aberrations, FIG. 10B shows meridional transverse aberration upon performing a correction of an image blur with using the lens element A, and FIG. 10C shows meridional transverse aberration upon performing the correction of the image blur with using the lens element B.

Figure 11A:
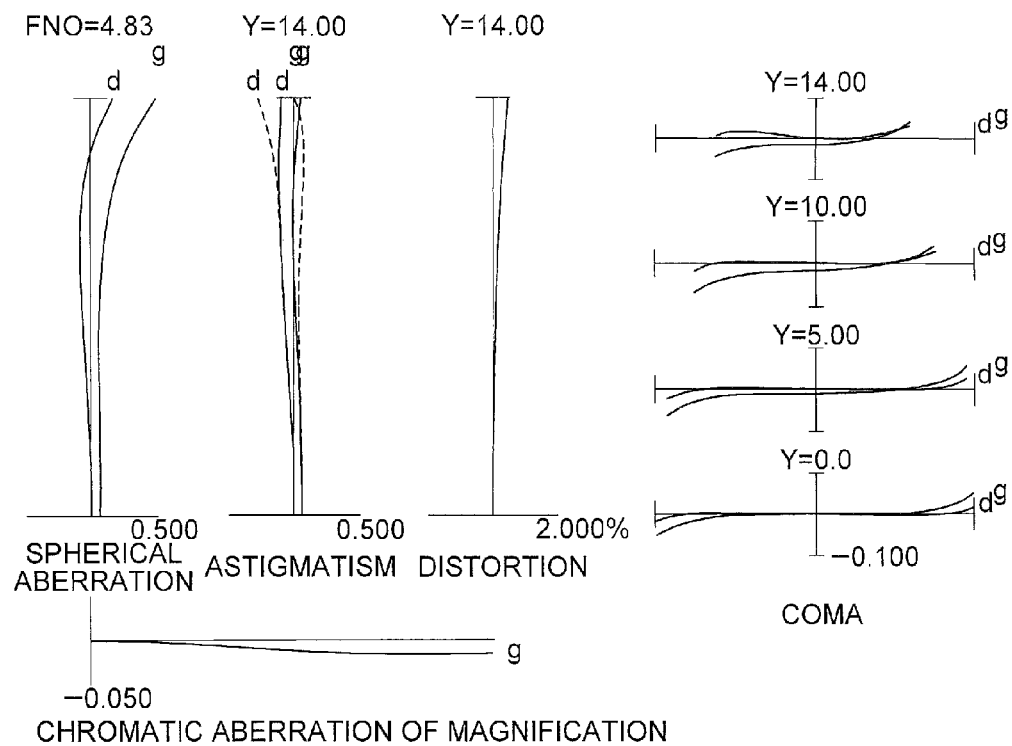
Figure 11B:
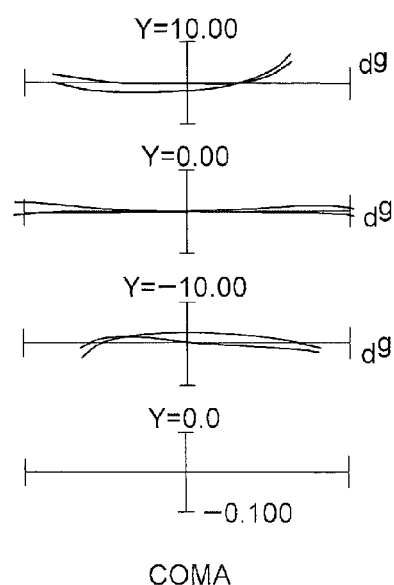
Figure 11C:
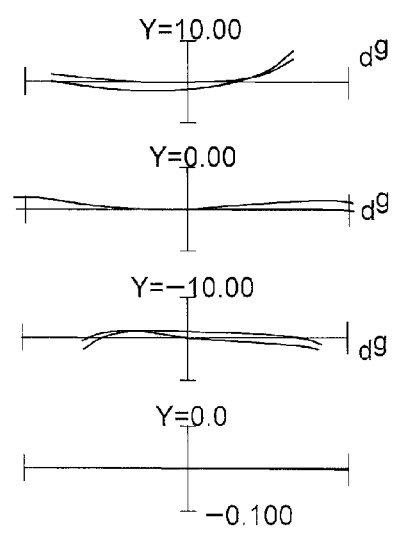

FIGS. 11A, 11B and 11C are graphs showing various aberrations of the optical system according to the third Example in the intermediate focal length state upon focusing on infinity, in which FIG. 11A shows various aberrations, FIG. 11B shows meridional transverse aberration upon performing correction of image blur with using the lens element A, and FIG. 11C shows meridional transverse aberration upon performing correction of image blur with using the lens element B.

Figure 12A:
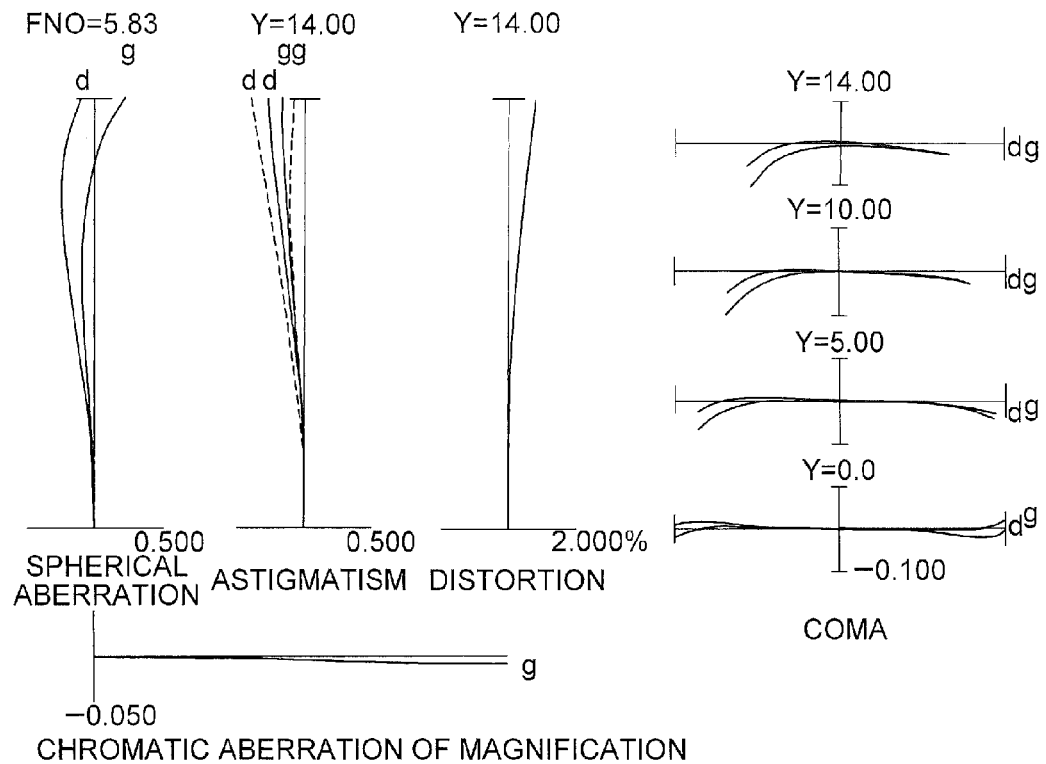
Figure 12B:
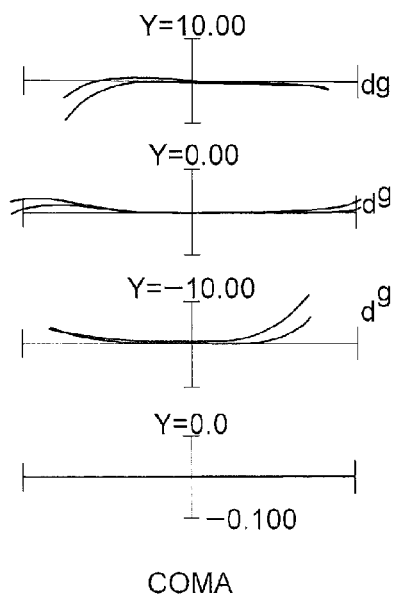
Figure 12C:
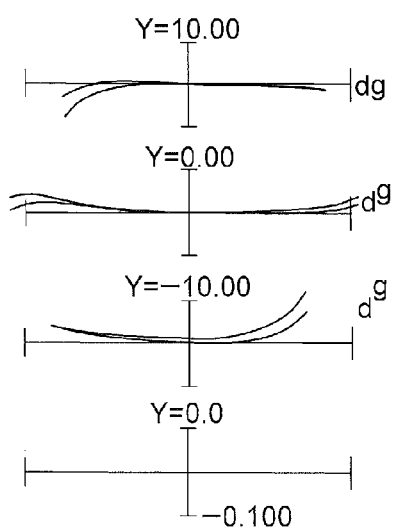

FIGS. 12A, 12B and 12C are graphs showing various aberrations of the optical system according to the third Example in the telephoto end state upon focusing on infinity, in which FIG. 12A shows various aberrations, FIG. 12B shows meridional transverse aberration upon performing the correction of the image blur with using the lens element A, and FIG. 12C shows meridional transverse aberration upon performing the correction of the image blur with using the lens element B.

As is apparent from the respective graphs, it is understood that the optical system S3 according to the third Example has a superb optical performance from the wide-angle end state to the telephoto end state.

Fourth Example

FIG. 13 shows a configuration of an optical system S4 relating to the fourth Example according to the first embodiment of the present invention.

As shown in FIG. 13, the optical system S4 relating to the fourth Example is composed of, in order from an unillustrated object side, a first lens group G1 having positive refractive power, a second lens group G2 having negative refractive power, an aperture stop SP, a third lens group G3 having positive refractive power, a fourth lens group G4 having negative refractive power, and a fifth lens group G4 having positive refractive power.

The first lens group G1 is composed of, in order from the object side, a cemented lens L11 constructed by a negative meniscus lens having a convex surface facing the object cemented with a double convex lens, and a positive meniscus lens L12 having a convex surface facing the object side.

The second lens group G2 is composed of, in order from the object side, a negative meniscus lens L21 whose object side surface is formed as an aspherical surface and which has a convex surface facing the object side, a double concave lens L22, a double convex lens L23, and a negative meniscus lens L24 having a concave surface facing the object side.

The third lens group G3 is composed of, in order from the object side, a double convex lens L31 and a cemented lens L32 constructed by a double convex lens cemented with a negative meniscus lens having a concave surface facing the object side.

The fourth lens group G4 is composed of, in order from the object side, a cemented lens L41 constructed by a negative meniscus lens having a convex surface facing the object side cemented with a positive meniscus lens having a convex surface facing the object side, a double concave lens L42 and a double concave lens L43.

The fifth lens group G5 is composed of, in order from the object side, a double convex lens L51 whose image plane I side is shaped as an aspherical surface, a double convex lens L52, and a negative meniscus lens L53 having a concave surface facing the object side.

An imaging device (not shown) constructed by a CCD, a CMOS or the like is disposed on the image plane I. The aperture stop SP is disposed between the second lens group G2 and the third lens group G3 and is moved together with the third lens group G3 upon zooming from a wide angle end state to a telephoto end state.

In the optical system S4 relating to the fourth Example, upon zooming from the wide angle end state to the telephoto end state, the first lens group G1, the second lens group G2, the third lens group G3, the fourth lens group G4, and the fifth lens group G5 are moved to the object side.

Further, the optical system S4 relating to the fourth Example is so configured that the cemented lens L41 in the fourth lens group G4 is made as a lens element A, a lens element B is composed of the lens element A and the double concave lens L42 having refractive power of the same sign as that of refractive power of the lens element A, a lens element C is composed of the lens element B and the double concave lens L43 having refractive power of the same sign as that of refractive power of the lens element B, and vibration reduction lens groups are made, respectively, by the lens element A, the lens element B and the lens element C. Image blur is prevented by shifting any one of those vibration reduction lens groups in a direction perpendicular to the optical axis.

In the optical system S4 relating to the fourth Example, the lens group for correcting image blur may be shifted by (f·tan θ)/K in a direction perpendicular to the optical axis in order to correct rotational shake of an angle θ, where f denotes a focal length of the entire optical system S4, and K denotes a vibration reduction coefficient upon correcting image blur.

In the optical system S4 relating to the fourth Example, focal lengths of the entire system in an wide angle end state, in an intermediate focal length state and in a telephoto end state are, respectively, 18.7 mm, 70.6 mm, and 188.0 mm (refer to Table 4 below). Correcting amounts of image blurs by the lens elements A, B and C in the respective focal lengths and moving amounts of the respective lens elements A, B and C are, as follows, for example:

In the wide angle end state of the optical system S4 relating to the fourth Example, in the case of the lens element A, the vibration reduction coefficient K upon correcting the image blur is 0.51 and the focal length is 18.7 mm, so the moving amount of the lens element A for correcting rotational shake of 0.623° is 0.400 mm; in the case of the lens element B, the vibration reduction coefficient K upon correcting the image blur is 0.61 and the focal length is 18.7 mm, so the moving amount of the lens element B for correcting rotational shake of 0.746° is 0.400 mm; and in the case of the lens element C, the vibration reduction coefficient K upon correcting the image blur is 1.69 and the focal length is 18.7 mm, so the moving amount of the lens element B for correcting rotational shake of 1.461° is 0.400 mm;

Further, in the intermediate focal length state of the optical system S4 relating to the fourth Example, in the case of the lens element A, the vibration reduction coefficient K upon correcting the image blur is 0.82 and the focal length is 70.6 mm, so the moving amount of the lens element A for correcting rotational shake of 0.267° is 0.399 mm; in the case of the lens element B, the vibration reduction coefficient K upon correcting the image blur is 0.99 and the focal length is 70.6 mm, so the moving amount of the lens element B for correcting rotational shake of 0.321° is 0.399 mm, and in the case of the lens element C, the vibration reduction coefficient K is 1.95 and the focal length is 70.6 mm, so the moving amount of the lens element C for correcting rotational shake of 0.630° is 0.399 mm.

Further, in the telephoto end state of the optical system S4 relating to the fourth Example, in the case of the lens element A, the vibration reduction coefficient K upon correcting the image blur is 1.04 and the focal length is 188.0 mm, so the moving amount of the lens element A for correcting rotational shake of 0.126° is 0.400 mm; in the case of the lens element B, the vibration reduction coefficient K upon correcting the image blur is 1.25 and the focal length is 188.0 mm, so the moving amount of the lens element B for correcting rotational shake of 0.152° is 0.400 mm; and in the case of the lens element C, the vibration reduction coefficient K is 2.46 and the focal length is 188.0 mm, so the moving amount of the lens element C for correcting rotational shake of 0.197° is 0.400 mm.

As described above, the vibration reduction coefficients K of the lens element A, the lens element B and the lens element C become larger in this order, so more corrections become possible. In other words, if the focal lengths are the same and the moving amounts of the lens elements A, B and C are the same, as described above, the correcting amount by the lens element B is more than that by the lens element A, and further the correcting amount by the lens element C is more than that by the lens element B.

Accordingly, control is made such that when correcting amount is small, the lens element A is driven; when correcting amount increases and reaches a predetermined value, the lens element B is driven; and when correcting amount increases moreover and reaches another predetermined value that is set at a larger value than said predetermined value, the lens element C is driven. Such a control makes it possible to conduct more corrections without increasing the moving amounts of the vibration reduction lenses even if correcting amounts become larger. As a result, it becomes possible to make the shifting amount proper without shifting largely the vibration lens groups from the wide angle end state to the telephoto end state.

Various values associated with the optical system S4 relating to the fourth Example of the first embodiment according to the present invention are listed in Table 4 below.

TABLE 4

Fourth Example (Entire Specification)

|  | W | M | T |
|---|---|---|---|
| f = | 18.7 | 70.0 | 188.0 |
| FNO = | 3.64 | 5.44 | 6.60 |
| TL = | 128.6 | 180.3 | 216.7 |

(Surface Data)

| m | r | d | νd | nd |
|---|---|---|---|---|
| op | ∞ |  |  |  |
| 1) | 128.56287 | 1.8 | 37.18 | 1.834 |
| 2) | 61.71903 | 9.4 | 82.57 | 1.49782 |
| 3) | −368.67603 | 0.12 |  |  |
| 4) | 55.98016 | 6.8 | 82.57 | 1.49782 |
| 5) | 389.22661 | D5 |  |  |
| *6) | 43.51896 | 1.2 | 47.25 | 1.77377 |
| 7) | 11.20367 | 6.4 |  |  |
| 8) | −27.87211 | 1.0 | 40.66 | 1.88300 |
| 9) | 45.04115 | 0.15 |  |  |
| 10) | 26.85149 | 4.22 | 23.8 | 1.84666 |
| 11) | −30.94189 | 1.05 |  |  |
| 12) | −19.31231 | 1.0 | 46.6 | 1.80400 |
| 13) | −58.68682 | D13 |  |  |
| 14> | ∞ | 1.63 |  | Aperture Stop |
| 15) | 31.09309 | 3.18 | 82.57 | 1.49782 |
| 16) | −66.2335 | 0.12 |  |  |
| 17) | 24.20499 | 4.26 | 82.57 | 1.49782 |
| 18) | −22.11253 | 0.9 | 25.45 | 1.80518 |
| 19) | −90.15429 | D19 |  |  |
| 20) | 90.00000 | 0.8 | 52.77 | 1.74100 |
| 21) | 15.29423 | 2.5 | 25.45 | 1.80518 |
| 22) | 33.33188 | 1.4 |  |  |
| 23) | −450.00000 | 0.8 | 63.88 | 1.51680 |
| 24) | 459.94923 | 1.2 |  |  |
| 25) | −80.00000 | 1.2 | 54.61 | 1.72916 |
| 26) | 183.82631 | D26 |  |  |
| 27) | 275.95449 | 4.0 | 82.47 | 1.49697 |
| *28) | −21.43596 | 0.08 |  |  |
| 29) | 55.21481 | 4.25 | 70.31 | 1.48749 |
| 30) | −30.00000 | 1.4 |  |  |
| 31) | −15.80000 | 1.63 | 37.18 | 1.83400 |
| 32) | −31.79204 | BF |  |  |
| I | ∞ |  |  |  |

(Aspherical Surface data)

Surface Number: 6

κ = −45.4463
A4 = 6.97E−05
A6 = −5.50E−07
A8 = 3.61E−09
A10 = −1.46E−11
A12 = 2.48E−14

Surface Number: 28

κ = −5.3904
A4 = −9.11E−05
A6 = 3.6E−07
A8 = −2.85E−09
A10 = 117E−11
A12 = −3.50E−14

(Variable Distance Data)

|  | W | M | T |
|---|---|---|---|
| D5 | 1.0 | 36.0 | 56.8 |
| D13 | 23.1 | 8.3 | 1.0 |
| D19 | 0.9 | 1.1 | 2.3 |
| D26 | 2.9 | 2.3 | 2.3 |
| BF | 38.7 | 70.6 | 92.2 |

TABLE 4-continued

Fourth Example (Values for Conditional Expressions)

fA = −89.0
fB = −74.1
Fc = −37.2
(1) |fB| < |fA|: 74.1 < 89.0
(2) |fB|/|fA| = 0.83
(3) |fC| < |fB| < |fA|: 37.2 < 74.1 < 89.0
(4) |fC|/|fA| = 0.42

Figure 14A:
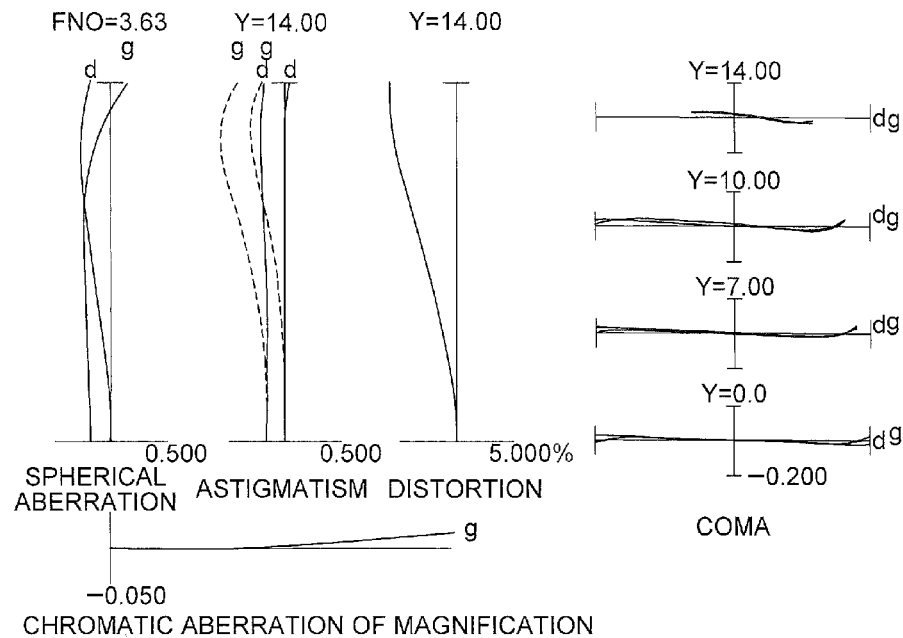
Figures 14B, 14C, 14D:
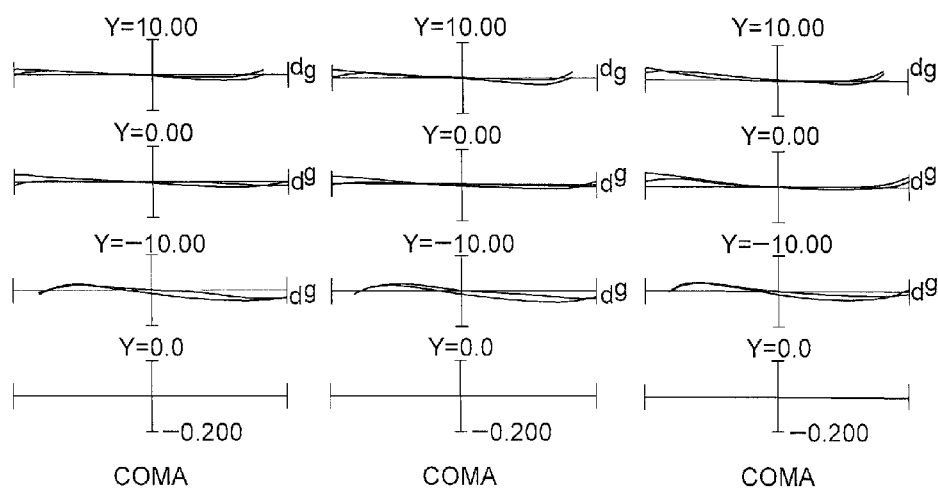

FIGS. 14A, 14B, 14C and 14D are graphs showing various aberrations of the optical system according to the fourth Example in the wide-angle end state upon focusing on infinity, in which FIG. 14A shows various aberrations, FIG. 14B shows meridional transverse aberration upon performing a correction of an image blur with using the lens element A, FIG. 14C shows meridional transverse aberration upon performing the correction of the image blur with using the lens element B and FIG. 14D shows meridional transverse aberration upon performing the correction of the image blur with using the lens element C.

Figure 15A:
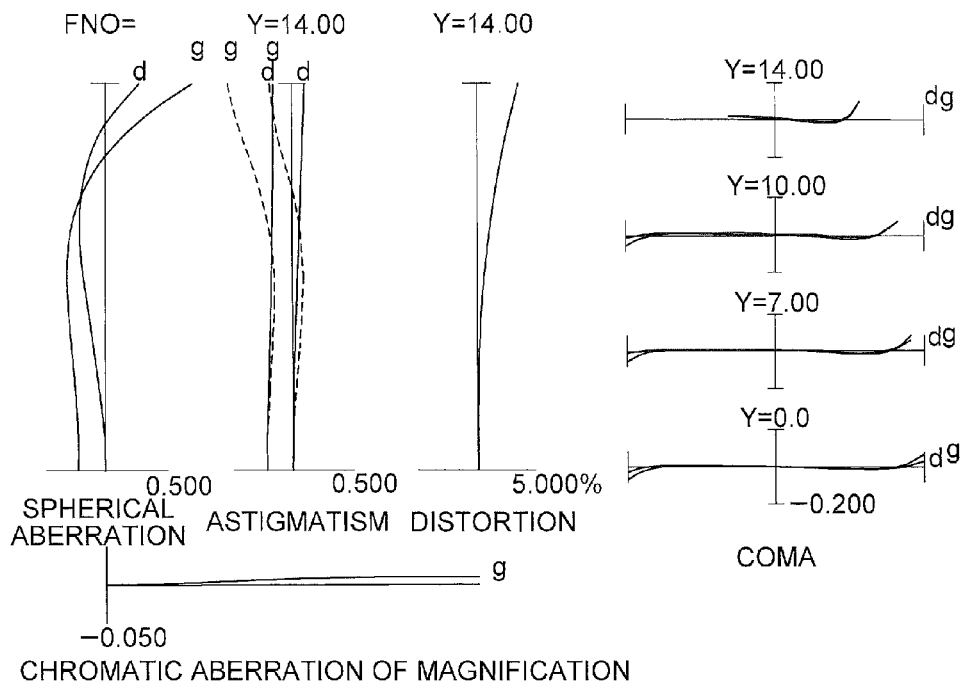
Figures 15B, 15C, 15D:
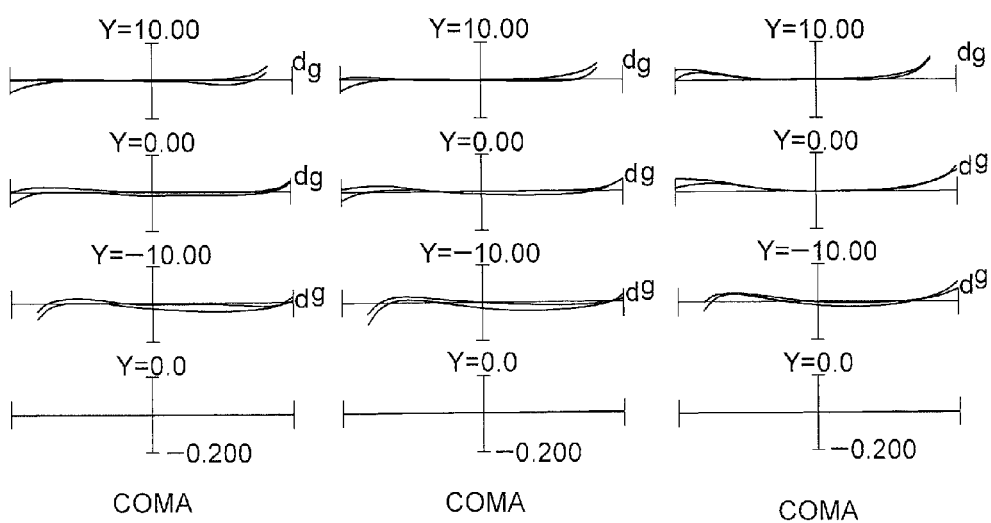

FIGS. 15A, 15B, 15C and 15D are graphs showing various aberrations of the optical system according to the fourth Example in the intermediate focal length state upon focusing on infinity, in which FIG. 15A shows various aberrations, FIG. 15B shows meridional transverse aberration upon performing the correction of the image blur with using the lens element A, FIG. 15C shows meridional transverse aberration upon performing the correction of the image blur with using the lens element B and FIG. 15D shows meridional transverse aberration upon performing the correction of the image blur with using the lens element C.

Figure 16A:
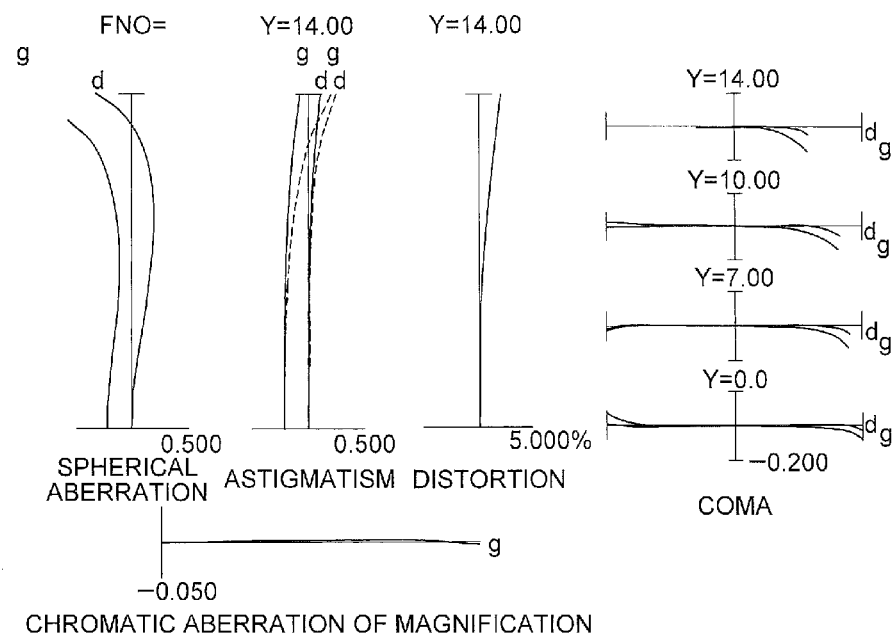
Figure 16B:
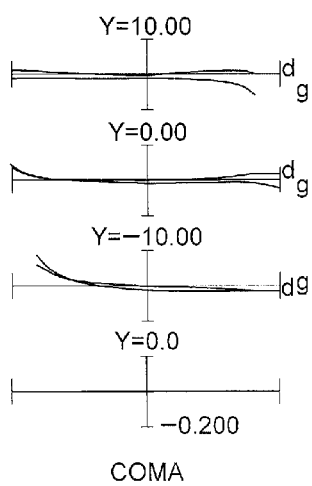
Figure 16C:
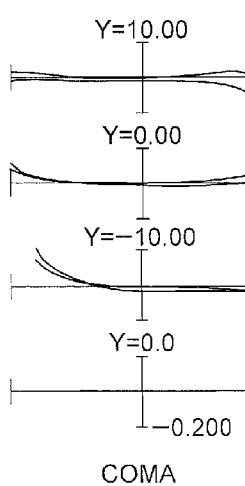
Figure 16D:
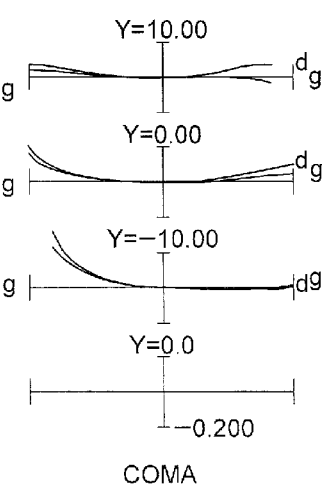

FIGS. 16A, 16B, 16C and 16D are graphs showing various aberrations of the optical system according to the fourth Example in the telephoto end state upon focusing on infinity, in which FIG. 16A shows various aberrations, FIG. 16B shows meridional transverse aberration upon performing the correction of the image blur with using the lens element A, FIG. 16C shows meridional transverse aberration upon performing the correction of the image blur with using the lens element B and FIG. 16D shows meridional transverse aberration upon performing the correction of the image blur with using the lens element C.

As is apparent from the respective graphs, it is understood that the optical system S4 according to the fourth Example has a superb optical performance from the wide-angle end state to the telephoto end state.

Fifth Example

Figure 17:
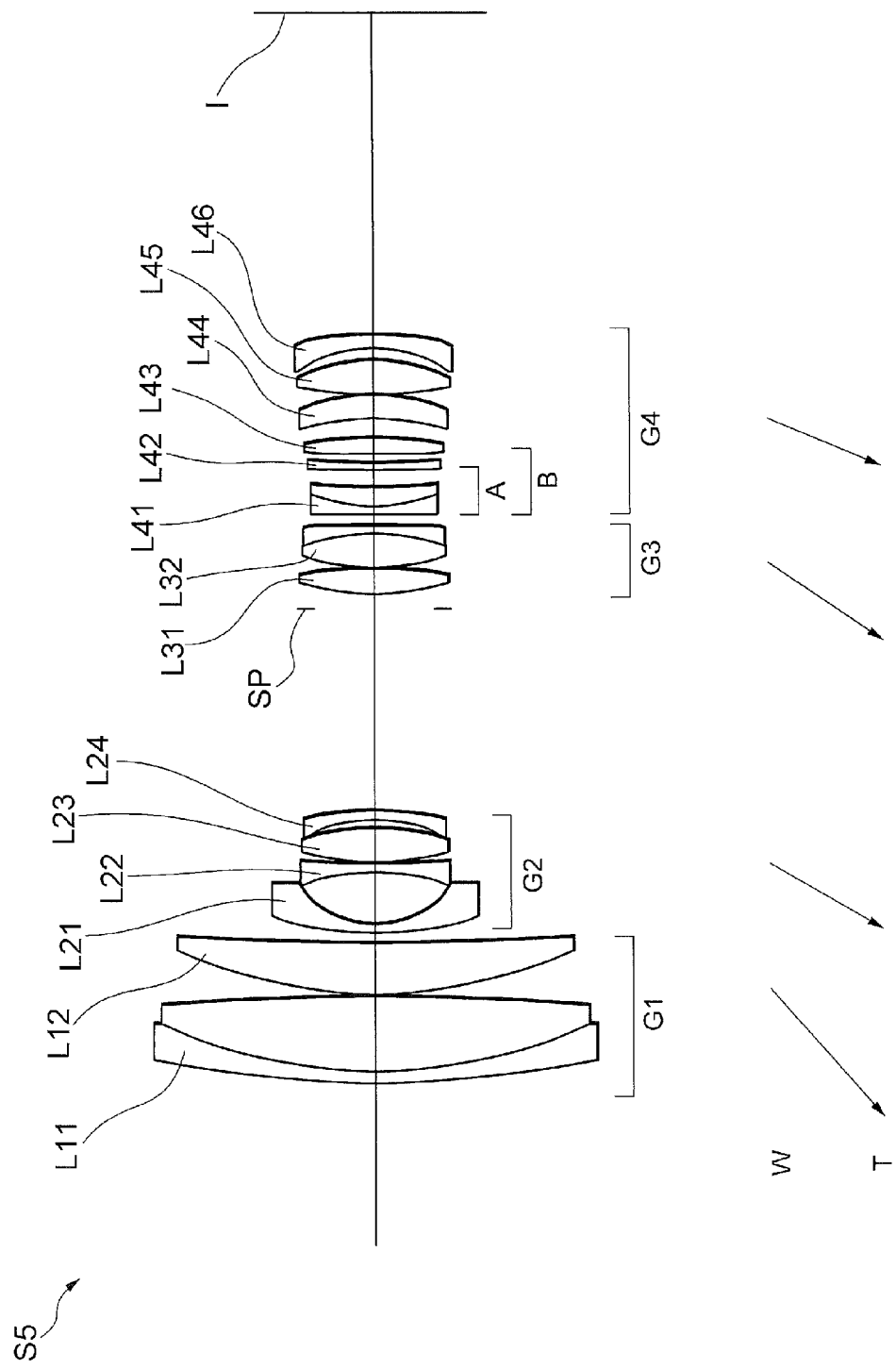
FIG. 17 is a view showing a configuration of an optical system relating to a fifth example according to the first embodiment of the present invention.

FIG. 17 shows a configuration of an optical system S5 relating to the fifth Example according to the first embodiment of the present invention.

As shown in FIG. 17, the optical system S5 relating to the fifth Example is composed of, in order from an unillustrated object side, a first lens group G1 having positive refractive power, a second lens group G2 having negative refractive power, an aperture stop SP, a third lens group G3 having positive refractive power, and a fourth lens group G4 having negative refractive power.

The first lens group G1 is composed of, in order from the object side, a cemented lens L11 constructed by a negative meniscus lens having a convex surface facing the object cemented with a double convex lens, and a positive meniscus lens L12 having a convex surface facing the object side.

The second lens group G2 is composed of, in order from the object side, a negative meniscus lens L21 whose object side surface is formed as an aspherical surface and which has a convex surface facing the object side, a double concave lens L22, a double convex lens L23, and a negative meniscus lens L24 having a concave surface facing the object side.

The third lens group G3 is composed of, in order from the object side, a double convex lens L31 and a cemented lens L32 constructed by a double convex lens cemented with a negative meniscus lens having a concave surface facing the object side.

The fourth lens group G4 is composed of in order from the object side, a cemented lens L41 constructed by a double concave lens cemented with a positive meniscus lens having a convex surface facing the object side, a double concave lens L42, a double convex lens L43, a positive meniscus lens L44 whose image plane I side is shaped as an aspherical surface and which has a concave surface facing the object side, a double convex lens L45, and a negative meniscus lens L46 having a concave surface facing the object side.

An imaging device (not shown) constructed by a CCD, a CMOS or the like is disposed on the image plane I. The aperture stop SP is disposed between the second lens group G2 and the third lens group G3 and is moved together with the third lens group G3 upon zooming from a wide angle end state to a telephoto end state.

In the optical system S5 relating to the fifth Example, upon zooming from the wide angle end state to the telephoto end state, the first lens group G1, the second lens group G2, the third lens group G3 and the fourth lens group G4 are moved to the object side.

Further, the optical system S5 relating to the fifth Example is so configured that the cemented lens L41 in the fourth lens group G4 and the double concave lens L42 are made as a lens element A, a lens element B is composed of the lens element A and the double convex lens L43 having refractive power of the different sign as that of refractive power of the lens element A, and vibration reduction lens groups are made, respectively, by the lens element A and the lens element B. Image blur is prevented by shifting either of those vibration reduction lens groups in a direction perpendicular to the optical axis.

In the optical system S5 relating to the fifth Example, the lens group for correcting image blur may be shifted by (f·tan θ)/K in a direction perpendicular to the optical axis in order to correct rotational shake of an angle θ, where f denotes a focal length of the entire optical system S5, and K denotes a vibration reduction coefficient upon correcting the image blur.

In the optical system S5 relating to the fifth Example, focal lengths f of the entire system in an wide angle end state, in an intermediate focal length, state and in a telephoto end state are, respectively, 18.7 mm, 70.1 mm, and 188.0 mm (refer to Table 5 below). Correcting amounts of image blurs by the lens elements A and B in the respective focal lengths and moving amounts of the respective lens elements A and B are, as follows, for example.

In the wide angle end state of the optical system S5 relating to the fifth Example, in the case of the lens element A, the vibration reduction coefficient K upon correcting the image blur is 1.14 and the focal length is 18.7 mm, so the moving amount of the lens element A for correcting rotational shake of 1.466° is 0.421 mm; in the case of the lens element B, the vibration reduction coefficient K upon correcting the image blur is 0.60 and the focal length is 18.7 mm, so the moving amount of the lens element B for correcting rotational shake of 0.772° is 0.421 mm.

Further, in the intermediate focal length state of the optical system S5 relating to the fifth Example, in the case of the lens element A, the vibration reduction coefficient K upon correcting the image blur is 1.83 and the focal length is 70.1 mm, so the moving amount of the lens element A for correcting rotational shake of 0.630° is 0.421 mm; in the case of the lens element B, the vibration reduction coefficient K upon correcting the image blur is 0.94 and the focal length is 70.1 mm, so the moving amount of the lens element B for correcting rotational shake of 0.322° is 0.421 mm.

Further, in the telephoto end state of the optical system S5 relating to the fifth Example, in the case of the lens element A, the vibration reduction coefficient K upon correcting the image blur is 2.31 and the focal length is 188.0 mm, so the moving amount of the lens element A for correcting rotational shake of 0.296° is 0.421 mm; and in the case of the lens element B, the vibration reduction coefficient K upon correcting the image blur is 1.17 and the focal length is 188.0 mm, so the moving amount of the lens element B for correcting rotational shake of 0.150° is 0.421 mm.

As described above, in the fifth Example, the vibration reduction coefficients. K of the lens element B and the lens element A become larger in this order, so more corrections become possible by correcting image blur with the lens element A than with the lens element B. In other words, if the focal lengths are the same and the moving amounts the lens elements A and B are the same, as described above, the correcting amount by the lens element A is more than that by the lens element B.

Accordingly, control is made such that when correcting amount is small, the lens element B is driven; and when correcting amount increases and reaches a predetermined value, the lens element A is driven. Such a control makes it possible to conduct more corrections without increasing the moving amounts of the vibration reduction lenses even if correcting amounts become larger. As a result, it becomes possible to make the shifting amount proper without shifting largely the vibration lens groups from the wide angle end state to the telephoto end state.

Various values associated with the optical system S5 relating to the fifth Example of the first embodiment according to the present invention are listed in Table 5 below.

TABLE 5

Fifth Example (Entire Specification)

|  | W | M | T |
|---|---|---|---|
| f = | 18.7 | 70.1 | 188.0 |
| FNO = | 3.64 | 5.60 | 6.97 |
| TL = | 130.1 | 182.0 | 219.2 |

(Surface Data)

| m | r | d | νd | nd |
|---|---|---|---|---|
| op | ∞ | | | |
| 1) | 133.26500 | 1.4 | 37.18 | 1.83400 |
| 2) | 63.25833 | 9.2 | 82.57 | 1.49782 |
| 3) | −305.56559 | 0.12 | | |
| 4) | 58.40597 | 6.4 | 82.57 | 1.49782 |
| 5) | 444.97253 | D5 | | |
| *6) | 45.03974 | 1.2 | 47.25 | 1.77377 |
| 7) | 11.11015 | 6.4 | | |
| 8) | −24.09331 | 1.0 | 40.66 | 1.88300 |
| 9) | 68.33997 | 0.15 | | |
| 10) | 31.75544 | 4.22 | 23.78 | 1.84666 |
| 11) | −28.74651 | 1.05 | | |

TABLE 5-continued

Fifth Example

| 12) | −17.39728 | 1.0 | 46.6 | 1.80400 |
|---|---|---|---|---|
| 13) | −38.14366 | D13 | | |
| 14> | ∞ | 1.63 | | Aperture Stop |
| 15) | 26.85327 | 3.18 | 82.57 | 1.49782 |
| 16) | −48.92537 | 0.12 | | |
| 17) | 28.73946 | 4.26 | 82.57 | 1.49782 |
| 18) | −24.20835 | 0.9 | 25.4 | 1.80518 |
| 19) | −150.19371 | D19 | | |
| 20) | −200.00000 | 0.8 | 52.77 | 1.74100 |
| 21) | 19.52804 | 2.5 | 25.44 | 1.80518 |
| 22) | 66.76603 | 2.0 | | |
| 23) | −500.00000 | 0.8 | 54.61 | 1.72916 |
| 24) | 68.99538 | 1.2 | | |
| 25) | 184.90012 | 1.9 | 63.88 | 1.51680 |
| 26) | −57.41433 | 2.3 | | |
| 27) | −29.69333 | 3.0 | 82.47 | 1.49697 |
| *28) | −23.59223 | 0.08 | | |
| 29) | 52.67285 | 4.25 | 70.31 | 1.48749 |
| 30) | −20.13027 | 1.4 | | |
| 31) | −15.95804 | 1.63 | 37.18 | 1.83400 |
| 32) | −35.63406 | BF | | |
| I | ∞ | | | |

(Aspherical Surface data)

Surface Number: 6

κ = −42.8927
A4 = 6.52E−05
A6 = −4.25E−07
A8 = 2.51E−09
A10 = −9.91E−12
A12 = 1.83E−14

Surface Number: 28

κ = −7.2004
A4 = −7.79E−05
A6 = 4.39E−07
A8 = −4.25E−09
A10 = 3.18E−11
A12 = −1.36E−13

(Variable Distance Data)

|  | W | M | T |
|---|---|---|---|
| D5 | 1.0 | 36.0 | 56.8 |
| D13 | 24.8 | 8.7 | 1.0 |
| D19 | 1.5 | 1.9 | 3.7 |
| BF | 38.7 | 71.3 | 93.5 |

(Values for Conditional Expressions)

fA = −40.1
fB = −82.5
(5) |fA| < |fB|: 40.1 < 82.5
(6) |fA|/|fB| = 0.486

FIGS. 18A, 18B and 18C are graphs showing various aberrations of the optical system according to the fifth Example in the wide-angle end state upon focusing on infinity, in which FIG. 18A shows various aberrations, FIG. 18B shows meridional transverse aberration upon performing a correction of an image blur with using the lens element A, and FIG. 18C shows meridional transverse aberration upon performing the correction of the image blur with using the lens element B.

Figure 19A:
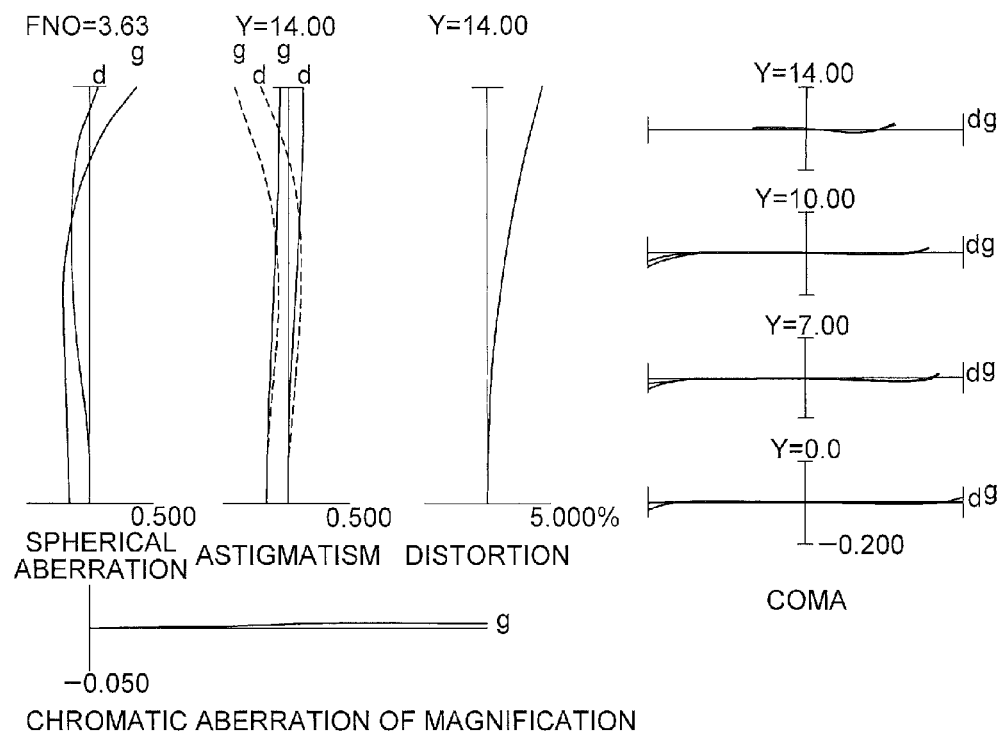
Figure 19B:
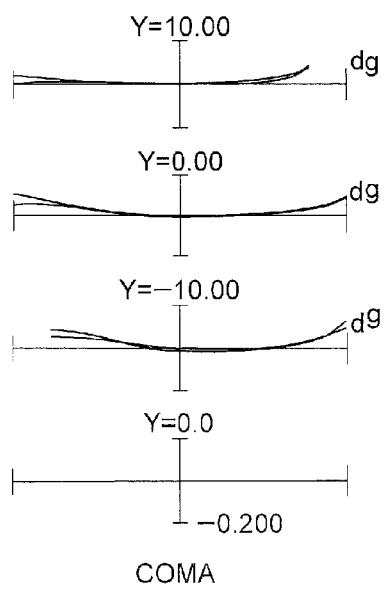
Figure 19C:
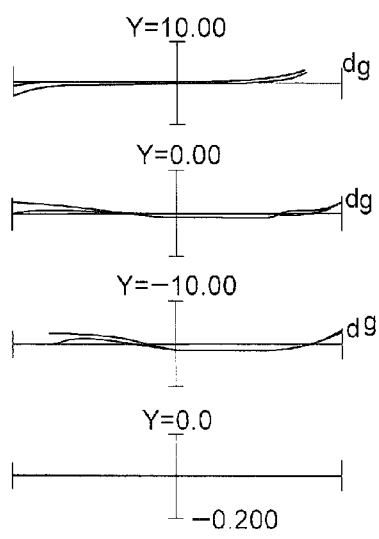

FIGS. 19A, 19B and 19C are graphs showing various aberrations of the optical system according to the fifth Example in the intermediate focal length state upon focusing on infinity, in which FIG. 19A shows various aberrations, FIG. 19B shows meridional transverse aberration upon performing correction of image blur with using the lens element A, and FIG. 19C shows meridional transverse aberration upon performing correction of image blur with using the lens element B.

Figure 20A:
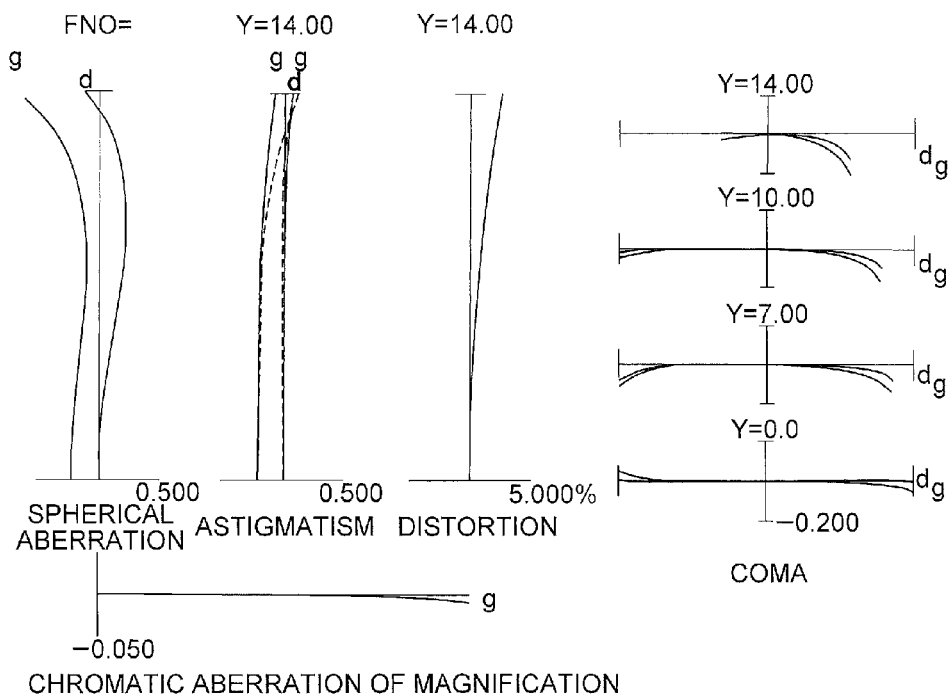
Figure 20B:
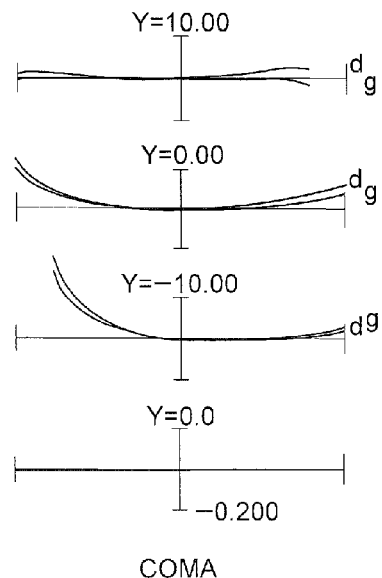
Figure 20C:
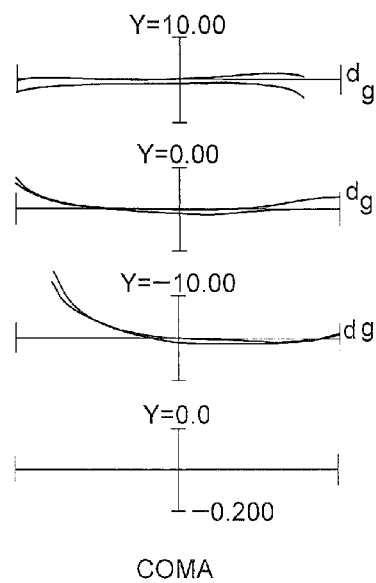

FIGS. 20A, 20B and 20C are graphs showing various aberrations of the optical system according to the fifth Example in the telephoto end state upon focusing on infinity, in which FIG. 20A shows various aberrations, FIG. 20B shows meridional transverse aberration upon performing the correction of the image blur with using the lens element A, and FIG. 20C shows meridional transverse aberration upon performing the correction of the image blur with using the lens element B.

As is apparent from the respective graphs showing aberrations, it is understood that the optical system according to the fifth Example has a superb optical performance from the wide-angle end state to the telephoto end state.

Sixth Example

FIG. 21 shows a configuration of an optical system S6 relating to the sixth Example according to the first embodiment of the present invention.

As shown in FIG. 21, the optical system S6 relating to the sixth Example is composed of, in order from an unillustrated object side, a first lens group G1 having positive refractive power, a second lens group G2 having negative refractive power, an aperture stop SP, a third lens group G3 having positive refractive power, a fourth lens group G4 having negative refractive power, and a fifth lens group G4 having positive refractive power.

The first lens group G1 is composed of, in order from the object side, a cemented lens L11 constructed by a negative meniscus lens having a convex surface facing the object side and a positive meniscus lens having a convex surface facing the object side, and a double convex lens L12.

The second lens group G2 is composed of, in order from the object side, a negative meniscus lens L21 whose object side surface is formed as an aspherical surface and which has a convex surface facing the object side, a double concave lens L22, double convex positive lens L23, and a negative meniscus lens L24 having a concave surface facing the object side.

The third lens group G3 is composed of, in order from the object side, a double convex lens L31 and a cemented lens L32 constructed by a double convex lens cemented with a negative meniscus lens having a concave surface facing the object side.

The fourth lens group G4 is composed of, in order from the object side, a cemented lens L41 constructed by a negative meniscus lens having a convex surface facing the object side cemented with a positive meniscus lens having a convex surface facing the object side, a negative meniscus lens L42 having a concave surface facing the object side, and a positive meniscus lens L43 having a concave surface facing the object side.

The fifth lens group G5 is composed of, in order from the object side, a positive meniscus lens L51 whose image plane I side is shaped as an aspherical surface and which has a concave surface facing the object side, a double convex lens L52, and a negative meniscus lens L53 having a concave surface facing the object side.

An imaging device (not shown) constructed by a CCD, a CMOS or the like is disposed on the image plane I. The aperture stop SP is disposed between the second lens group G2 and the third lens group G3 and is moved together with the third lens group G3 upon zooming from a wide angle end state to a telephoto end state.

In the optical system S6 relating to the sixth Example, upon zooming from the wide angle end state to the telephoto end state, the first lens group G1, the second lens group G2, the third lens group G3, the fourth lens group G4, and the fifth lens group G5 are moved to the object side.

Further, the optical system S6 relating to the sixth Example is so configured that the cemented lens L41 and the negative meniscus lens L42 in the fourth lens group G4 are made as a lens element A, a lens element B is composed of the lens element A and the positive meniscus lens L43 having refractive power of the different sign as that of refractive power of the lens element A, and vibration reduction lens groups are made, respectively, by the lens element A and the lens element B. Image blur is prevented by shifting either of those vibration reduction lens groups in a direction perpendicular to the optical axis.

In the optical system S6 relating to the sixth Example, the lens group for correcting image blur may be shifted by (f·tan θ)/K in a direction perpendicular to the optical axis in order to correct rotational shake of an angle θ, where f denotes a focal length of the entire optical system S6, and K denotes a vibration reduction coefficient upon correcting image blur.

In the optical system S6 relating to the sixth Example, focal lengths of the entire system in an wide angle end state, in an intermediate focal length state and in a telephoto end state are, respectively, 18.7 mm, 70.6 mm, and 188.0 mm (refer to Table 6 below). Correcting amounts of image blurs by the lens elements A, B in the respective focal lengths and moving amounts of the respective lens elements are, as follows, for example.

In the wide angle end state of the optical system S6 relating to the sixth Example, in the case of the lens element A, the vibration reduction coefficient K upon correcting the image blur is 1.06 and the focal length is 18.7 mm, so the moving amount of the lens element A for correcting rotational shake of 1.446° is 0.446 mm; in the case of the lens element B, the vibration reduction coefficient K upon correcting the image blur is 0.62 and the focal length is 18.7 mm, so the moving amount of the lens element B for correcting rotational shake of 0.848° is 0.446 mm.

Further, in the intermediate focal length state of the optical system S6 relating to the sixth Example, in the case of the lens element A, the vibration reduction coefficient K upon correcting the image blur is 1.73 and the focal length is 70.6 mm, so the moving amount of the lens element A for correcting rotational shake of 0.631° is 0.446 mm; in the case of the lens element B, the vibration reduction coefficient K upon correcting the image blur is 0.99 and the focal length is 70.6 mm, so the moving amount of the lens element B for correcting rotational shake of 0.360° is 0.446 mm.

Further, in the telephoto end state of the optical system S6 relating to the sixth Example, in the case of the lens element A, the vibration reduction coefficient K upon correcting the image blur is 2.21 and the focal length is 188.0 mm, so the moving amount of the lens element A for correcting rotational shake of 0.300° is 0.446 mm; in the case of the lens element B, the vibration reduction coefficient K upon correcting the image blur is 1.25 and the focal length is 188.0 mm, so the moving amount of the lens element B for correcting rotational shake of 0.169° is 0.446 mm.

As described above, in the sixth Example, the vibration reduction coefficients K of the lens element B and the lens element A become larger in this order, so if image blur is corrected by the lens element A, more corrections of image blur become possible than corrections by the lens element B. In other words, if the focal lengths are the same and the moving amounts of the lens elements A and B are the same, as described above, the correcting amount by the lens element A is more than that by the lens element B. Accordingly, if control is made such that when correcting amount is small, the lens element B is driven, and when correcting amount increases and reaches a predetermined value, the lens element A is driven, such a control makes it possible to conduct more corrections without increasing the moving amounts of the vibration reduction lenses even if correcting amounts become larger. As a result, it becomes possible to make the shifting amount proper without shifting largely the vibration lens groups from the wide angle end state to the telephoto end state.

Various values associated with the optical system S6 relating to the sixth Example of the first embodiment according to the present invention are listed in Table 6 below.

TABLE 6

Sixth Example (Entire Specification)

| | W | M | T |
|---|---|---|---|
| f = | 18.7 | 70.0 | 188.0 |
| FNO = | 3.55 | 5.39 | 6.91 |
| TL = | 129.7 | 182.7 | 222.5 |

(Surface Data)

| m | r | d | νd | nd |
|---|---|---|---|---|
| op | ∞ | | | |
| 1) | 88.3686 | 1.4 | 37.18 | 1.834 |
| 2) | 51.2341 | 9.8 | 82.57 | 1.49782 |
| 3) | 588.9823 | 0.12 | | |
| 4) | 65.0932 | 6.4 | 82.57 | 1.49782 |
| 5) | −3559.6410 | D5 | | |
| *6) | 37.4711 | 1.2 | 47.25 | 1.77377 |
| 7) | 10.8979 | 6.4 | | |
| 8) | −29.5092 | 1.0 | 40.66 | 1.88300 |
| 9) | 58.3390 | 0.15 | | |
| 10) | 26.3202 | 4.22 | 23.8 | 1.84666 |
| 11) | −34.7037 | 1.05 | | |
| 12) | −18.6800 | 1.0 | 46.6 | 1.80400 |
| 13) | −67.5427 | D13 | | |
| 14> | ∞ | 1.63 | | Aperture Stop |
| 15) | 23.9912 | 3.18 | 82.57 | 1.49782 |
| 16) | −62.5375 | 0.12 | | |
| 17) | 33.2119 | 4.26 | 82.57 | 1.49782 |
| 18) | −21.0524 | 0.9 | 25.45 | 1.80518 |
| 19) | −74.2470 | D19 | | |
| 20) | 358.8111 | 0.8 | 52.77 | 1.74100 |
| 21) | 18.2134 | 2.5 | 25.45 | 1.80518 |
| 22) | 45.8626 | 2.0 | | |
| 23) | −50.0000 | 0.8 | 54.61 | 1.72916 |
| 24) | −254.5612 | 1.2 | | |
| 25) | −248.3650 | 1.9 | 65.44 | 1.60300 |
| 26) | −49.5474 | D26 | | |
| 27) | −30.0000 | 4.0 | 82.47 | 1.49697 |
| *28) | −20.4714 | 0.08 | | |
| 29) | 43.8397 | 4.25 | 70.31 | 1.48749 |
| 30) | −31.5343 | 1.4 | | |
| 31) | −16.1983 | 1.63 | 37.18 | 1.83400 |
| 32) | −30.0990 | BF | | |
| I | ∞ | | | |

(Aspherical Surface data)

Surface Number: 6

κ = −30.2672
A4 = 7.83E−05
A6 = −5.54E−07
A8 = 3.32E−09
A10 = −1.18E−11
A12 = 1.88E−14

TABLE 6-continued

Sixth Example

Surface Number: 28

κ = −4.9613
A4 = −9.15E−05
A6 = 3.67E−07
A8 = −3.27E−09
A10 = 1.76E−11
A12 = −6.39E−14

(Variable Distance Data)

| | W | M | T |
|---|---|---|---|
| D5 | 1.0 | 36.0 | 56.8 |
| D13 | 23.9 | 8.3 | 1.0 |
| D19 | 0.9 | 0.9 | 1.9 |
| D26 | 1.8 | 1.8 | 2.3 |
| BF | 38.7 | 72.4 | 96.6 |

(Values for Conditional Expressions)

fA = −42.2
fB = −76.8
(5) |fA| < |fB|: 42.2 < 76.8
(6) |fA|/|fB| = 0.55

Figure 22A:
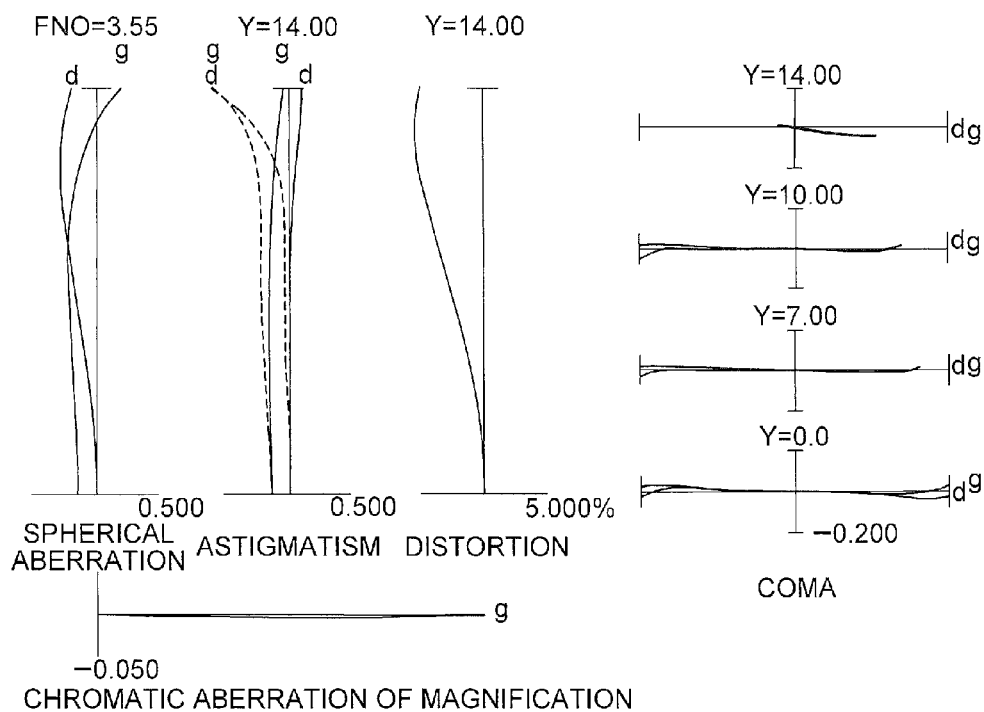
Figure 22B:
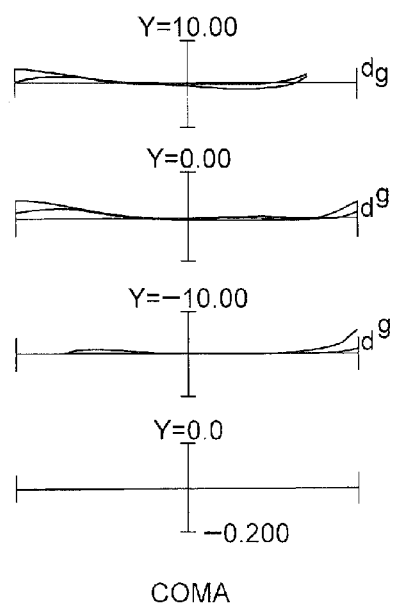
Figure 22C:
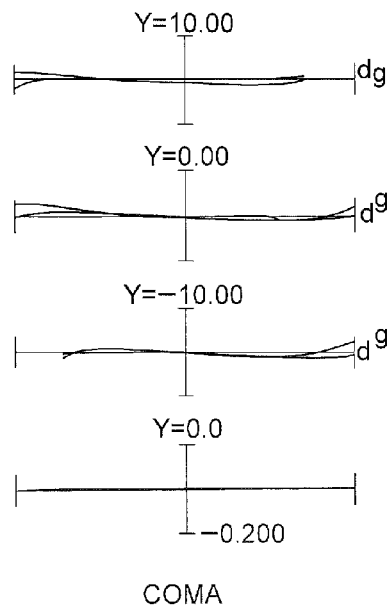

FIGS. 22A, 22B and 22C are graphs showing various aberrations of the optical system according to the sixth Example in the wide-angle end state upon focusing on infinity, in which FIG. 22A shows various aberrations, FIG. 22B shows meridional transverse aberration upon performing a correction of an image blur with using the lens element A, and FIG. 22C shows meridional transverse aberration upon performing the correction of the image blur with using the lens element B.

FIGS. 23A, 23B and 23C are graphs showing various aberrations of the optical system according to the sixth Example in the intermediate focal length state upon focusing on infinity, in which FIG. 23A shows various aberrations, FIG. 23B shows meridional transverse aberration upon performing the correction of the image blur with using the lens element A, and FIG. 23C shows meridional transverse aberration upon performing the correction of the image blur with using the lens element B.

Figure 24A:
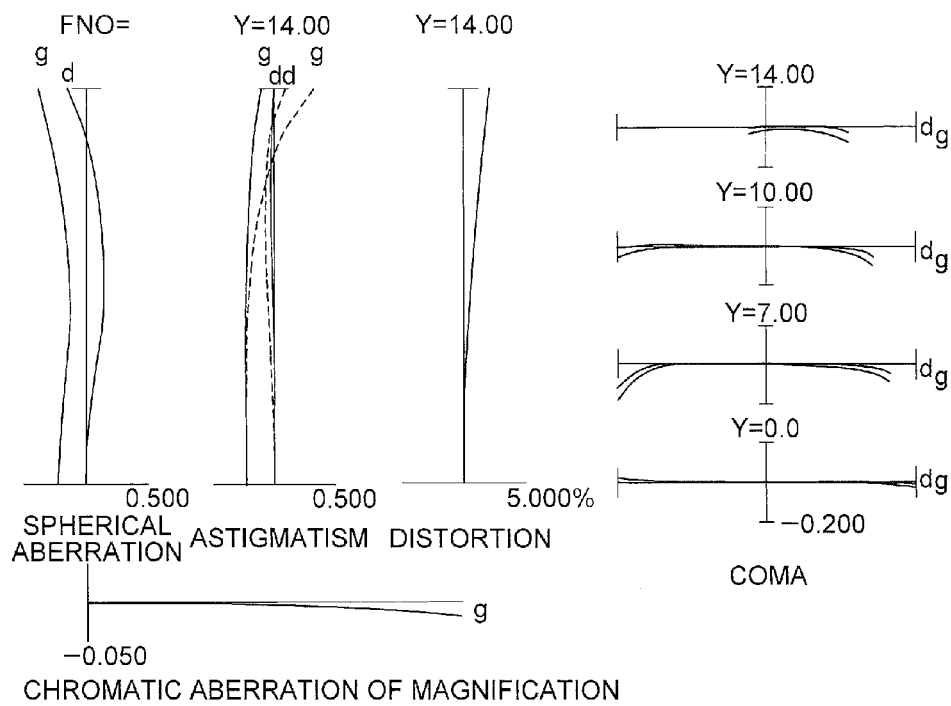
Figure 24B:
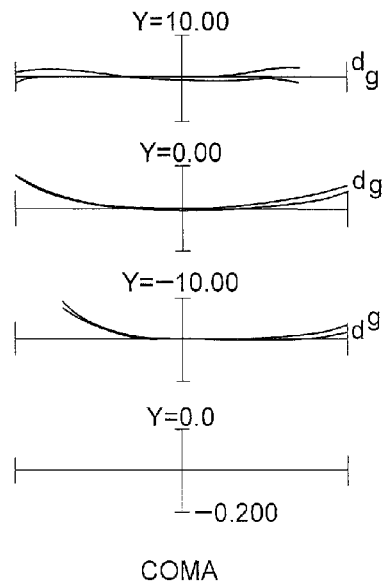
Figure 24C:
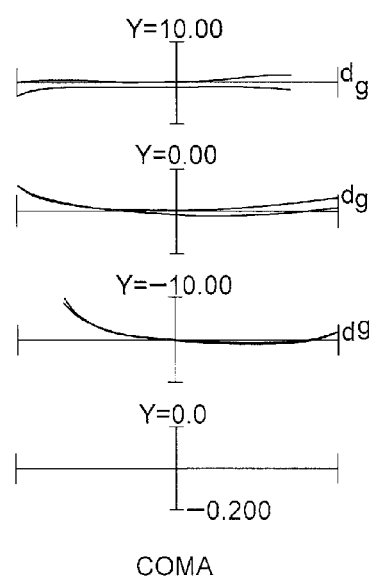

FIGS. 24A, 24B and 24C are graphs showing various aberrations of the optical system according to the sixth Example in the telephoto end state upon focusing on infinity, in which FIG. 24A shows various aberrations, FIG. 24B shows meridional transverse aberration upon performing the correction of the image blur with using the lens element A, and FIG. 24C shows meridional transverse aberration upon performing the correction of the image blur with using the lens element B.

As is apparent from the respective graphs showing aberrations, it is understood that the optical system S6 according to the sixth Example has a superb optical performance from the wide-angle end state to the telephoto end state.

As described above, according to the respective Examples of said first embodiment, an optical system having a superb Vibration reduction function may be realized.

Second Embodiment

An optical system and an imaging apparatus relating to the second embodiment according to the present invention are explained below.

At first, an optical system relating to the second embodiment according to the present invention is explained. The optical system relating to the second embodiment according to the present invention is an optical system which has a vibration reduction function.

The optical system relating to the second embodiment according to the present invention comprises a first lens element and a second lens element which are respectively shiftable to have a component in a direction perpendicular to the optical axis, either said first lens element or said second lens element being shifted, upon zooming from a wide angle end state to a telephoto end state, such that a component in a direction perpendicular to the optical axis may be included, in accordance with variation in a focal length in the wide angle end state to the telephoto end state, thereby performing correction of an image plane.

Here, it is noted that the term "lens element" throughout the present specification means one unit that comprises a single lens or a plurality of lenses.

Generally, in a vibration reduction lens group for carrying out a correction of an image plane in order to correct image blur caused by camera shake or the like, when an optical system is in a wide angle state, a shifting amount is small and increases if the optical system changes to a telephoto end state.

According to the optical system of the second embodiment of the present invention, it is possible to attain excellent vibration reducing effect without increasing a shifting amount of the vibration reduction lens group even in the telephoto end state.

A control section determines which one of the first lens element and the second lens element is shifted, based on a focal length of the entire optical system at the time when image blur is corrected. FIG. 50 shows a schematic view illustrating an example of a configuration on a vibration reduction function in the optical system according to the present invention. The control section 21 calculates a correcting amount of the image blur, based on angular velocity, that is, magnitude and orientation of inclination of an imaging apparatus body 31, detected by a plurality of angular velocity sensors 23, 23. The control section 21, in response to the focal length at the time when the image blur correction is conducted, determines which of the lens elements 25a and 25b is shifted. The control section 21 controls such that a drive device 27 such as a motor drives the determined lens element (for example, lens element 25a) in a direction in which the inclination of the imaging apparatus body 31 is eliminated, whereby an image plane correction is performed. Incidentally, the control section 21 may be provided in the imaging apparatus body 31, or may be built in a lens barrel 29 in which the optical system is disposed.

By such a configuration, the optical system relating to the second embodiment according to the present invention can perform superb corrections of curvature of field for any focal lengths.

By such a configuration according to the present invention, an optical system having more suitable vibration reduction function may be realized by satisfying the following conditional expressions (7), (8) and (9).

$$|fB'|<|fA'| \quad (7)$$

$$fw \leq fh \leq (|fB'|/|fA'|) \times ft \times 1.50 \quad (8)$$

$$(|fB'|/|fA'|) \times ft \times 0.50 \leq fk \leq ft \quad (9)$$

where fA' denotes a focal length of the first lens element,
fB' denotes a focal length of the second lens element,
fw denotes a focal length of the entire optical system in a wide angle end state, ft denotes a focal length of the entire optical system in a telephoto end state, fh denotes a focal length of the entire optical system in a telephoto end state upon performing correction of an image plane by the first lens element, and fk denotes a focal length of the entire optical system upon performing correction of the image plane by the second lens element.

The conditional expression (7) defines a focal length of a lens element by which a correction of the image plane is performed.

With satisfying the conditional expression (7), a moving amount of a lens element for performing an image plane correction upon performing the image plane correction, may be made small and coma may be corrected well.

The conditional expression (8) defines a range of a focal length of the entire optical system in a case where an image plane correction is performed by the first lens element. With satisfying the conditional expression (8), the image plane may be corrected efficiently. When the value of fh exceeds the upper limit value of the conditional expression (8), a moving amount of the lens element for performing the image plane correction is increased, and coma can not be corrected well, so that it is not preferable.

The conditional expression (9) defines a range of a focal length of the entire optical system in a case where the image plane correction is performed by the second lens element. With satisfying the conditional expression (9), the image plane may be corrected efficiently. When the value of fk falls below the lower limit value of the conditional expression (9), a power of the lens element that performs the image plane correction is too strong and curvature of field upon correcting the image plane cannot be corrected well, so that it is not preferable.

Incidentally, in order to secure the effect of the present invention, it is preferable to set the upper limit of the conditional expression (8) to $(|fB'|/|fA'|) \times ft \times 1.15$. Further, in order to secure the effect of the present invention, it is preferable to set the lower limit of conditional expression (9) to $(|fB'|/|fA'|) \times ft \times 0.70$.

Further, it is preferable that the optical system relating to the second embodiment satisfies the following conditional expression (10)

$$0.40<|ZSw|/|LSw|<1.50 \quad (10)$$

where ZSw denotes a moving amount of an image on an image forming plane in a wide angle end state, and LSw denotes a shifting amount of a lens element that performs an image plane correction in a wide angle end state.

With satisfying the conditional expression (10), curvature of field may be corrected well.

In order to secure the effect of the present invention, it is preferable to set the lower limit of the conditional expression (10) to 0.45. Further, in order to secure the effect of the present invention, it is preferable to set the upper limit of the conditional expression (10) to 1.40.

Furthermore, it is preferable that the optical system relating to the second embodiment of the present invention satisfies the following conditional expression (11):

$$1.00<|ZSt|/|LSt|<2.70 \quad (11)$$

where ZSt denotes a moving amount of an image on an image forming plane in a telephoto end state, and LSt denotes a shifting amount of a lens element that performs an image plane correction in a telephoto end state.

With satisfying the conditional expression (11), it is possible to correct well curvature of field.

In order to secure the effect of the present invention, it is preferable to set the lower limit of the conditional expression (11) to 1.1. Further, in order to secure the effect of the present invention, it is preferable to set the upper limit of conditional expression (11) to 2.6.

Furthermore, it is preferable that the optical system relating to the second embodiment of the present invention satisfies the following conditional expressions (12) and (13):

$$80.0 < \sqrt{(|fA'| \times fh)}/LS < 230.0 \quad (12)$$

$$80.0 < \sqrt{(|fB'| \times fk)}/LS < 230.0 \quad (13)$$

where fA' denotes a focal length of the first lens element, fB' denotes a focal length of the second lens element, fh denotes a focal length of the entire optical system upon performing a correction of an image plane by the first lens element, fk denotes a focal length of the entire optical system upon performing a correction of an image plane by the second lens element, and LS denotes a shifting amount of a lens element that performs correction of an image plane upon performing the correction of the image plane.

With satisfying the conditional expressions (12) and (13), it is possible to correct well curvature of field while maintaining the moving amount of the lens element that performs the correction of the image plane, small.

In order to secure the effect of the present invention, it is preferable to set the lower limit of the respective conditional expressions (12) and (13) to 85.0. Further, in order to secure the effect of the present invention, it is preferable to set the upper limit of the respective conditional expressions (12) and (13) to 215.0.

Further, in the optical system relating to the second embodiment of the present invention, it is preferable that the first and the second lens elements have a cemented lens. By such a structure, it is possible to maintain chromatic aberration of magnification well upon correcting the image plane.

Further, it is preferable that the optical system relating to the second embodiment of the present invention comprises a first lens element, a second lens element and a third lens element which are respectively shiftable such that a component in a direction perpendicular to the optical axis may be included, and the optical system performs correction of the image plane by any one of the first lens element, the second lens element and the third lens element being shifted, upon zooming from a wide angle end state to a telephoto end state, such that a component in a direction perpendicular to the optical axis may be included, in accordance with variation in a focal length in the wide angle end state to the telephoto end state, and satisfies the following conditional expressions (14), (15), (16) and (17):

$$|fC'| < |fB'| < |fA'| \quad (14)$$

$$fw \leq fh \leq (|fC'|/|fA'|) \times ft \times 0.88 \quad (15)$$

$$(|fC'|/|fA'|) \times ft \times 0.62 \leq fk \leq (|fC'|/|fB'|) \times ft \times 1.30 \quad (16)$$

$$(|fC'|/|fB'|) \times ft \times 0.92 \leq fl \leq ft \quad (17)$$

where fA' denotes a focal length of the first lens element, fB' denotes a focal length of the second lens element, fC' denotes a focal length of the third lens element, fw denotes a focal length of the entire optical system in a wide angle end state, ft denotes a focal length of the entire optical system in a telephoto end state, fh denotes a focal length of the entire optical system upon performing a correction of an image plane by the first lens element, fk denotes a focal length of the entire optical system upon performing a correction of the image plane by the second lens element, and fl denotes a focal length of the entire optical system upon performing a correction of the image plane by the third lens element.

By such a configuration, the optical system relating to the second embodiment of the present invention can realize an optical system having a suitable vibration reduction function.

As to which of the first lens element, the second lens element and the third lens elements shifted, the control section 21 determines in accordance with a focal length of the entire optical system upon correcting the image blur, in the same manner as described above with use of FIG. 50.

The conditional expression (14) defines a focal length of a lens element by which the correction of the image plane is performed.

With satisfying the conditional expression (14), a moving amount of the lens element for performing the image plane correction upon performing the image plane correction, may be made small and coma may be corrected well.

The conditional expression (15) defines a range of a focal length of the entire optical system in a case where the first lens element performs an image plane correction.

With satisfying the conditional expression (15), the image plane correction can be performed efficiently. If the value of fh exceeds the upper limit value of the conditional expression (15), a moving amount of the lens element that performs the image plane correction increases, and coma upon correcting the image plane cannot be corrected well, so it is not preferable.

The conditional expression (16) defines a range of a focal length of the entire optical system in a case where the second lens element performs an image plane correction.

With satisfying the conditional expression (16), the image plane correction can be performed efficiently.

If the value of fk falls below the lower limit value of the conditional expression (16), a power of the lens element that performs the image plane correction is too strong, and curvature of field upon correcting the image plane cannot be corrected well, so it is not preferable.

If the value of fk exceeds the upper limit value of the conditional expression (16), a moving amount of the lens element that performs the image plane correction increases, and coma upon correcting the image plane cannot be corrected well, so it is not preferable.

The conditional expression (17) defines a range of a focal length of the entire optical system in a case where the third lens element performs the image plane correction.

With satisfying the conditional expression (17), the image plane correction can be performed efficiently.

If the value of fl falls below the lower limit value of the conditional expression (17), a power of the lens element that performs the image plane correction becomes too strong, and coma and curvature of field upon correcting the image plane cannot be corrected well, so it is not preferable.

As shown by the conditional expressions (15) and (16), there is an overlapping range in the range of fh (a focal length of the entire optical system upon performing a correction of the image plane by the first lens element) defined by the conditional expression (15) and a range fk (a focal length of the entire optical system upon performing a correction of the image plane by the second lens element) defined by the conditional expression (16). A focal length of the entire optical system upon changing a lens element to be shifted from the first lens element to the second lens element or from the second lens element to the first lens element is included in the overlapping range. There are various control methods which may be adopted as to which value in the overlapping range is selected in order to change the element. For example, it is possible to control such that changing of the element may be made when a focal length of the entire optical system becomes a predetermined value within the overlapping range in both the cases where zooming is conducted from the wide angle end state to the telephoto end state and where zooming is conducted from the telephoto end state to the wide angle end state. Alternatively, for example, it is possible to control such that, when zooming is performed from the wide angle end state to the telephoto end state, changing from the first lens element to the second lent element is made at the time when the value of the conditional expression (16) becomes the lower limit value, and when zooming is performed from the telephoto end state to the wide angle end state, changing from the second lens element to the first lens element is made at the time when the value of the conditional expression (15) becomes the upper limit value. Alternatively, for example, when the focal length of the entire optical system is within the overlapping range, the control section 21 may irregularly select either one of the first lens element or the second lens element.

In the conditional expression (16) and the conditional expression (17) also, there is an overlapping range in the range of fk (a focal length of the entire optical system upon performing correction of an image plane by the second lens element) defined by the conditional expression (16) and a range fl (a focal length of the entire optical system upon performing correction of an image plane by the third lens element) defined by the conditional expression (17). In this case also, the similar control method as above described may be adopted.

In order to secure the effect of the present invention, it is preferable to set the upper limit value of the conditional expression (15) to $(|fC'|/|fA'|) \times ft \times 0.85$. Further, in order to secure the effect of the present invention, it is preferable to set the lower limit value of the conditional expression (16) to $(|fC'|/|fA'|) \times ft \times 0.60$. Further, in order to secure the effect of the present invention, it is preferable to set the upper limit value of the conditional expression (16) to $(|fC'|/|fB'|) \times ft \times 1.25$. Further, in order to secure the effect of the present invention, it is preferable to set the lower limit of the conditional expression (17) to $(|fC'|/|fB'|) \times ft \times 0.95$.

Further, it is preferable that the optical system relating to the second embodiment satisfies the following conditional expression (18)

$$0.40 < |ZSw|/|LSw| < 1.40 \tag{18}$$

where ZSw denotes a moving amount of an image on an image forming plane in a wide angle end state, and LSw denotes a shifting amount of a lens element that performs an image plane correction in a wide angle end state.

With satisfying the conditional expression (18), the curvature of field can be corrected well.

Furthermore, it is preferable that the optical system relating to the second embodiment of the present invention satisfies the following conditional expression (19):

$$1.10 < |ZSt|/|LSt| < 2.60 \tag{19}$$

where ZSt denotes a moving amount of image on an image forming plane in a telephoto end state, and LSt denotes a shifting amount of a lens element that performs an image plane correction in a telephoto end state.

With satisfying the conditional expression (19), it is possible to correct well a curvature of field.

Further, it is preferable that the optical system relating to the second embodiment of the present invention satisfies the following conditional expressions (20), (21) and (22)

$$90.0 < \sqrt{(|fA'| \times fh)}/LS < 230.0 \tag{20}$$

$$90.0 < \sqrt{(|fB'| \times fk)}/LS < 230.0 \tag{21}$$

$$90.0 < \sqrt{(|fC'| \times fl)}/LS < 230.0 \tag{22}$$

where fA' denotes a focal length of the first lens element that performs an image plane correction, fB' denotes a focal length of the second lens element that performs an image plane correction, fC' denotes a focal length of the third lens element that performs an image plane correction, fh denotes a focal length of the entire optical system upon performing an image plane correction by the first lens element, fk denotes a focal length of the entire optical system upon performing an image plane correction by the second lens element, fl denotes a focal length of the entire optical system upon performing an image plane correction by the third lens element, and LS denotes a shifting amount of the lens element that performs the image plane correction upon performing the image plane correction.

With satisfying the conditional expressions (20), (21) and (22), the curvature of field can be excellently corrected while a moving amount of the lens element that performs the image plane correction is maintained small.

Further, it is preferable that in the optical system relating to the second embodiment of the present invention, the first lens element, the second lens element and the third lens element, each includes a cemented lens. By such a configuration, chromatic aberration of magnification upon correcting the image plane may be maintained well.

Further, an imaging apparatus of the second embodiment according to the present invention is characterized in being equipped with the optical system having a configuration described above, whereby a suitable imaging apparatus may be realized.

Next, a method for manufacturing an optical system according to the second embodiment of the present invention, is explained.

Figure 48:
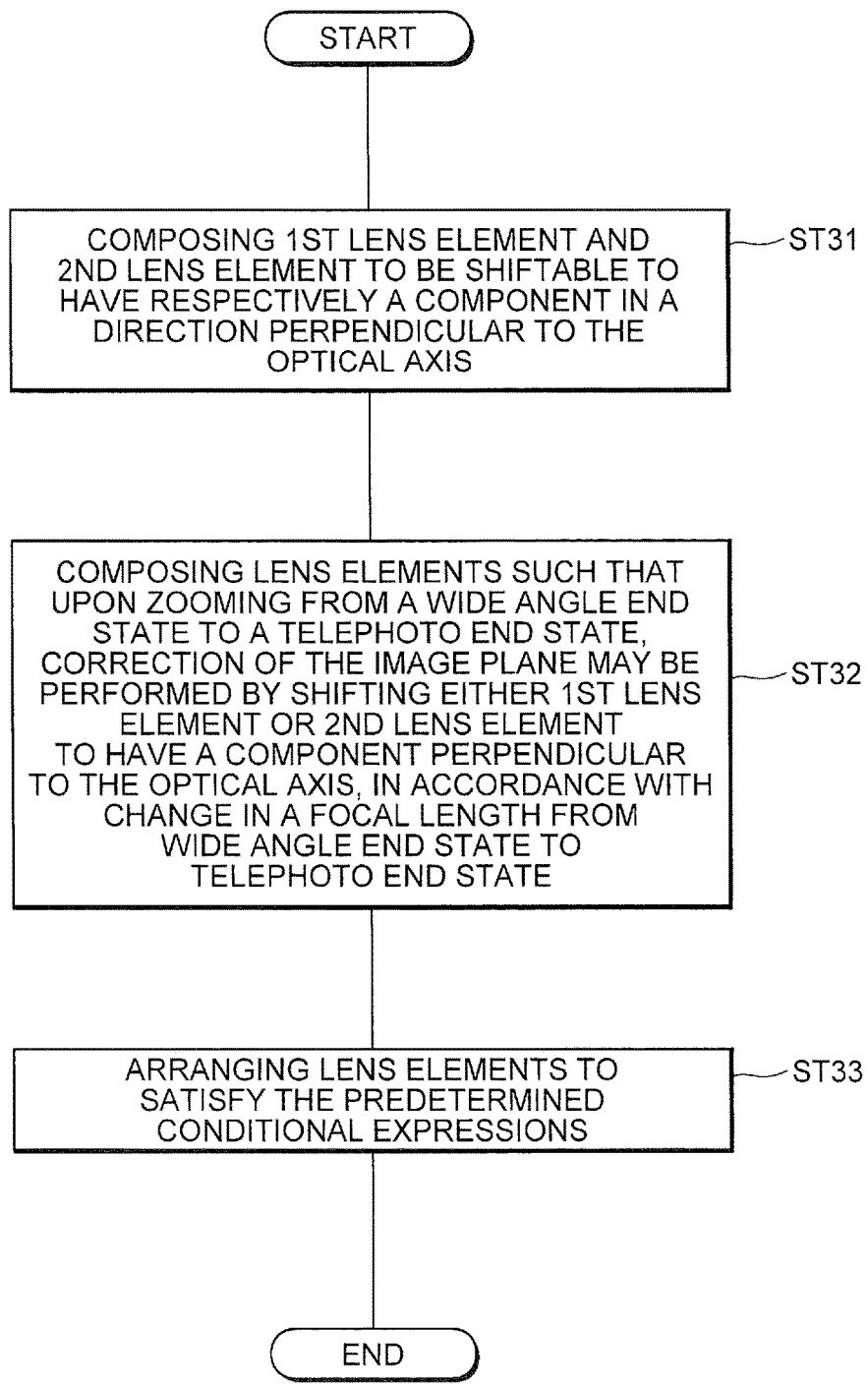
FIG. 48 is a view showing schematically a method for manufacturing an optical system relating to the second embodiment of the present invention.
Figure 49:
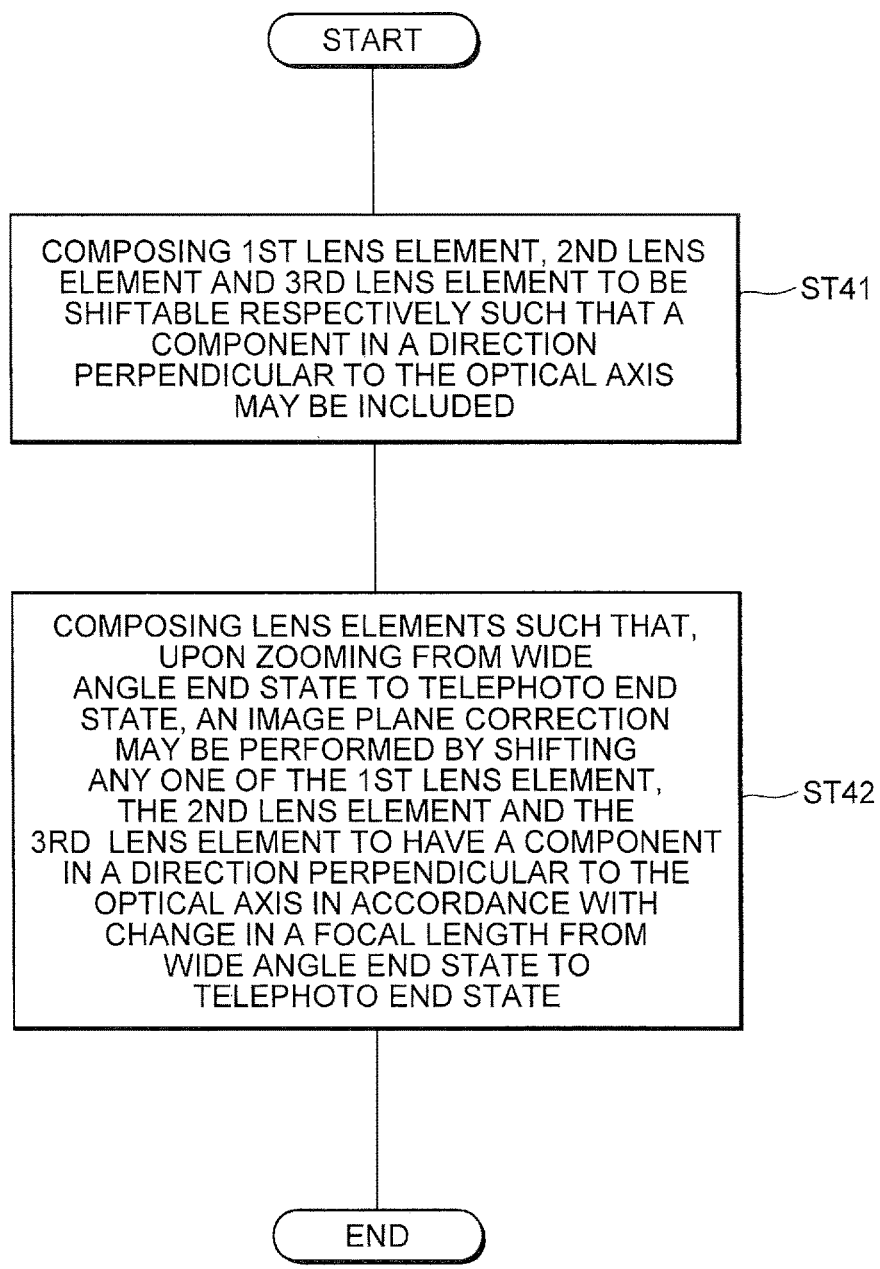
FIG. 49 is a view showing schematically a method for manufacturing an optical system relating to the second embodiment of the present invention.

FIGS. 48 and 49 are views schematically showing respectively methods for manufacturing optical systems according to the second embodiment of the present invention.

The method for manufacturing an optical system according to the second embodiment of the present invention is for manufacturing an optical system comprising a first lens element and a second lens element and comprises the following steps ST31 to ST33, as shown FIG. 48:

(Step ST31): Composing the first lens element and the second lens element to be respectively shiftable to have a component in a direction perpendicular to the optical axis.

(Step ST32): Composing the lens elements such that upon zooming from a wide angle end state to a telephoto end state, correction of the image plane may be performed by shifting either said first lens element or said second lens element in a direction including a component perpendicular to the optical axis, in accordance with change in a focal length from the wide angle end state to the telephoto end state.

(Step ST33): Arranging the lens elements such that the following conditional expressions (7), (8) and (9) may be satisfied:

$$|fB'|<|fA'| \qquad (7)$$

$$fw \leq fh \leq (|fB'|/|fA'|) \times ft \times 1.50 \qquad (8)$$

$$(|fB'|/|fA'|) \times ft \times 0.50 \leq fk \leq ft \qquad (9)$$

where fA' denotes a focal length of the first lens element, fB' denotes a focal length of the second lens element, fw denotes a focal length of the entire optical system in a wide angle end state, ft denotes a focal length of the entire optical system in a telephoto end state, fh denotes a focal length of the entire optical system upon performing a correction of an image plane by the first lens element, and fk denotes a focal length of the entire optical system upon performing a correction of the image plane by the second lens element.

Further, a method for manufacturing an optical system according to the second embodiment of the present invention is for manufacturing an optical system and comprising a first lens element, a second lens element and a third lens element and comprises the following steps ST41 to ST42, as shown in FIG. 49.

(Step ST41): Composing the first lens element, the second lens element and the third lens element to be shiftable respectively such that a component in a direction perpendicular to the optical axis may be included.

(Step ST42): Composing each lens element such that, upon zooming from the wide angle end state to the telephoto end state, an image plane correction may be performed by shifting any one of said first lens element, said second lens element and said third lens element to have a component in a direction perpendicular to the optical axis in accordance with change in a focal length from the wide angle end state to the telephoto end state.

According to the method for manufacturing an optical system according to the second embodiment of the present invention, as described above, it is possible to manufacture a suitable optical system.

Numerical Examples

Next, the optical systems relating to numerical examples according to the second embodiment of the present invention are explained with reference to the accompanying drawings. FIG. 27, FIG. 31, FIG. 35, FIG. 39, and FIG. 43 show respectively cross sections of configurations of the respective optical systems S7 to S11 relating to the respective examples, in which arrows show variations in focusing states from wide angle end states to telephoto end states upon focusing on infinity of these optical systems S7 to S11.

Seventh Example

Figure 27:
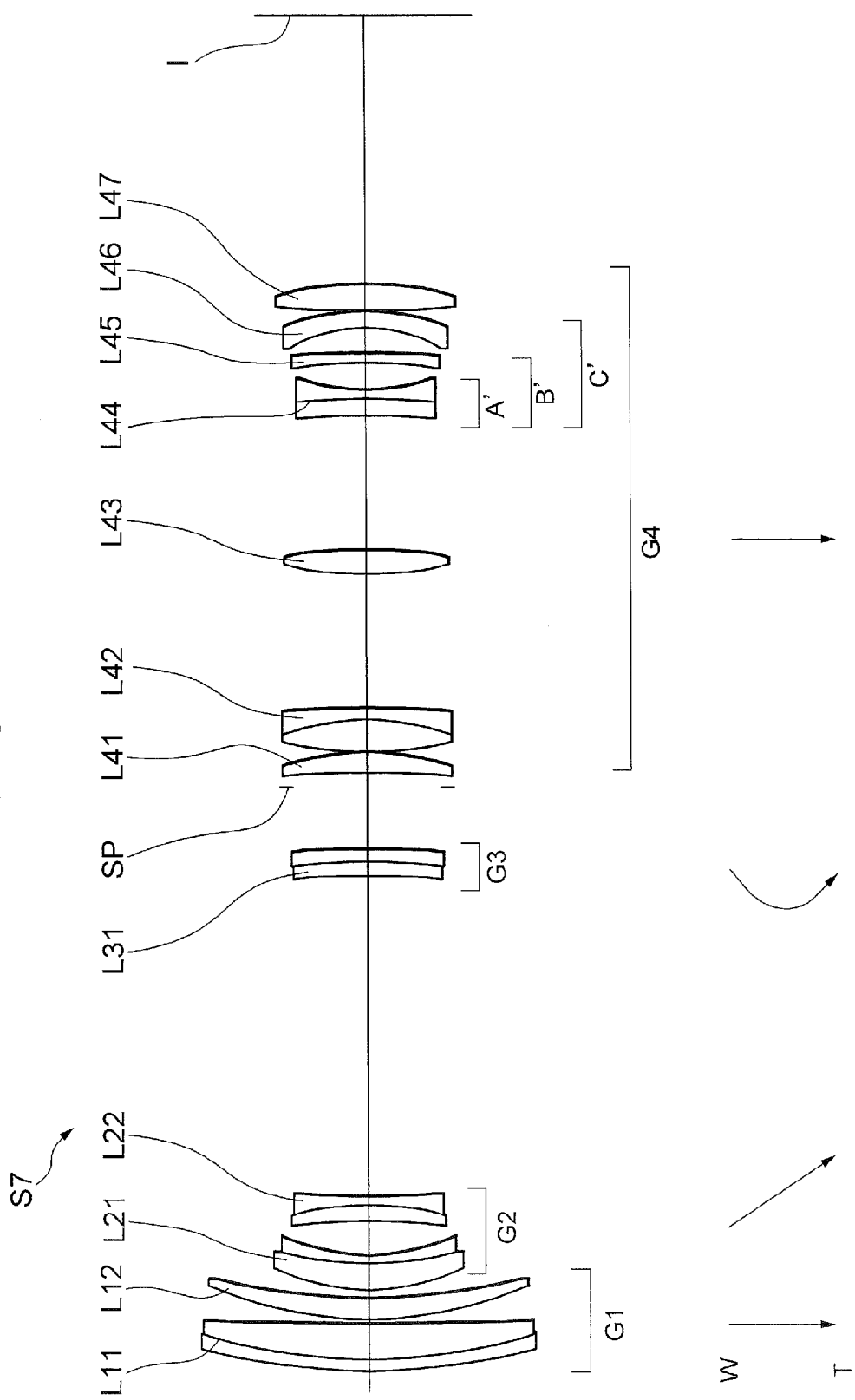
FIG. 27 is a view showing a configuration of an optical system relating to a seventh example according to a second embodiment of the present invention.

FIG. 27 shows a configuration of an optical system S7 relating to a Seventh Example according to the second embodiment of the present invention.

As shown in FIG. 27, the optical system S7 relating to the Seventh Example is composed of, in order from an unillustrated object side, a first lens group G1 having positive refractive power, a second lens group G2 having negative refractive power, a third lens group G3 having negative refractive power, an aperture stop SP and a fourth lens group G4 having positive refractive power.

The first lens group G1 is composed of, in order from the object side, a cemented lens L11 constructed by a negative meniscus lens having a convex surface facing the object side cemented with a positive meniscus lens having a convex surface facing the object, and a positive meniscus lens L12 having a convex surface facing the object side.

The second lens group G2 is composed of, in order from the object side, a cemented lens L21 constructed by a positive meniscus lens having a convex surface facing the object side cemented with a negative meniscus lens having a convex surface facing the object side, and a cemented lens L22 constructed by a positive meniscus lens having a concave surface facing the object side cemented with a double concave negative lens.

The third lens group G3 is composed of a cemented lens L31 constructed by, in order from the object side, a positive meniscus lens having a concave surface facing the object side cemented with a negative meniscus lens having a concave surface facing the object side.

The fourth lens group G4 is composed of, in order from the object side, a positive meniscus lens L41 having a concave surface facing the object side, a cemented lens L42 constructed by a double convex positive lens cemented with a negative meniscus lens having a convex surface facing the image plane I side, a double convex positive lens L43, a cemented lens L44 constructed by a positive meniscus lens having a concave surface facing the object side cemented with a double concave negative lens, a negative meniscus lens L45 having a concave surface facing the object side, a negative meniscus lens L46 having a concave surface facing the object side, and a double convex positive lens L47.

An imaging device (not shown) constructed by CCD, CMOS or the like is disposed on the image plane I. The aperture stop SP is disposed between the third lens group G3 and the fourth lens group G4. The arrangement of the imaging device and the aperture stop SP is the same in the respective Examples described hereinafter.

In the optical system S7 relating to the Seventh Example, upon zooming from a wide angle end state to a telephoto end state, the first lens group G1 is fixed with respect to the image plane I, the second lens group G2 is moved to the image plane I side, the third lens group G3 is moved with a substantially concave trajectory toward the image plane I side, and the fourth lens group G4 is fixed with respect to the image plane I.

Further, the optical system S7 relating to the seventh Example is so configured that, as shown in FIG. 27, the cemented lens L44 in the fourth lens group G4 is made as a lens element A', a lens element B' is composed of the lens element A' and the negative meniscus lens L45 having refractive power of the same sign as that of refractive power of the lens element A', a lens element C' is composed of the lens element B' and the negative meniscus lens L46 having refractive power of the same sign as that of refractive power of the lens element B' and vibration reduction lens groups are made by these lens element A', lens element B' and lens element C'. Image blur is prevented by shifting any one of those vibration reduction lens groups such that a component in a direction perpendicular to the optical axis may be included.

In the optical system S7 relating to the seventh Example, a lens group for correcting the image blur may be shifted by (f·tan θ)/K in a direction perpendicular to the optical axis in order to correct rotational shake of an angle θ, where f denotes a focal length of the entire optical system S7, and K denotes a ratio of a moving amount of an image on the image plane I with respect to a moving amount of the vibration reduction lens group upon correcting the image blur (hereinafter, this ratio is called vibration reduction coefficient K).

In the optical system S7 relating to the seventh Example, focal lengths of the entire system in an wide angle end state, in an intermediate focal length state and in a telephoto end state are, respectively, 95.0 mm, 163.1 mm, and 226.6 mm (refer to Table 1 below). Correcting amounts of image blurs by the lens elements A', B', and C' in the respective focal lengths and moving amounts of the respective lens elements at the respective times are, as below, for example:

In the wide angle end state of the optical system S7 relating to the second Example, in the case of the lens element A', the vibration reduction coefficient K upon correcting the image blur is 1.26 and the focal length is 95.0 mm, so the moving amount of the lens element A' for correcting rotational shake of 0.324° is 0.428 mm.

Further, in the intermediate focal length state of the optical system S7 relating to the seventh Example, in the case of the lens element B', the vibration reduction coefficient K upon correcting the image blur is 1.37 and the focal length is 163.1 mm, so the moving amount of the lens element B' for correcting rotational shake of 0.247° is 0.515 mm. It is noted here that, in a case where the same image blur as this is corrected by the lens element A' in the intermediate focal length state, the vibration reduction coefficient K is 1.26 and the focal length is 163.1 mm, so the moving amount of the lens element A' for correcting rotational shake of 0.247° is 0.558 mm. Accordingly, if the amounts of the blurs to be corrected are the same, a moving amount of the vibration reduction lens group in a case where the blur correction is conducted by the lens element B' becomes smaller than that in a case where the blur correction is conducted by the lens element A'.

Further, in the telephoto end state of the optical system S7 relating to the seventh Example, in the case of the lens element C', the vibration reduction coefficient K upon correcting the image blur is 1.69 and the focal length is 226.6 mm, so the moving amount of the lens element C' for correcting rotational shake of 0.210° is 0.492 mm. It is noted here that, in a case where the same image blur as this is corrected by the lens element A' in the telephoto end state, the vibration reduction coefficient K is 1.26 and the focal length 226.6 mm, so the moving amount of the lens element A' for correcting rotational shake of 0.210° is 0.659 mm. And, in the case where the lens element B' is used, the vibration reduction coefficient K is 1.37 and the focal length is 226.6 mm, so the moving amount of the lens element B' for correcting rotational shake of 0.210° is 0.606 mm. Accordingly, if the amounts of the blurs to be corrected are the same, a moving amount of the vibration reduction lens group in the case where the blur correction is conducted by the lens element C' becomes smaller than that in the case where the blur correction is conducted by the lens element A' or B'.

As described above, the vibration reduction coefficients K of the lens elements A', B' and C' become larger in this order, so more corrections become possible. In other words, if the focal lengths of the entire system are the same and moving amounts of the lens elements A', B' and C' are the same, more amount of correction can be made by the lens element B' than by the lens element A', and moreover more amount of correction can be made by the lens element C' than by the lens element B' In other words, if the focal lengths are same and amounts of the blur corrections are same, the moving amount of the lens element B' as vibration reduction lens can be made smaller than that of the lens element A' as vibration reduction lens. Further, the moving amount of the lens element C' as vibration reduction lens can be made smaller than the moving amount of the lens element B' as vibration reduction lens. Accordingly, it becomes possible to perform a control such that, in the wide angle end state, the lens element A' is driven, and in accordance with zooming to the telephoto end state, the lens element B' or C' is driven in this order, it becomes possible to perform more corrections without increasing the moving amount of the vibration reduction lens group even if the focal lengths become larger and the blur correcting amount becomes more. As a result, it becomes possible to make the shifting amount proper without shifting largely the vibration lens group from the wide angle end state to the telephoto end state.

Various values associated with the optical system S7 relating to the seventh Example of the second embodiment according to the present invention are listed in Table 7 below.

TABLE 7

Seventh Example (Entire Specification)

| | W | M | T |
|---|---|---|---|
| f = | 95.0 | 163.1 | 226.6 |
| FNO = | 4.68 | 4.68 | 4.70 |
| TL = | 259.3 | 259.3 | 259.3 |
| fh = | | 95.0-110.0 | |
| fk = | | 110.0-170.0 | |
| fl = | | 170.0-226.6 | |

(Surface Data)

| m | r | d | vd | nd |
|---|---|---|---|---|
| op | ∞ | | | |
| 1) | 134.560 | 1.8 | 25.43 | 1.80518 |
| 2) | 101.277 | 7.0 | 82.51 | 1.49782 |
| 3) | 546.812 | 1.0 | | |
| 4) | 77.194 | 4.0 | 82.51 | 1.49782 |
| 5) | 124.044 | D5 | | |
| 6) | 40.981 | 5.0 | 25.68 | 1.78472 |
| 7) | 59.996 | 1.5 | 40.77 | 1.88300 |
| 8) | 36.961 | 6.7 | | |
| 9) | −131.117 | 3.4 | 25.43 | 1.80518 |
| 10) | −53.784 | 1.5 | 40.77 | 1.88300 |
| 11) | 197.416 | D11 | | |
| 12) | −172.226 | 3.0 | 27.51 | 1.75520 |
| 13) | −80.000 | 2.0 | 43.69 | 1.72000 |
| 14) | −364.448 | D14 | | |
| 15> | ∞ | 3.0 | | Aperture Stop |
| 16) | −636.174 | 4.0 | 82.51 | 1.49782 |
| 17) | −57.515 | 0.3 | | |
| 18) | 84.998 | 6.0 | 70.45 | 1.48749 |
| 19) | −47.705 | 2.0 | 35.04 | 1.74950 |
| 20) | −289.998 | 25.9 | | |
| 21) | 70.499 | 4.6 | 82.56 | 1.49782 |
| 22) | −117.909 | 25.9 | | |
| 23) | −188.780 | 3.5 | 28.46 | 1.72825 |
| 24) | −111.267 | 1.5 | 47.38 | 1.78800 |
| 25) | 46.602 | 5.0 | | |
| 26) | −119.084 | 2.0 | 58.89 | 1.51823 |
| 27) | −220.000 | 5.0 | | |
| 28) | −30.419 | 3.0 | 64.12 | 1.51680 |
| 29) | −48.713 | 0.2 | | |
| 30) | 228.879 | 5.0 | 44.79 | 1.74400 |
| 31) | −64.531 | BF | | |
| I | ∞ | | | |

TABLE 7-continued

Seventh Example (Variable Distance Data)

|     | W    | M    | T    |
|-----|------|------|------|
| D5  | 1.6  | 46.7 | 68.9 |
| D11 | 61.4 | 2.5  | 3.4  |
| D14 | 11.8 | 25.7 | 2.7  |
| BF  | 50.6 | 50.6 | 50.6 |

(Values for Conditional Expressions)

fA' = −46.5
fB' = −42.3
fC' = −32.5
fw = 95.0
ft = 226.6
fh = 95.0-138.9
fk = 97.9-225.8
fl = 159.7-226.6
ZSw = 0.538
LSw = −0.428
ZSt = 0.830
LSt = −0.492
LS = −0.428: Image plane correction by lens element A'
LS = −0.515: Image plane correction by lens element B'
LS = −0.492: Image plane correction by lens element C'
(14) |fC'| < |fB'| < |fA'|: 32.5 < 42.3 < 46.5
(15) fw ≤ fh ≤ (|fC'|/|fA'|) × ft × 0.88:
95.0 ≤ 95.0-138.9 ≤ 138.9
(16) (|fC'|/|fA'|) × ft × 0.62 ≤ fk ≤
(|fC'|/|fB'|) × ft × 1.30:
97.9 ≤ 97.9-225.8 ≤ 225.8
(17) (|fC'|/|fB'|) × ft × 0.92 ≤ fl ≤ ft:
159.7 ≤ 159.7-226.6 ≤ 226.6
(18) |ZSw|/|LSw| = 1.26
(19) |ZSt|/|LSt| = 1.69
(20) √(|fA'| × fh)/LS = 155.3
(21) √(|fB'| × fk)/LS = 161.2
(22) √(|fC'| × fl)/LS = 154.8

Figure 28A:
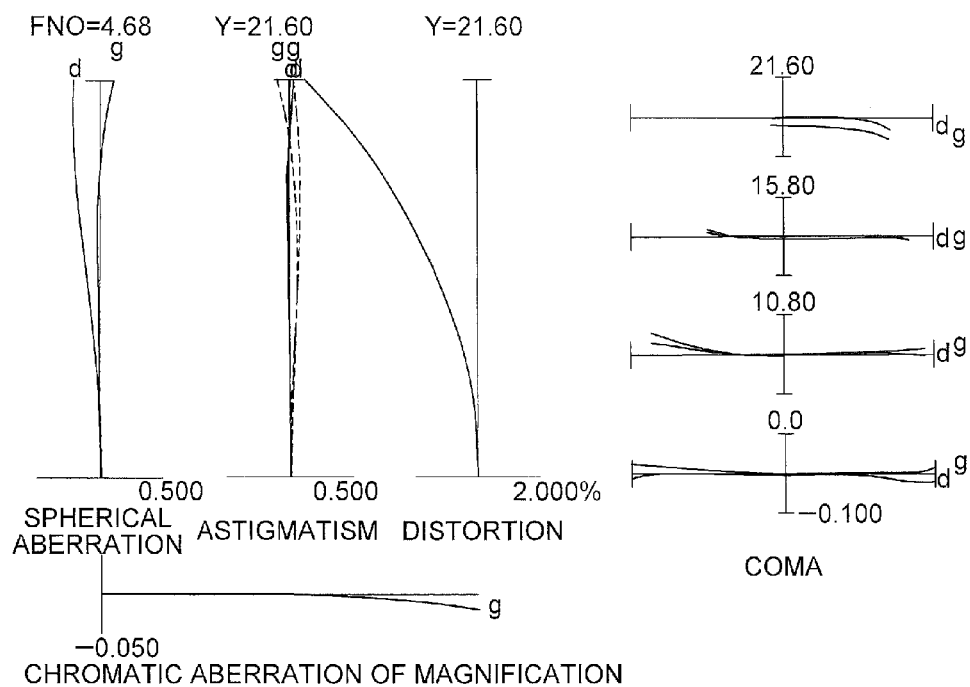
Figure 28B:
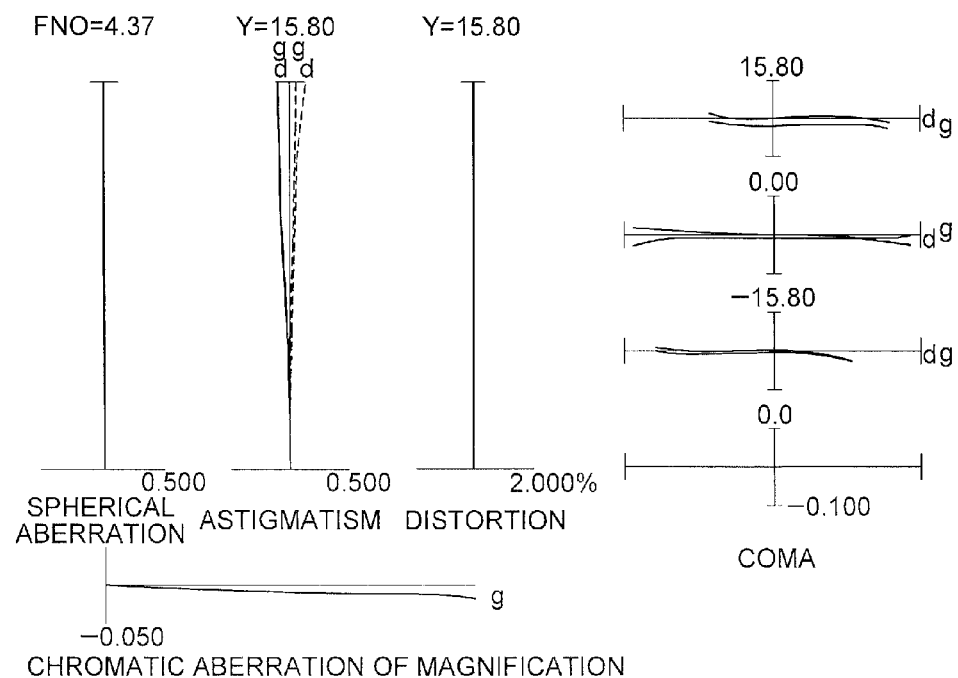

FIGS. 28A and 28B are graphs showing various aberrations of the optical system according to the seventh Example in the wide-angle end state upon focusing on infinity, in which FIG. 28A shows various aberrations, and FIG. 28B shows various aberration upon performing a correction of an image blur with using the lens element A'.

FIGS. 29A and 29B are graphs showing various aberrations of the optical system according to the seventh Example in the intermediate focal length state upon focusing on infinity, in which FIG. 29A shows various aberrations, and FIG. 29B shows various aberration upon performing a correction of the image blur with using the lens element B'.

Figure 30A:
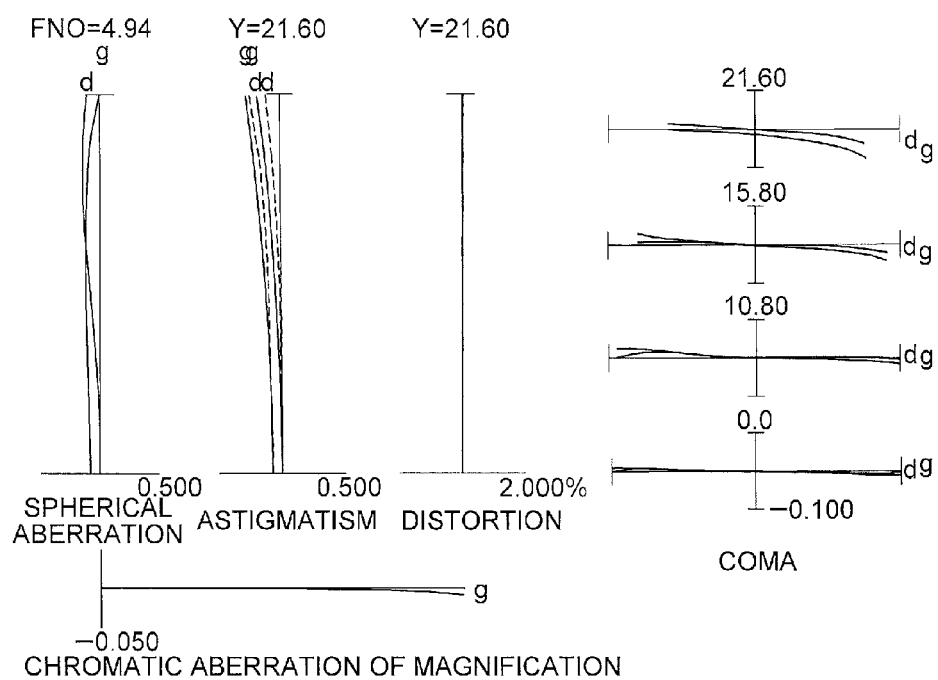
Figure 30B:
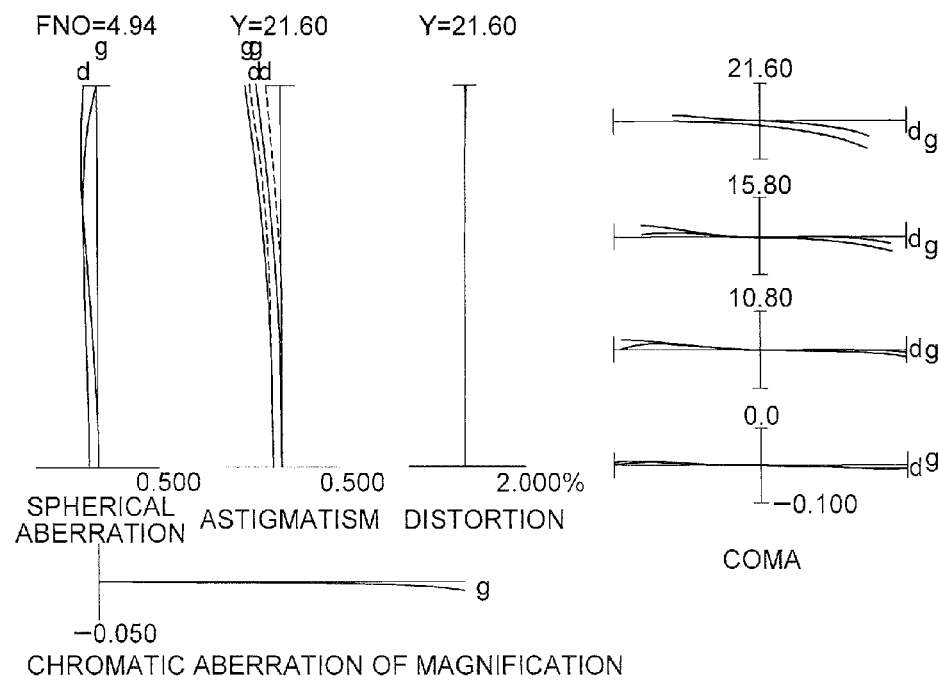

FIGS. 30A and 30B are graphs showing various aberrations of the optical system according to the seventh Example in the telephoto end state upon focusing on infinity, in which FIG. 30A shows various aberrations, and FIG. 30B shows various aberration upon performing a correction of the image blur with using the lens element C'.

As is apparent from the respective graphs, it is understood that the seventh Example has a superb optical performance as a result of good corrections to various aberrations from the wide-angle end state to the telephoto end state.

Eighth Example

FIG. 31 shows a configuration of an optical system S8 relating to an eighth Example according to the second embodiment of the present invention.

As shown in FIG. 31, the optical system S8 relating to the eighth Example is composed of, in order from an unillustrated object side, a first lens group G1 having negative refractive power, a second lens group G2 having positive refractive power, an aperture stop SP, a third lens group G3 having negative refractive power, and a fourth lens group G4 having positive refractive power.

The first lens group G1 is composed of, in order from the object side, a negative meniscus lens L11 having a convex surface facing the object side, a double concave negative lens L12, and a positive meniscus lens L13 having a convex surface facing the object side, the most object side negative meniscus lens L11 being an aspherical lens on which an aspherical surface is formed by forming a resin layer provided on the glass lens surface at the image plane I side.

The second lens group G2 is composed of, in order from the object side, a cemented lens L21 constructed by a negative meniscus lens having a convex surface facing the object side cemented with a double convex positive lens, and a positive meniscus lens L22 having a convex surface facing the object side.

The third lens group G3 is composed of, in order from the object side, a cemented lens L31 constructed by a positive meniscus lens having a concave surface facing the object side cemented with a double concave negative lens, and a plano-concave lens L32 having a concave surface facing the object side.

The fourth lens group G4 is composed of, in order from the object side, a plano-convex lens L41 having a plane surface facing the object side, and a cemented lens L42 constructed by a double convex positive lens cemented with a negative meniscus lens having a convex surface facing the image plane I side.

An imaging device (not shown) constructed by a CCD, a CMOS or the like is disposed on the image plane I. The aperture stop SP is disposed between the second lens group G2 and the third lens group G3, and is moved together with the third lens group G3 upon zooming from the wide angle end state to the telephoto end state.

In the optical system S8 relating to the eighth Example, upon zooming from the wide angle end state to the telephoto end state, the first lens group G1 is moved toward the image plane I side, the second lens group G2 and the fourth lens group G4 are moved in a body to the object side, and the third lens group G3 is moved to the object side.

Further, the optical system S8 relating to the eighth Example is so configured that the cemented lens L31 and the plano-concave lens L32 in the third lens group G3 are made as a lens element A', a lens element B' is composed of the cemented lens L21 in the second lens group G2, and vibration reduction lens groups are made by these lens element A' and lens element B' Image blur is prevented by shifting either of those vibration reduction lens groups in a direction perpendicular to the optical axis.

In the optical system S8 relating to the eighth Example, a lens group for correcting image blur may be shifted by (f·tan θ)/K in a direction perpendicular to the optical axis in order to correct rotational shake of an angle θ, where f denotes a focal length of the entire optical system S8, and K denotes a vibration reduction coefficient upon correcting the image blur.

In the optical system S8 relating to the eighth Example, focal lengths f of the entire system in an wide angle end state, in an intermediate focal length state and in a telephoto end state are, respectively, 18.5 mm, 35.0 mm, and 53.5 mm (refer to Table 8 below). Correcting amounts of image blurs by the lens element A' or B' in the respective focal lengths and moving amounts of the respective lens elements at the respective times are, as below, for example:

In the wide angle end state of the optical system S8 relating to the eighth Example, in the case of the lens element A', the vibration reduction coefficient K upon correcting the image blur is 1.27 and the focal length is 18.5 mm, so the moving amount of the lens element A' for correcting rotational shake of 0.735° is 0.187 mm.

Further, in the intermediate focal length state of the optical system S8 relating to the eighth Example, in the case of the lens element A', the vibration reduction coefficient K upon correcting the image blur is 1.58 and the focal length is 35.0 mm, so the moving amount of the lens element A' for correcting rotational shake of 0.534° is 0.206 mm.

Further, in the telephoto end state of the optical system S8 relating to the eighth Example, in the case of the lens element B', the vibration reduction coefficient K upon correcting the image blur is 2.04 and the focal length is 53.5 mm, so the moving amount of the lens element B' for correcting rotational shake of 0.432° is 0.198 mm. It is noted here that, in a case where the same image blur as this is corrected by the lens element A' in the telephoto end state, the vibration reduction coefficient K is 1.66 and the focal length is 53.5 mm, so the moving amount of the lens element A' for correcting rotational shake of 0.432° is 0.243 mm. Accordingly, if the amounts of the blurs to be corrected are the same, the moving amount of the vibration reduction lens group in the case where the blur correction is conducted by the lens element B' becomes smaller than that in the case where the blur correction is conducted by the lens element A'.

As described above, the vibration reduction coefficients K of the lens elements A' and B' become larger in this order, so more corrections become possible. In other words, if the focal lengths of the entire system are the same and moving amounts of the lens elements A' and B' are the same, more amount of correction can be made by the lens element B' than by the lens element A'. In other words, if amounts of the blur corrections are same, a moving amount of the lens element B' as vibration reduction lens can be made smaller than that of the lens element A' as vibration reduction lens. Accordingly, it becomes possible to perform a control such that in the wide angle end state to the intermediate focal length state, the lens element A' is driven, and in the telephoto end state side, the lens elements B' is driven, and thereby it becoming possible to perform more corrections without increasing the moving amount of the vibration reduction lens group even if the focal lengths become larger and the blur correcting amount becomes more. As a result, it becomes possible to make the shifting amount proper without shifting largely the vibration lens group from the wide angle end state to the telephoto end state.

Various values associated with the optical system S8 relating to the eighth Example of the second embodiment according to the present invention are listed in Table 8 below.

TABLE 8

Eighth Example (Entire Specification)

|  | W | M | T |
|---|---|---|---|
| f = | 18.5 | 35.0 | 53.5 |
| FNO = | 3.6 | 4.1 | 5.3 |
| TL = | 130.2 | 122.3 | 131.5 |
| fh = |  | 18.5-44.65 |  |
| fk = |  | 44.65-53.5 |  |

TABLE 8-continued

Eighth Example (Surface Data)

| m | r | d | vd | nd |
|---|---|---|---|---|
| op | ∞ |  |  |  |
| 1) | 115.556 | 1.9 | 64.12 | 1.51680 |
| 2) | 15.601 | 0.2 | 38.09 | 1.55389 |
| *3) | 13.300 | 10.0 |  |  |
| 4) | −159.479 | 1.5 | 58.22 | 1.62299 |
| 5) | 35.685 | 1.1 |  |  |
| 6) | 28.207 | 3.1 | 25.68 | 1.78472 |
| 7) | 77.398 | 2.2 |  |  |
| 8) | 32.321 | 0.9 | 23.78 | 1.84666 |
| 9) | 17.691 | 4.3 | 58.89 | 1.51823 |
| 10) | −32.688 | 0.1 |  |  |
| 11) | 23.144 | 1.8 | 64.10 | 1.5168 |
| 12) | 59.408 | D12 |  |  |
| 13> | ∞ | 2.9 |  | Aperture Stop |
| 14) | −40.000 | 2.75 | 32.40 | 1.85026 |
| 15) | −12.280 | 0.8 | 46.60 | 1.804 |
| 16) | 114.994 | 3.0 |  |  |
| 17) | −90.000 | 1.4 | 70.50 | 1.48749 |
| 18) | ∞ | D18 |  |  |
| 19) | ∞ | 3.2 | 52.30 | 1.51742 |
| 20) | −21.120 | 0.1 |  |  |
| 21) | 128.036 | 5.3 | 70.50 | 1.48749 |
| 22) | −15.933 | 1.3 | 32.40 | 1.85026 |
| 23) | −44.265 | BF |  |  |
| I | ∞ |  |  |  |

(Aspherical Surface Data)
Surface Number: 3

κ = 1
A4 = 2.63599E−05
A6 = 7.76960E−08
A8 = −1.94524E−10
A10 = 1.27950E−12

(Variable Distance Data)

|  | W | M | T |
|---|---|---|---|
| D7 | 32.3 | 20.8 | 9.7 |
| D12 | 2.6 | 4.3 | 8.0 |
| D18 | 9.6 | 7.8 | 4.2 |
| BF | 38.1 | 43.4 | 52.8 |

(Values for Conditional Expressions)

fA' = −32.6
fB' = −27.2
fw = 18.5
ft = 53.5
fh = 18.5-44.65
fk = 44.65-53.5
ZSw = 0.237
LSw = −0.187
ZSt = 0.403
LSt = 0.198
LS = −0.187: Image plane correction by lens element A'
   = −0.198: Image plane correction by lens element B'
(7) |fB'| < |fA'|:
   27.2 < 32.6
(8) fw ≤ fh ≤ (|fB'|/|fA'|) × ft × 1.50:
   18.5 ≤ 18.5-44.65 ≤ 44.65
(9) (|fB'|/|fA'|) × ft × 0.50 ≤ fk ≤ ft:
   44.65 ≤ 44.65-53.5 ≤ 53.5
(10) |ZSw|/|LSw| = 1.27
(11) |ZSt|/|LSt| = 2.04
(12) √(|fA'| × fh)/LS = 131.4
(13) √(|fB'| × fk)/LS = 192.7

Figure 32A:
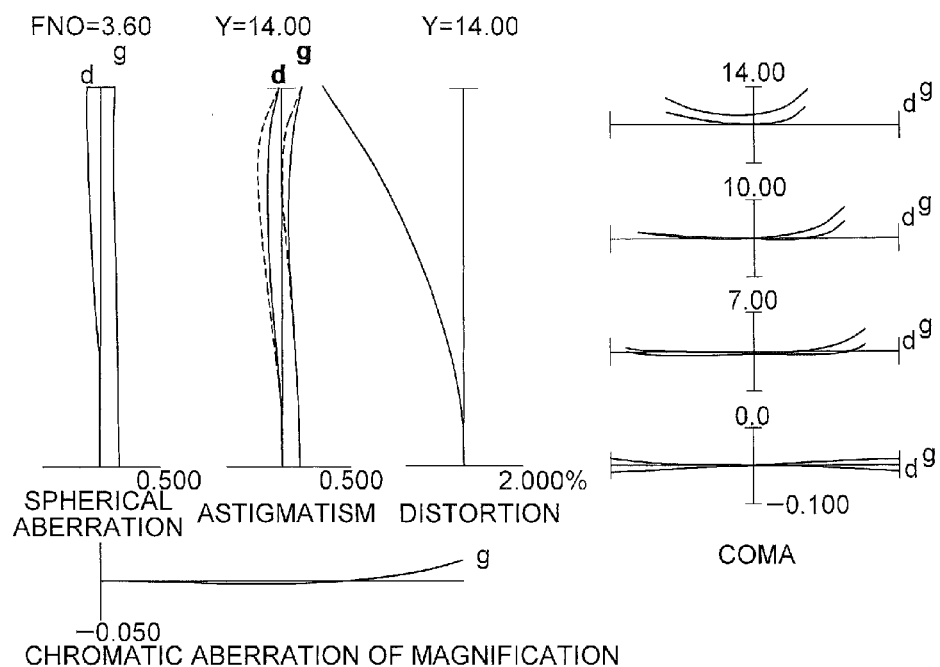
Figure 32B:
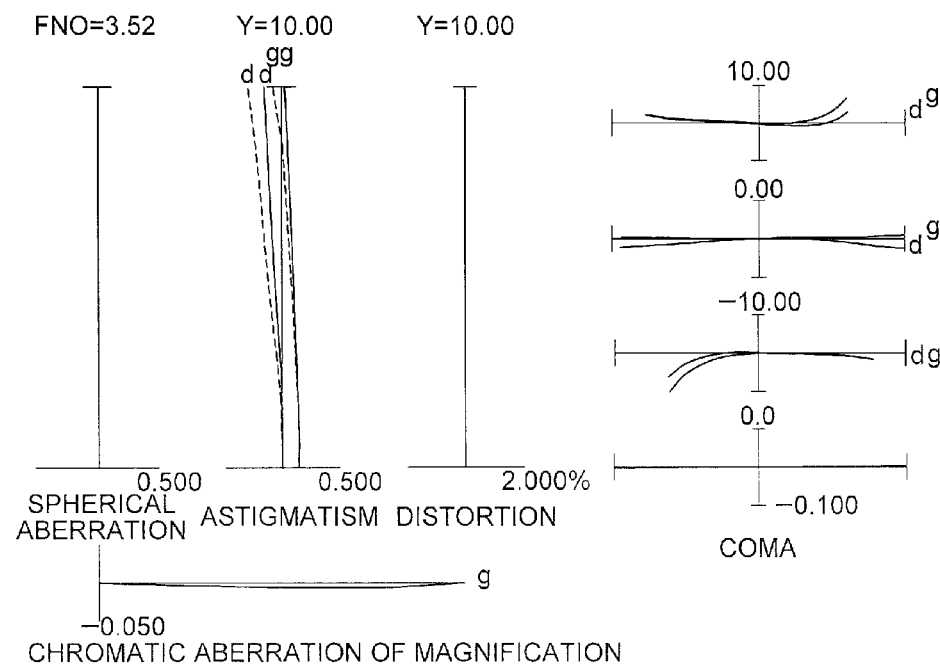

FIGS. 32A and 32B are graphs showing various aberrations of the optical system according to the eighth Example in the wide-angle end state upon focusing on infinity, in which FIG. 32A shows various aberrations, and FIG. 32B shows various aberration upon performing correction of image blur with using the lens element A'.

Figure 33A:
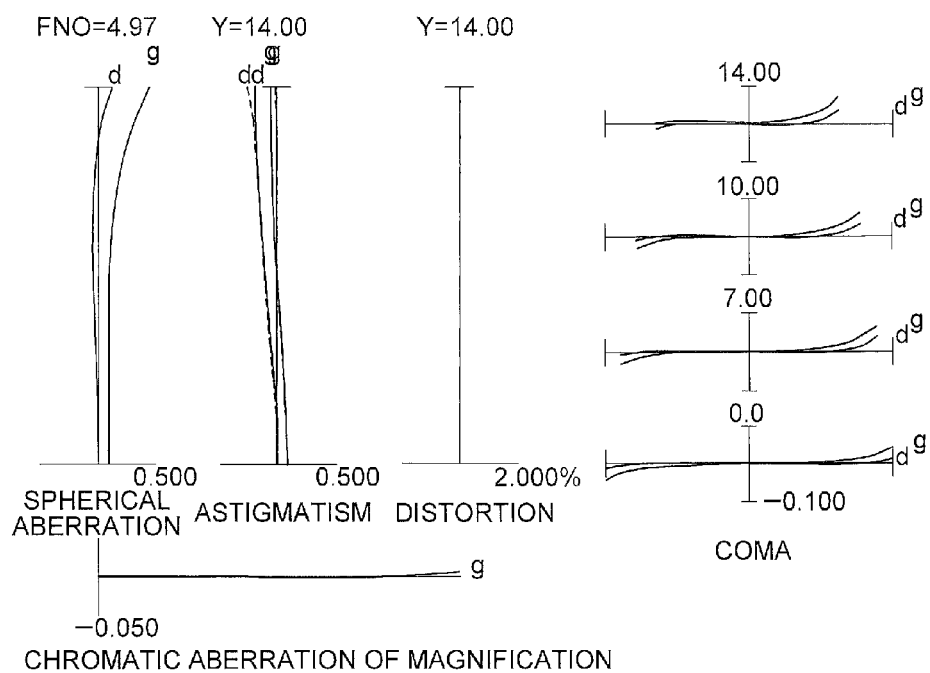
Figure 33B:
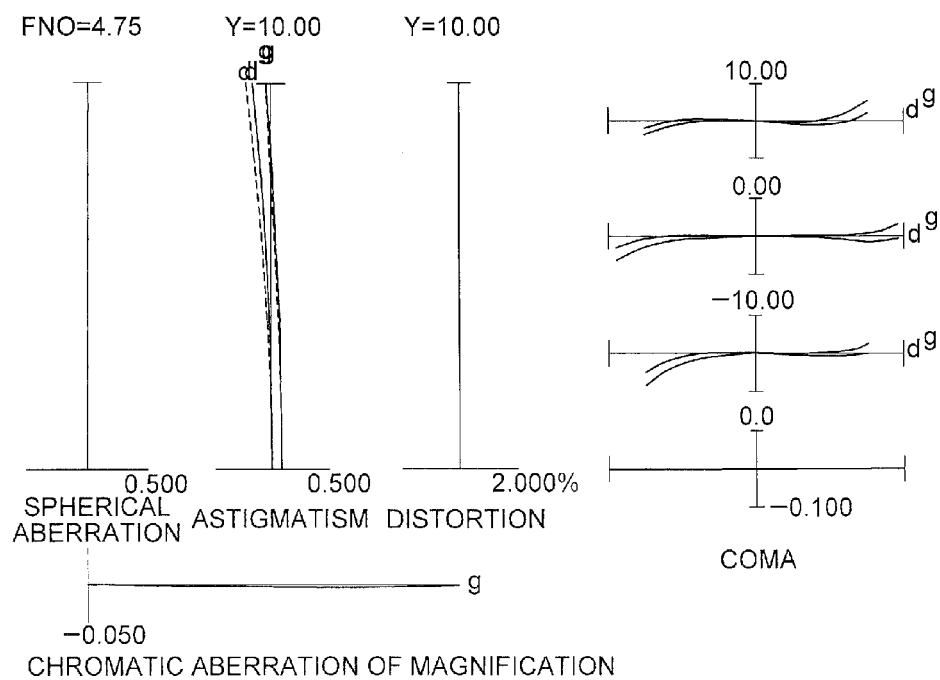

FIGS. 33A and 33B are graphs showing various aberrations of the optical system according to the eighth Example in the intermediate focal length state upon focusing on infinity, in which FIG. 33A shows various aberrations, and FIG. 33B shows various aberration upon performing correction of image blur with using the lens element A'.

Figure 34A:
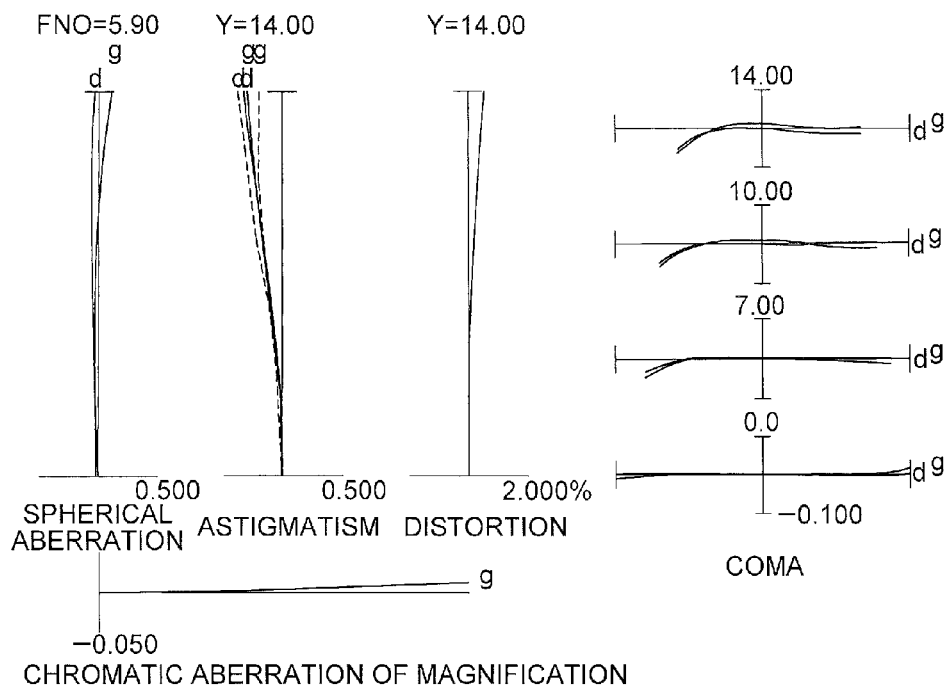
Figure 34B:
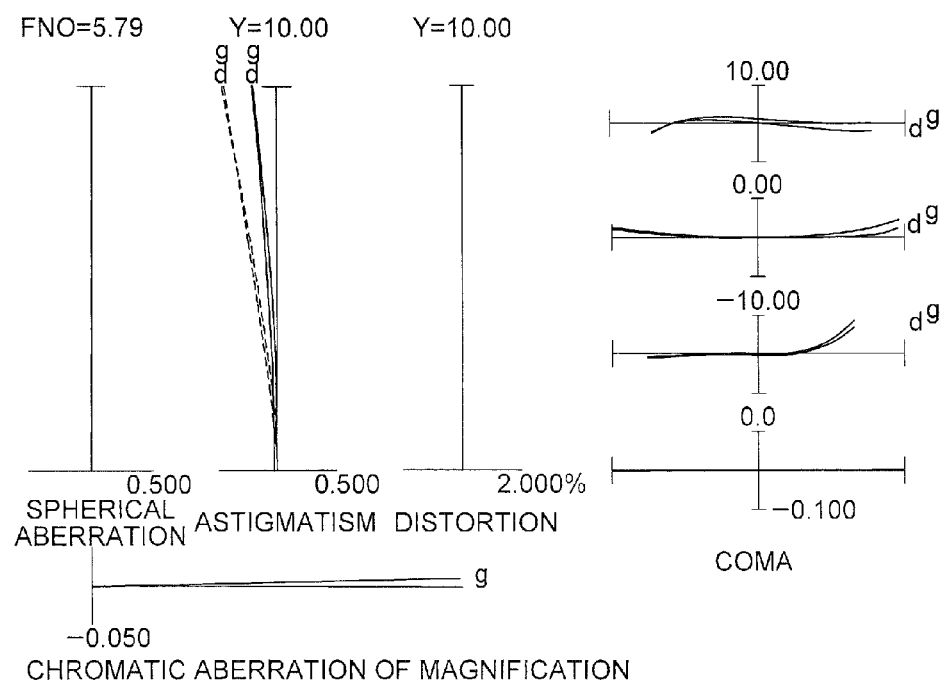

FIGS. 34A and 34B are graphs showing various aberrations of the optical system according to the eighth Example in the telephoto end state upon focusing on infinity, in which FIG. 34A shows various aberrations, and FIG. 34B shows various aberration upon performing correction of image blur with using the lens element B'.

As is apparent from the respective graphs, it is understood that the eighth Example has a superb optical performance as a result of good corrections to various aberrations from the wide-angle end state to the telephoto end state.

Ninth Example

Figure 35:
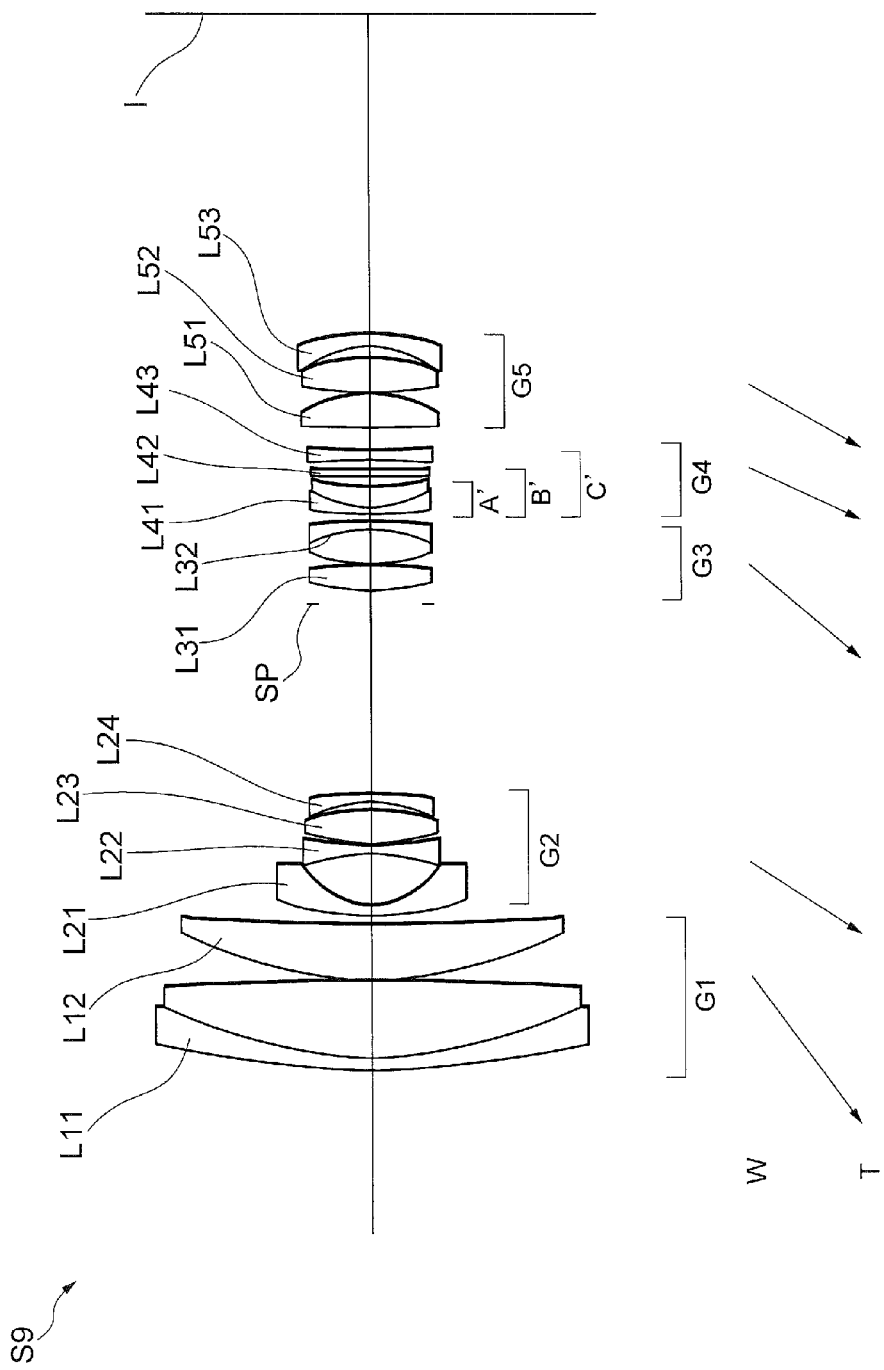
FIG. 35 is a view showing a configuration of an optical system relating to a ninth example according to the second embodiment of the present invention.

FIG. 35 shows a configuration of an optical system S9 relating to a ninth Example according to the second embodiment of the present invention.

As shown in FIG. 35, the optical system S9 relating to the ninth Example is composed of, in order from an unillustrated object side, a first lens group G1 having positive refractive power, a second lens group G2 having negative refractive power, an aperture stop SP, a third lens group G3 having positive refractive power, a fourth lens group G4 having negative refractive power, and a fifth lens group G5 having positive refractive power.

The first lens group G1 is composed of, in order from the object side, a cemented lens L11 constructed by a negative meniscus lens having a convex surface facing the object side cemented with a double convex lens, and a positive meniscus lens L12 having a convex surface facing the object side.

The second lens group G2 is composed of, in order from the object side, a negative meniscus lens L21 having a convex surface facing the object side, a double concave lens L22, a double convex lens L23 and a negative meniscus lens L24 having a concave surface facing the object side.

The third lens group G3 is composed of, in order from the object side, a double convex lens L31, and a cemented lens L32 constructed by a double convex lens cemented with a negative meniscus lens having concave surface facing the object side.

The fourth lens group G4 is composed of, in order from the object side, a cemented lens L41 constructed by a negative meniscus lens having a convex surface facing the object side cemented with a positive meniscus lens having a convex surface facing the object side, a double concave lens L42, and a double concave lens L43.

The fifth lens group G5 is composed of, in order from the object side, a double convex lens L51 which is aspherically shaped at the image plane I side, a double convex lens L52, and a negative meniscus lens L53 having a concave surface facing the object side.

An imaging device (not shown) constructed by a CCD, a CMOS or the like is disposed on the image plane I. The aperture stop SP is disposed between the second lens group G2 and the third lens group G3, and is moved together with the third lens group G3, upon zooming from a wide angle end state to a telephoto end state.

In the optical system S9 relating to the ninth Example, upon zooming from the wide angle end state to the telephoto end state, the first lens group G1, the second lens group G2, the third lens group G3, the fourth lens group G4 and the fifth lens group G5 are moved to the object side.

Further, the optical system S9 relating to the ninth Example is so configured that the cemented lens L41 in the fourth lens group G4 is made as a lens element A', a lens element B' is composed of the lens element A' and the double concave lens L42 having refractive power of the same sign as that of refractive power of the lens element A', a lens element C' is composed of the lens element B' and the double concave lens L43 having refractive power of the same sign as that of refractive power of the lens element B', and vibration reduction lens groups are made by these lens element A', lens element B' and lens element C'. Image blur is prevented by shifting any one of those vibration reduction lens groups in a direction perpendicular to the optical axis.

In the optical system S9 relating to the ninth Example, a lens group for correcting image blur may be shifted by (f·tan θ)/K in a direction perpendicular to the optical axis in order to correct rotational shake of an angle θ, where f denotes a focal length of the entire optical system S9, and K denotes a vibration reduction coefficient.

In the optical system S9 relating to the ninth Example, focal lengths f of the entire system in an wide angle end state, in an intermediate focal length state and in a telephoto end state are, respectively, 18.7 mm, 70.0 mm, and 188.0 mm (refer to Table 9 below). Correcting amounts of image blurs by the lens elements A', B', and C' in the respective focal lengths and moving amounts of the respective lens elements at the respective times are, as below, for example.

In the wide angle end state of the optical system S9 relating to the ninth Example, in the case of the lens element A', the vibration reduction coefficient K upon correcting the image blur is 0.51 and the focal length is 18.7 mm, so the moving amount of the lens element A' for correcting rotational shake of 0.623° is 0.400 mm.

Further, in the intermediate focal length state of the optical system S9 relating to the ninth Example, in the case of the lens element B', the vibration reduction coefficient K upon correcting the image blur is 0.99 and the focal length is 70.0 mm, so the moving amount of the lens element B' for correcting rotational shake of 0.321° is 0.399 mm. It is noted here that, in a case where the same image blur as this is corrected by the lens element A' in the intermediate focal length state, the vibration reduction coefficient K is 0.82 and the focal length is 70.0 mm, so the moving amount of the lens element A' for correcting rotational shake of 0.321° is 0.479 mm. Accordingly, if the amounts of the blurs to be corrected are the same, a moving amount of the vibration reduction lens group in a case where the blur correction is conducted by the lens element B' becomes smaller than that in a case where the blur correction is conducted by the lens element A'.

Further, in the telephoto end state of the optical system S9 relating to the ninth Example, in the case of the lens element C', the vibration reduction coefficient K upon correcting the image blur is 2.46 and the focal length is 188.0 mm, so the moving amount of the lens element C' for correcting rotational shake of 0.197° is 0.400 mm. It is noted here that, in a case where the same image blur as this is corrected by the lens element A' in the telephoto end state, the vibration reduction coefficient K is 1.04 and the focal length is 188.0 mm, so the moving amount of the lens element A' for correcting rotational shake of 0.197° is 0.951 mm. And, in the case where the lens element B' is used, the vibration reduction coefficient K is 1.25 and the focal length is 188.0 mm, so the moving amount of the lens element B' for correcting rotational shake of 0.197° is 0.791 mm. Accordingly, if the amounts of the blurs to be corrected are the same, a moving amount of the vibration reduction lens group in the case where the blur correction is conducted by the lens element C' becomes smaller than that in the case where the blur correction is conducted by the lens element A' or B'.

As described above, the vibration reduction coefficients K of the lens elements A', B' and C' become larger in this order, so more corrections become possible. In other words, if the focal lengths of the entire system are the same and the moving amounts of the lens elements A', B' and C' are the same, more amount of correction can be made by the lens element B' than by the lens element A', and moreover more amount of correction can be made by the lens element C' than by the lens element B'. In other words, if amounts of the blur corrections are the same, a moving amount of the lens element B' as vibration reduction lens can be made smaller than that of the lens element A' as vibration reduction lens, and further a moving amount of the lens element C' as vibration reduction lens can be made smaller than that of the lens element B' as vibration reduction lens. Accordingly, it becomes possible to perform a control such that, in the wide angle end state, the lens element A' is driven, and in accordance with zooming to the telephoto end state, the lens element B' or C' is driven in order, whereby it becomes possible to perform more corrections without increasing the moving amount of the vibration reduction lens group even if the focal lengths become larger and the blur correcting amount becomes more. As a result, it becomes possible to make the shifting amount proper without shifting largely the vibration lens group from the wide angle end state to the telephoto end state.

Incidentally, in the ninth Example, control is so made that change between the lens elements A' and B' is conducted when the focal length of the entire system becomes a predetermined value. The similar control is conducted as to change between the lens elements B' and C'.

Various values associated with the optical system S9 relating to the ninth Example of the second embodiment according to the present invention are listed in Table 9 below.

TABLE 9

Ninth Example (Entire Specification)

|  | W | M | T |
|---|---|---|---|
| f = | 18.7 | 70.0 | 188.0 |
| FNO = | 3.64 | 5.44 | 6.60 |
| TL = | 128.6 | 180.3 | 216.7 |
| fh = |  | 18.7-68.0 |  |
| fk = |  | 68.0-110.0 |  |
| fl = |  | 110.0-188.0 |  |

(Surface Data)

| m | r | d | vd | nd |
|---|---|---|---|---|
| op | ∞ |  |  |  |
| 1) | 128.56287 | 1.8 | 37.18 | 1.834 |
| 2) | 61.71903 | 9.4 | 82.57 | 1.49782 |
| 3) | −368.67603 | 0.12 |  |  |
| 4) | 55.98016 | 6.8 | 82.57 | 1.49782 |
| 5) | 389.22661 | D5 |  |  |
| *6) | 43.51896 | 1.2 | 47.25 | 1.77377 |
| 7) | 11.20367 | 6.4 |  |  |
| 8) | −27.87211 | 1.0 | 40.66 | 1.88300 |
| 9) | 45.04115 | 0.15 |  |  |
| 10) | 26.85149 | 4.22 | 23.8 | 1.84666 |
| 11) | −30.94189 | 1.05 |  |  |

TABLE 9-continued

Ninth Example

| 12) | −19.31231 | 1.0 | 46.6 | 1.80400 |
|---|---|---|---|---|
| 13) | −58.68682 | D13 |  |  |
| 14> | ∞ | 1.63 |  | Aperture Stop |
| 15) | 31.09309 | 3.18 | 82.57 | 1.49782 |
| 16) | −66.2335 | 0.12 |  |  |
| 17) | 24.20499 | 4.26 | 82.57 | 1.49782 |
| 18) | −22.11253 | 0.9 | 25.45 | 1.80518 |
| 19) | −90.15429 | D19 |  |  |
| 20) | 90.00000 | 0.8 | 52.77 | 1.74100 |
| 21) | 15.29423 | 2.5 | 25.45 | 1.80518 |
| 22) | 33.33188 | 1.4 |  |  |
| 23) | −450.00000 | 0.8 | 63.88 | 1.51680 |
| 24) | 459.94923 | 1.2 |  |  |
| 25) | −80.00000 | 1.2 | 54.61 | 1.72916 |
| 26) | 183.82631 | D26 |  |  |
| 27) | 275.95449 | 4.0 | 82.47 | 1.49697 |
| *28) | −21.43596 | 0.08 |  |  |
| 29) | 55.21481 | 4.25 | 70.31 | 1.48749 |
| 30) | −30.00000 | 1.4 |  |  |
| 31) | −15.80000 | 1.63 | 37.18 | 1.83400 |
| 32) | −31.79204 | BF |  |  |
| I | ∞ |  |  |  |

(Aspherical Surface Data)

Surface Number: 6

κ = 1
κ = −45.4463
A4 = 6.97E−05
A6 = −5.50E−07
A8 = 3.61E−09
A10 = −1.46E−11
A12 = 2.48E−14

Surface Number: 28

κ = −5.3904
A4 = −9.11E−05
A6 = 3.36E−07
A8 = −2.85E−09
A10 = 1.17E−11
A12 = −3.50E−14

(Variable Distance Data)

|  | W | M | T |
|---|---|---|---|
| D5 | 1.0 | 36.0 | 56.8 |
| D13 | 23.1 | 8.3 | 1.0 |
| D19 | 0.9 | 1.1 | 2.3 |
| D26 | 2.9 | 2.3 | 2.3 |
| BF | 38.7 | 70.6 | 92.2 |

(Values for Conditional Expressions)

fA' = −89.0
fB' = −74.1
fw = 18.7
ft = 188.0
fh = 18.7-69.2
fk = 48.7-122.69
fl = 86.8-188.0
ZSw = 0.204
LSw = −0.400
ZSt = 0.985
LSt = −0.400
LS = −0.400: Image plane correction by lens element A'
 = −0.400: Image plane correction by lens element B'
 = −0.400: Image plane correction by lens element C'
(14) |fC'| < |fB'| < |fA'|:
37.2 < 74.1 < 89.0
(15) fw ≤ fh ≤ (|fC'|/|fA'|) × ft × 0.88:
18.7 ≤ 18.7-69.2 ≤ 69.2
(16) (|fC'|/|fA'|) × ft × 0.62 ≤ fk ≤
(|fC'|/fB'|) × ft × 1.30:
48.7 ≤ 48.7-122.69 ≤ 122.69
(17) (|fC'|/|fB'|) × ft × 0.92 ≤ fl ≤ ft:
86.8 ≤ 86.8-188.0 ≤ 188.0

TABLE 9-continued

Ninth Example

(18) |ZSw|/|LSw| = 0.51
(19) |ZSt|/|LSt| = 2.46
(20) √(|fA'| × fh)/LS = 102.0
(21) √(|fB'| × fk)/LS = 180.1
(22) √(|fC'| × fl)/LS = 209.1

Figure 36A:
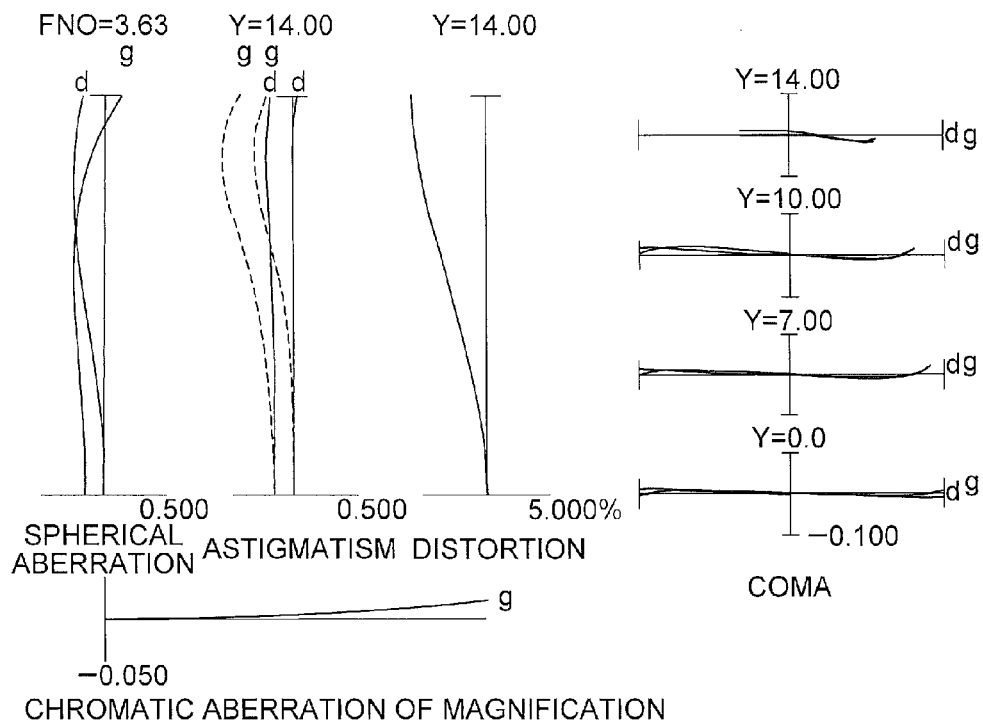
Figure 36B:
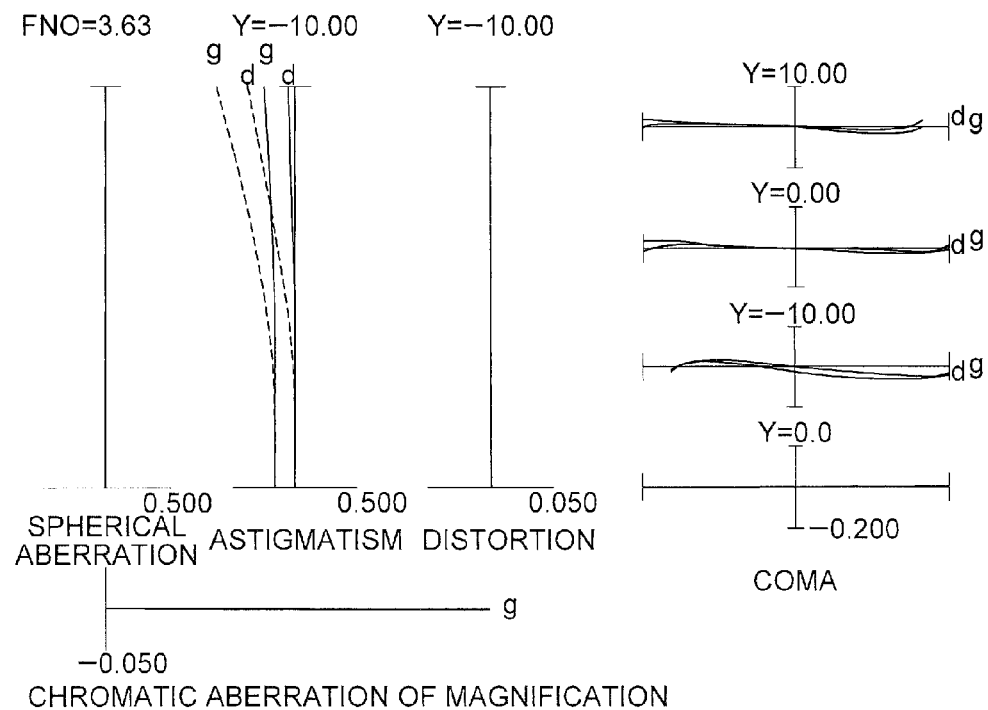

FIGS. 36A and 36B are graphs showing various aberrations of the optical system according to the ninth Example in the wide-angle end state upon focusing on infinity, in which FIG. 36A shows various aberrations, and FIG. 36B shows various aberration upon performing correction of image blur with using the lens element A'.

Figure 37A:
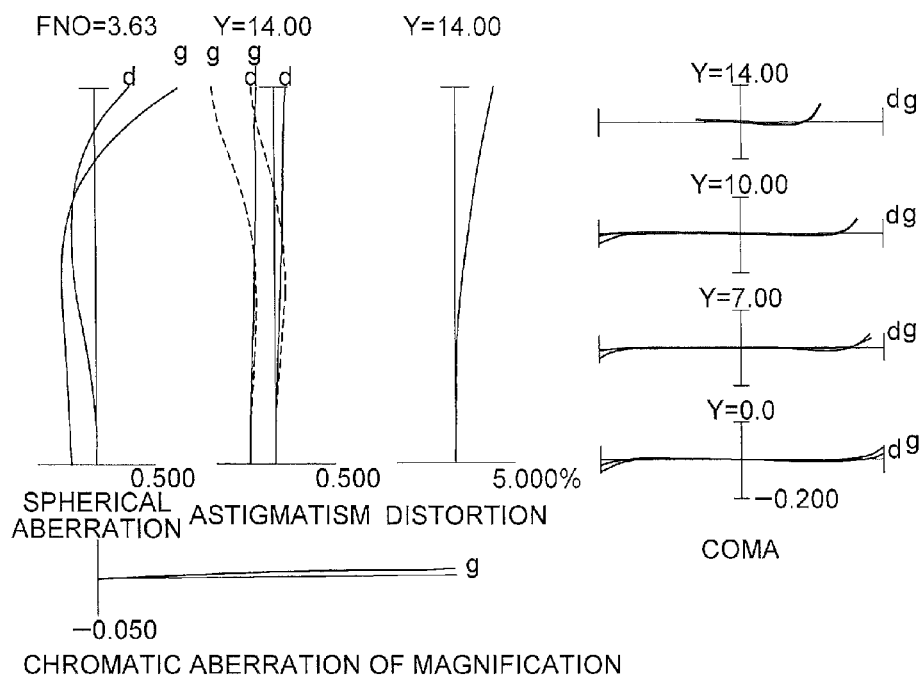
Figure 37B:
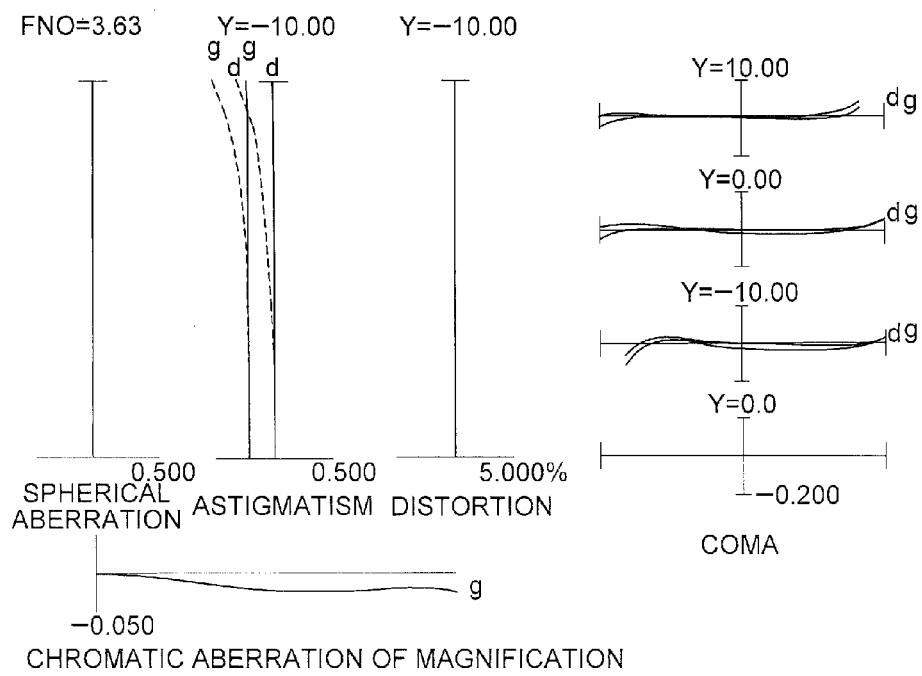

FIGS. 37A and 37B are graphs showing various aberrations of the optical system according to the ninth Example in the intermediate focal length state upon focusing on infinity, in which FIG. 37A shows various aberrations, and FIG. 37B shows various aberration upon performing correction of image blur with using the lens element B'.

Figure 38A:
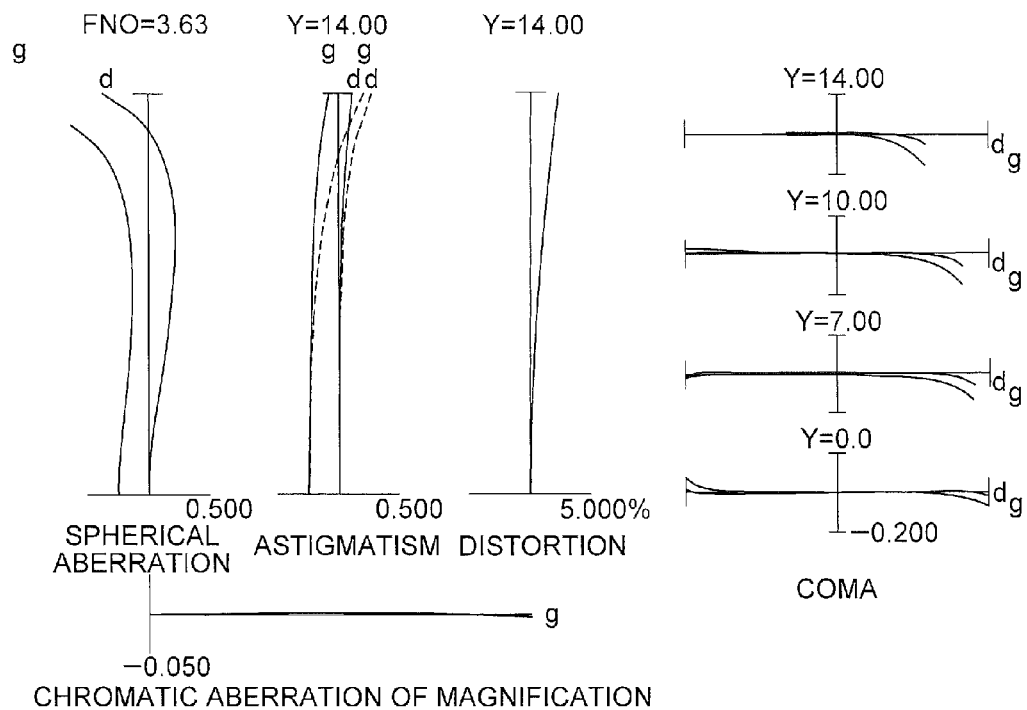
Figure 38B:
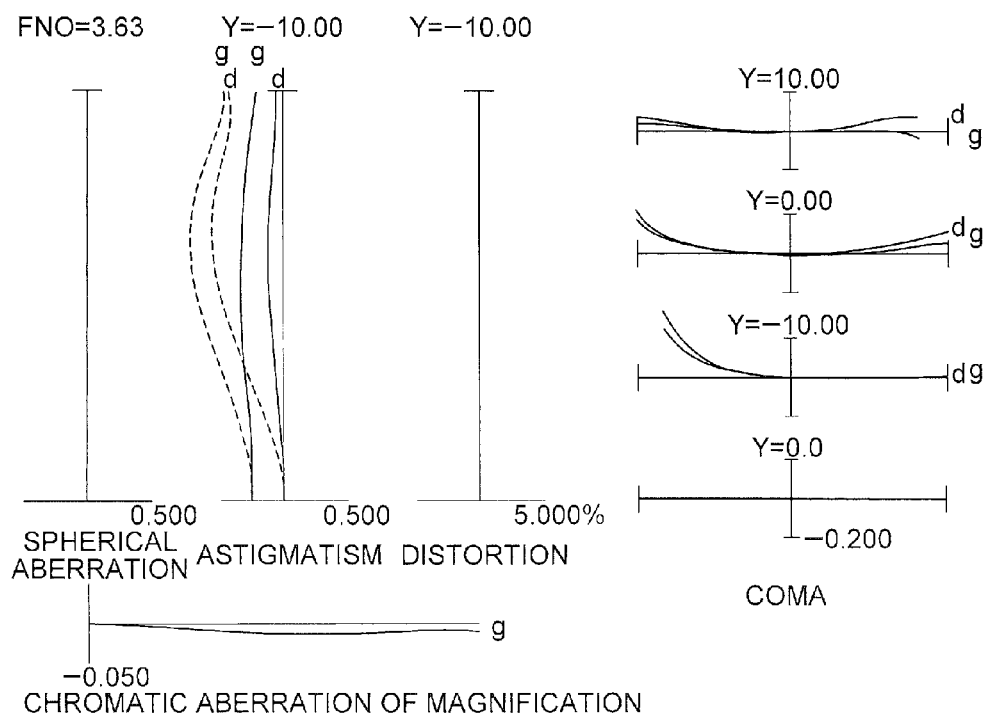

FIGS. 38A and 38B are graphs showing various aberrations of the optical system according to the ninth Example in the telephoto end state upon focusing on infinity, in which FIG. 38A shows various aberrations, and FIG. 38B shows various aberration upon performing correction of image blur with using the lens element C'.

As is apparent from the respective graphs, it is understood that the ninth Example has a superb optical performance as a result of good corrections to various aberrations from the wide-angle end state to the telephoto end state.

Tenth Example

FIG. 39 shows a configuration of an optical system S10 relating to a tenth Example according to the second embodiment of the present invention.

As shown in FIG. 39, the optical system S10 relating to the tenth Example is composed of, in order from an unillustrated object side, a first lens group G1 having positive refractive power, a second lens group G2 having negative refractive power, an aperture stop SP, a third lens group G3 having positive refractive power, and a fourth lens group G4 having negative refractive power.

The first lens group G1 is composed of, in order from the object side, a cemented lens L11 constructed by a negative meniscus lens having a convex surface facing the object side cemented with a double convex lens, and a positive meniscus lens L12 having a convex surface facing the object side.

The second lens group G2 is composed of, in order from the object side, a negative meniscus lens L21 whose object side is aspherically shaped and which has a convex surface facing the object side, a double concave lens L22, and a double convex lens L23 and a negative meniscus lens L24 having a concave surface facing the object side.

The third lens group G3 is composed of, in order from the object side, a double convex lens L31 and a cemented lens L32 constructed by a double convex lens cemented with a negative meniscus lens having a concave surface facing the object side.

The fourth lens group G4 is composed of, in order from the object side, a cemented lens L41 constructed by a double concave lens cemented with a positive meniscus lens having a convex surface facing the object side, a double concave lens L42, a double convex lens L43, a positive meniscus lens L44 whose image plane I side is aspherically shaped and which has a concave surface facing the object side, a double convex lens L45, and a negative meniscus lens L46 having a concave surface facing the object side.

An imaging device (not shown) constructed by a CCD, a CMOS or the like is disposed on the image plane I. The aperture stop SP is disposed between the second lens group G2 and the third lens group G3, and is moved together with the third lens group G3 upon zooming from the wide angle end state to the telephoto end state.

In the optical system S10 relating to the tenth Example, upon zooming from an wide angle end state to a telephoto end state, the first lens group G1, the second lens group G2, the third lens group G3 and the fourth lens group G4 are moved to the object side.

Further, the optical system S10 relating to the tenth Example is so configured that the cemented lens L41 and the double concave lens L42 in the fourth lens group G4 are made as a lens element B', a lens element A' is composed of the lens element B' and the double convex lens L43 having refractive power of a different sign as that of refractive power of the lens element B', and vibration reduction lens groups are made by these lens element A' and lens element B'. Image blur is prevented by shifting either of those vibration reduction lens groups in a direction perpendicular to the optical axis.

In the optical system S10 relating to the tenth Example, a lens group for correcting image blur may be shifted by (f·tan θ)/K in a direction perpendicular to the optical axis in order to correct rotational shake of an angle θ, where f denotes a focal length of the entire optical system, and K denotes a vibration reduction coefficient upon correcting the image blur.

In the optical system S10 relating to the tenth Example, focal lengths f of the entire system in an wide angle end state, in an intermediate focal length state and in a telephoto end state are, respectively, 18.7 mm, 70.1 mm, and 188.0 mm (refer to Table 10 below). Correcting amounts of image blurs by the lens element A' or B' in the respective focal lengths and moving amounts of the respective lens elements at the respective times are, as below, for example.

In the wide angle end state of the optical system S10 relating to the tenth Example, in the case of the lens element A', the vibration reduction coefficient K upon correcting the image blur is 0.60 and the focal length is 18.7 mm, so the moving amount of the lens element A' for correcting rotational shake of 0.772° is 0.421 mm.

Further, in the intermediate focal length state of the optical system S10 relating to the tenth Example, in the case of the lens element A', the vibration reduction coefficient K upon correcting the image blur is 0.94 and the focal length is 70.1 mm, so the moving amount of the lens element A' for correcting rotational shake of 0.322° is 0.421 mm.

Further, in the telephoto end state of the optical system S10 relating to the tenth Example, in the case of the lens element B', the vibration reduction coefficient K upon correcting the image blur is 2.31 and the focal length is 188.0 mm, so the moving amount of the lens element B' for correcting rotational shake of 0.296° is 0.421 mm. It is noted here that, in a case where the same image blur as this is corrected by the lens element A' in the telephoto end state, the vibration reduction coefficient K is 1.17 and the focal length is 188.0 mm, so the moving amount of the lens element A' for correcting rotational shake of 0.296° is 0.834 mm. Accordingly, if the amounts of the blurs to be corrected are the same, a moving amount of the vibration reduction lens group in the case where the blur correction is conducted by the lens element B' becomes smaller than that in the case where the blur correction is conducted by the lens element A'.

As described above, the vibration reduction coefficients K of the lens elements A' and the lens element B' become larger in this order. That is, more corrections become possible by correcting the lens element B' than correcting by the lens element A'. In other words, if the focal lengths of the entire system are the same and moving amounts of the lens elements A' and B' are the same, more amount of correction can be made by the lens element B' than by the lens element A'. In other words, if amounts of the blur corrections are same, a moving amount of the lens element B' as vibration reduction lens can be made smaller than that of the lens element A' as vibration reduction lens. Accordingly, it becomes possible to perform a control such that, in case of the focal length in the wide angle end state to the intermediate focal length state, the lens element A' is driven, and in the telephoto end state side, the lens elements B' is driven. Thus, it becomes possible to perform more corrections without increasing the moving amount of the vibration reduction lens group even if the focal length becomes larger and the blur correcting amount becomes more. As a result, it becomes possible to make the shifting amount proper without shifting largely the vibration lens group from the wide angle end state to the telephoto end state.

Various values associated with the optical system S10 relating to the tenth Example of the second embodiment according to the present invention are listed in Table 10 below.

TABLE 10

Tenth Example (Entire Specification)

|  | W | M | T |
|---|---|---|---|
| f = | 18.7 | 70.1 | 188.0 |
| FNO = | 3.64 | 5.60 | 6.97 |
| TL = | 130.1 | 182.0 | 219.2 |
| fh = |  | 18.7-103.3 |  |
| fk = |  | 103.3-188.0 |  |

(Surface Data)

| m | r | d | vd | nd |
|---|---|---|---|---|
| op | ∞ |  |  |  |
| 1) | 133.26500 | 1.4 | 37.18 | 1.83400 |
| 2) | 63.25833 | 9.2 | 82.57 | 1.49782 |
| 3) | -305.56559 | 0.12 |  |  |
| 4) | 58.40597 | 6.4 | 82.57 | 1.49782 |
| 5) | 444.97253 | D5 |  |  |
| *6) | 45.03974 | 1.2 | 47.25 | 1.77377 |
| 7) | 11.11015 | 6.4 |  |  |
| 8) | -24.09331 | 1.0 | 40.66 | 1.88300 |
| 9) | 68.33997 | 0.15 |  |  |
| 10) | 31.75544 | 4.22 | 23.78 | 1.84666 |
| 11) | -28.74651 | 1.05 |  |  |
| 12) | -17.39728 | 1.0 | 46.6 | 1.80400 |
| 13) | -38.14366 | D13 |  |  |
| 14> | ∞ | 1.63 |  | Aperture Stop |
| 15) | 26.85327 | 3.18 | 82.57 | 1.49782 |
| 16) | -48.92537 | 0.12 |  |  |
| 17) | 28.73946 | 4.26 | 82.57 | 1.49782 |
| 18) | -24.20835 | 0.9 | 25.4 | 1.80518 |
| 19) | -150.19371 | D19 |  |  |
| 20) | -200.00000 | 0.8 | 52.77 | 1.74100 |
| 21) | 19.52804 | 2.5 | 25.44 | 1.80518 |
| 22) | 66.76603 | 2.0 |  |  |
| 23) | -500.00000 | 0.8 | 54.61 | 1.72916 |
| 24) | 68.99538 | 1.2 |  |  |

TABLE 10-continued

Tenth Example

| 25) | 184.90012 | 1.9 | 63.88 | 1.51680 |
|---|---|---|---|---|
| 26) | -57.41433 | 2.3 |  |  |
| 27) | -29.69333 | 3.0 | 82.47 | 1.49697 |
| *28) | -23.59223 | 0.08 |  |  |
| 29) | 52.67285 | 4.25 | 70.31 | 1.48749 |
| 30) | -20.13027 | 1.4 |  |  |
| 31) | -15.95804 | 1.63 | 37.18 | 1.83400 |
| 32) | -35.63406 | BF |  |  |
| I | ∞ |  |  |  |

(Aspherical Surface Data)

Surface Number: 6

$\kappa = -42.8927$
$A4 = 6.52E-05$
$A6 = -4.25E-07$
$A8 = 2.51E-09$
$A10 = -9.91E-12$
$A12 = 1.83E-14$ Surface Number: 28

$\kappa = -7.2004$
$A4 = -7.79E-05$
$A6 = 4.39E-07$
$A8 = -4.25E-09$
$A10 = 3.18E-11$
$A12 = -1.36E-13$ (Variable Distance Data)

|  | W | M | T |
|---|---|---|---|
| D5 | 1.0 | 36.0 | 56.8 |
| D13 | 24.8 | 8.7 | 1.0 |
| D19 | 1.5 | 1.9 | 3.7 |
| BF | 38.7 | 71.3 | 93.5 |

(Values for Conditional Expressions)

fA' = -82.5
fB' = -40.1
fw = 18.7
ft = 188.0
fh = 18.7-91.38
fk = 91.38-188.0
ZSw = 0.252
LSw = -0.421
ZSt = 0.984
LSt = -0.426
LS = -0.421: Image plane correction by lens element A'
   = -0.426: Image plane correction by lens element B'
(7) |fB'| < |fA'|:
   40.1 < 82.5
(8) fw ≤ fh ≤ (|fB'|/|fA'|) × ft × 1.50:
   18.7 ≤ 18.7-91.38 ≤ 91.38
(9) (|fB'|/|fA'|) × ft × 0.50 ≤ fk ≤ ft:
   91.38 ≤ 91.38-188.0 ≤ 188.0
(10) |ZSw|/|LSw| = 0.60
(11) |ZSt|/|LSt| = 2.31
(12) √(|fA'|× fh)/LS = 93.297
(13) √(|fB'|× fk)/LS = 203.8

Figure 40A:
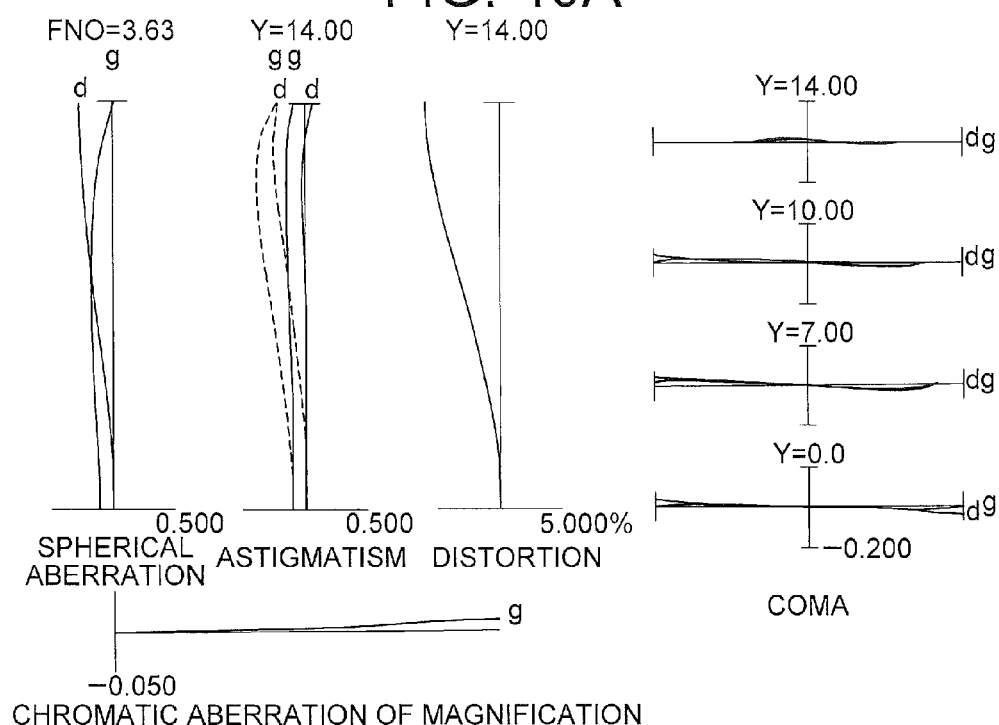
Figure 40B:
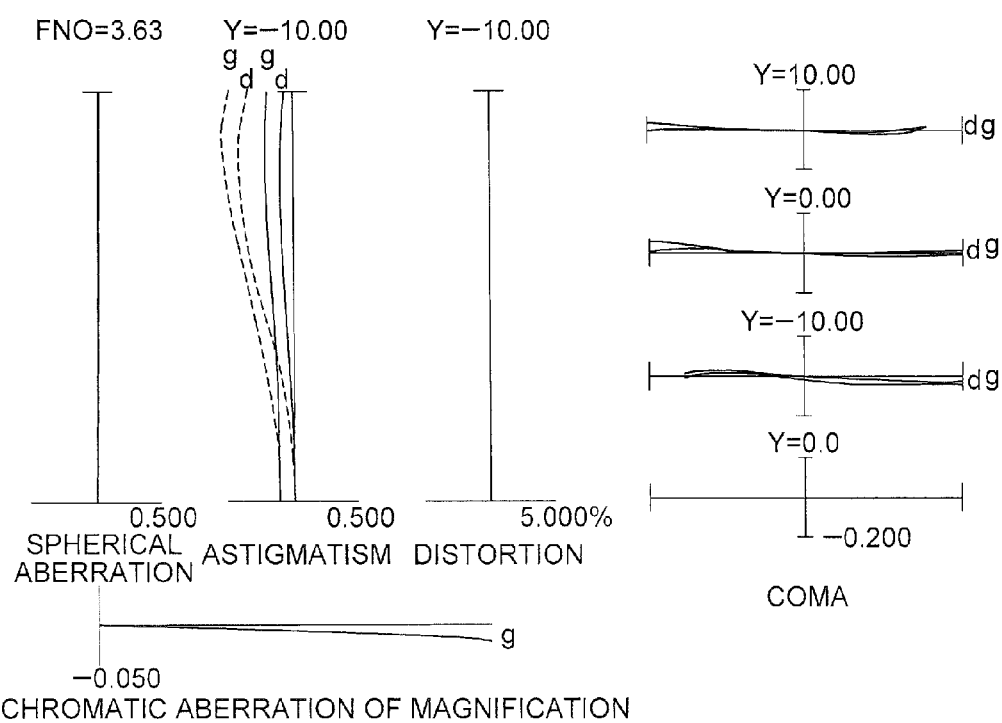

FIGS. 40A and 40B are graphs showing various aberrations of the optical system according to the tenth Example in the wide-angle end state upon focusing on infinity, in which FIG. 40A shows various aberrations, and FIG. 40B shows various aberration upon performing a correction of an image blur with using the lens element A'.

Figure 41A:
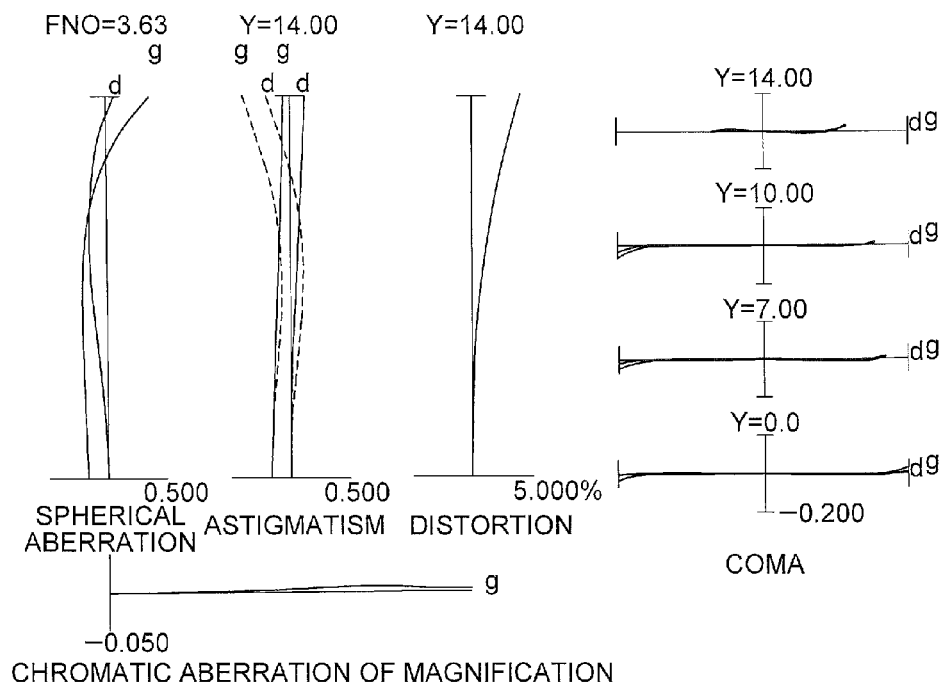
Figure 41B:
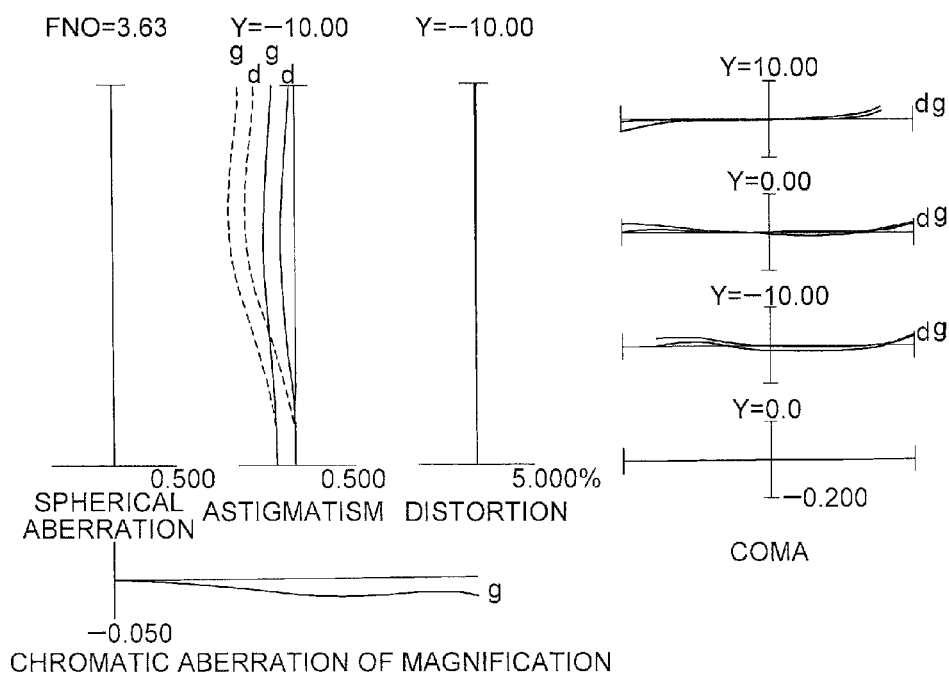

FIGS. 41A and 41B are graphs showing various aberrations of the optical system according to the tenth Example in the intermediate focal length state upon focusing on infinity, in which FIG. 41A shows various aberrations, and FIG. 41B shows various aberration upon performing a correction of the image blur with using the lens element A'.

Figure 42A:
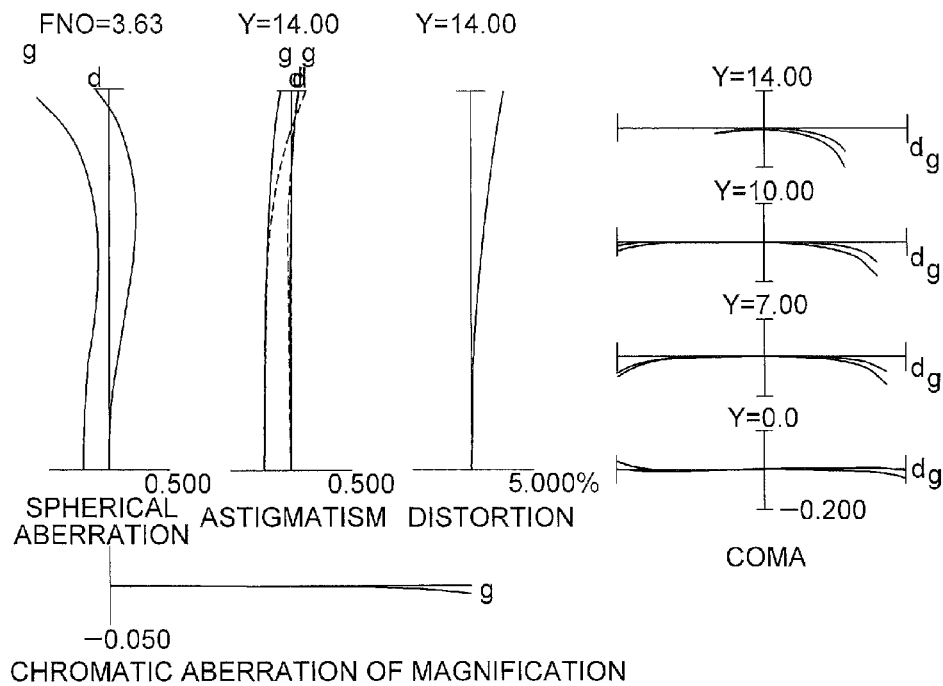
Figure 42B:
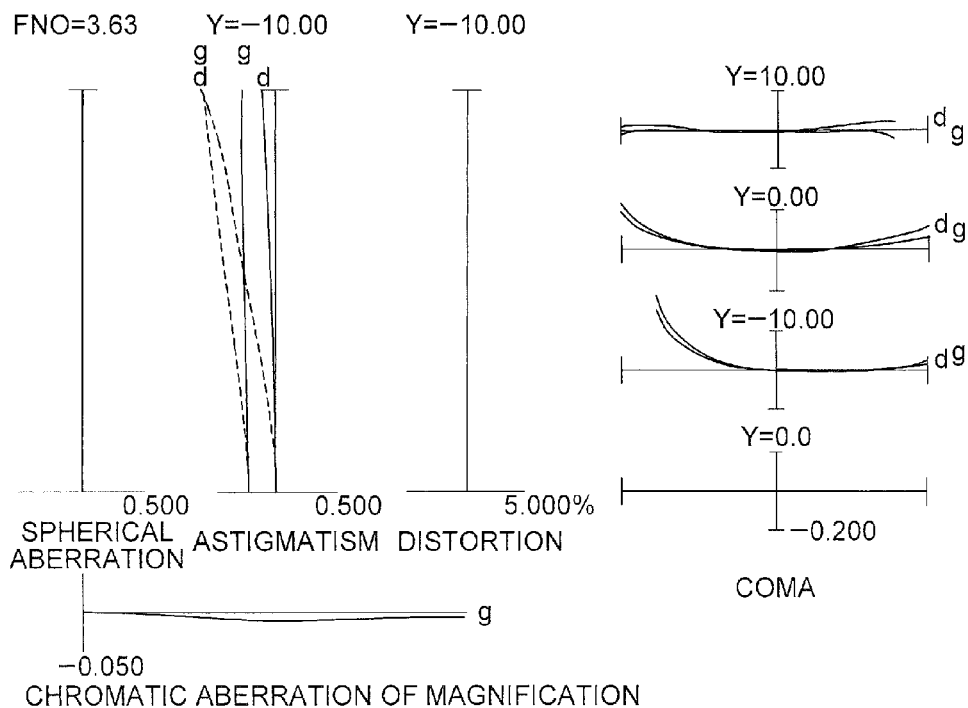

FIGS. 42A and 42B are graphs showing various aberrations of the optical system according to the tenth Example in the telephoto end state upon focusing on infinity, in which FIG. 42A shows various aberrations, and FIG. 42B shows various aberration upon performing a correction of the image blur with using the lens element B'.

As is apparent from the respective graphs, it is understood that the tenth Example has a superb optical performance as a result of good corrections to various aberrations from the wide-angle end state to the telephoto end state.

Eleventh Example

FIG. 43 shows a configuration of an optical system S11 relating to an eleventh Example according to the second embodiment of the present invention.

As shown in FIG. 43, the optical system S11 relating to the eleventh Example is composed of, in order from an unillustrated object side, a first lens group G1 having positive refractive power, a second lens group G2 having negative refractive power, an aperture stop SP, a third lens group G3 having positive refractive power, a fourth lens group G4 having negative refractive power, and a fifth lens group G5 having positive refractive power.

The first lens group G1 is composed of, in order from the object side, a cemented lens L11 constructed by a negative meniscus lens having a convex surface facing the object side cemented with a positive meniscus lens having a convex surface facing the object side, and a double convex lens L12.

The second lens group G2 is composed of, in order from the object side, a negative meniscus lens L21 whose object side is aspherically shaped and which has a convex surface facing the object side, a double concave lens L22, a double convex lens L23 and a negative meniscus lens L24 having a concave surface facing the object side.

The third lens group G3 is composed of, in order from the object side, a double convex lens L31, and a cemented lens L32 constructed by a double convex lens cemented with a negative meniscus lens having a concave surface facing the object side.

The fourth lens group G4 is composed of, in order from the object side, a cemented lens L41 constructed by a negative meniscus lens having a convex surface facing the object side cemented with a positive meniscus lens having a convex surface facing the object side, a negative meniscus lens L42 having a concave surface facing the object side, and a positive meniscus lens L43 having a concave surface facing the object side.

The fifth lens group G5 is composed of, in order from the object side, a positive meniscus lens L51 aspherically shaped at the image plane I side and having a concave surface facing the object side, a double convex lens L52, and a negative meniscus lens L53 having a concave surface facing the object side.

An imaging device (not shown) constructed by a CCD, a CMOS or the like is disposed on the image plane I. The aperture stop SP is disposed between the second lens group G2 and the third lens group G3, and is moved together with the third lens group G3, upon zooming from a wide angle end state to a telephoto end state.

In the optical system S11 relating to the eleventh Example, upon zooming from the wide angle end state to the telephoto end state, the first lens group G1, the second lens group G2, the third lens group G3, the fourth lens group G4 and the fifth lens group G5 are moved to the object side.

Further, the optical system S11 relating to the eleventh Example is so configured that the cemented lens L41 and the negative meniscus lens L42 in the fourth lens group G4 are made as a lens element B', a lens element A' is composed of the lens element B' and the positive meniscus lens L43 having refractive power of a different sign as that of refractive power of the lens element B', and vibration reduction lens groups are made by these lens element A' and lens element B'. Image blur is prevented by shifting either of the vibration reduction lens groups in a direction perpendicular to the optical axis.

In the optical system S11 relating to the eleventh Example, a lens group for correcting image blur may be shifted by (f·tan θ)/K in a direction perpendicular to the optical axis in order to correct rotational shake of an angle θ, where f denotes a focal length of the entire optical system, and K denotes a vibration reduction coefficient.

In the optical system S11 relating to the eleventh Example, focal lengths f of the entire system in an wide angle end state, in an intermediate focal length state and in a telephoto end state are, respectively, 18.7 mm, 70.0 mm, and 188.0 mm (refer to Table 11 below). Correcting amounts of image blurs by the lens elements A' or B' in the respective focal lengths and moving amounts of the respective lens elements at the respective times are, as below, for example.

In the wide angle end state of the optical system S11 relating to the eleventh Example, in the case of the lens element A', the vibration reduction coefficient K upon correcting the image blur is 0.62 and the focal length is 18.7 mm, so the moving amount of the lens element A' for correcting rotational shake of 0.848° is 0.446 mm.

Further, in the intermediate focal length state of the optical system S11 relating to the eleventh Example, in the case of the lens element A', the vibration reduction coefficient K upon correcting the image blur is 0.99 and the focal length is 70.0 mm, so the moving amount of the lens element A' for correcting rotational shake of 0.360° is 0.446 mm.

Further, in the telephoto end state of the optical system S11 relating to the eleventh Example, in the case of the lens element B', the vibration reduction coefficient K upon correcting the image blur is 2.21 and the focal length is 188.0 mm, so the moving amount of the lens element B' for correcting rotational shake of 0.300° is 0.446 mm. It is noted here that, in a case where the same image blur as this is corrected by the lens element A' in the telephoto end state, the vibration reduction coefficient K is 1.25 and the focal length is 188.0 mm, so the moving amount of the lens element A' for correcting rotational shake of 0.300° is 0.790 mm. Accordingly, if the amounts of the blurs to be corrected are the same, a moving amount of the vibration reduction lens group in the case where the blur correction is conducted by the lens element B' becomes smaller than that in the case where the blur correction is conducted by the lens element A'.

As described above, the vibration reduction coefficients K of the lens elements A' and B' become larger in this order, so more corrections become possible by correcting the image blur with the lens element B' than with the lens element A'. If the focal lengths of the entire system are the same and the moving amounts of the lens elements A' and B' are the same, more amount of correction can be made by the lens element B' than by the lens element A'. In other words, if the amounts of the blur corrections are the same, a moving amount of the lens element B' as vibration reduction lens can be made smaller than that of the lens element A' as vibration reduction lens. Accordingly, in the present Example, a control is so made that, in case of the focal length in the wide angle end state to the intermediate focal length state, the lens element A' is driven, and in the telephoto end state side, the lens element B' is driven, thus it becoming possible to perform more corrections without increasing the moving amount of the vibration reduction lens group even if the focal lengths become larger and the blur correcting amount becomes more. As a result, it becomes possible to make the shifting amount proper without shifting largely the vibration lens group from the wide angle end state to the telephoto end state.

Various values associated with the optical system S11 relating to the eleventh Example of the second embodiment according to the present invention are listed in Table 11 below.

TABLE 11

Eleventh Example (Entire Specification)

|  | W | M | T |
|---|---|---|---|
| f = | 18.7 | 70.0 | 188.0 |
| FNO = | 3.55 | 5.39 | 6.91 |
| TL = | 129.7 | 182.7 | 222.5 |
| fh = |  | 18.7-91.38 |  |
| fk = |  | 91.38-188.0 |  |

(Surface Data)

| m | r | d | vd | nd |
|---|---|---|---|---|
| op | ∞ |  |  |  |
| 1) | 88.3686 | 1.4 | 37.18 | 1.834 |
| 2) | 51.2341 | 9.8 | 82.57 | 1.49782 |
| 3) | 588.9823 | 0.12 |  |  |
| 4) | 65.0932 | 6.4 | 82.57 | 1.49782 |
| 5) | −3559.6410 | D5 |  |  |
| *6) | 37.4711 | 1.2 | 47.25 | 1.77377 |
| 7) | 10.8979 | 6.4 |  |  |
| 8) | −29.5092 | 1.0 | 40.66 | 1.88300 |
| 9) | 58.3390 | 0.15 |  |  |
| 10) | 26.3202 | 4.22 | 23.8 | 1.84666 |
| 11) | −34.7037 | 1.05 |  |  |
| 12) | −18.6800 | 1.0 | 46.6 | 1.80400 |
| 13) | −67.5427 | D13 |  |  |
| 14> | ∞ | 1.63 |  | Aperture Stop |
| 15) | 23.9912 | 3.18 | 82.57 | 1.49782 |
| 16) | −62.5375 | 0.12 |  |  |
| 17) | 33.2119 | 4.26 | 82.57 | 1.49782 |
| 18) | −21.0524 | 0.9 | 25.45 | 1.80518 |
| 19) | −74.2470 | D19 |  |  |
| 20) | 358.8111 | 0.8 | 52.77 | 1.74100 |
| 21) | 18.2134 | 2.5 | 25.45 | 1.80518 |
| 22) | 45.8626 | 2.0 |  |  |
| 23) | −50.0000 | 0.8 | 54.61 | 1.72916 |
| 24) | −254.5612 | 1.2 |  |  |
| 25) | −248.3650 | 1.9 | 65.44 | 1.60300 |
| 26) | −49.5474 | 2.3 |  |  |
| 27) | −30.0000 | 4.0 | 82.47 | 1.49697 |
| *28) | −20.4714 | 0.08 |  |  |
| 29) | 43.8397 | 4.25 | 70.31 | 1.48749 |
| 30) | −31.5343 | 1.4 |  |  |
| 31) | −16.1983 | 1.63 | 37.18 | 1.83400 |
| 32) | −30.0990 | BF |  |  |
| I | ∞ |  |  |  |

(Aspherical Surface Data)

Surface Number: 6

κ = −30.2672
A4 = 7.83E−05
A6 = −5.54E−07
A8 = 3.32E−09
A10 = −1.18E−11
A12 = 1.88E−14

TABLE 11-continued

Eleventh Example

Surface Number: 28

κ = −4.9613
A4 = −9.15E−05
A6 = 3.67E−07
A8 = −3.27E−09
A10 = 1.76E−11
A12 = −6.39E−14

(Variable Distance Data)

|  | W | M | T |
|---|---|---|---|
| D5 | 1.0 | 36.0 | 56.8 |
| D13 | 23.9 | 8.3 | 1.0 |
| D19 | 0.9 | 0.9 | 1.9 |
| D26 | 1.8 | 1.8 | 2.3 |
| BF | 38.7 | 72.4 | 96.6 |

(Values for Conditional Expressions)

fA' = −76.8
fB' = −42.2
fw = 18.7
ft = 188.0
fh = 18.7-103.30
fk = 103.30-188.0
ZSw = 0.279
LSw = −0.45
ZSt = 0.560
LSt = −0.45
LS = −0.45: Image plane correction by lens element A'
   = −0.45: Image plane correction by lens element B'
(7) |fB'| < |fA'|:
   42.2 < 76.8
(8) fw ≤ fh ≤ (|fB'|/|fA'|) × ft × 1.50:
   18.7 ≤ 18.7-103.30 ≤ 103.30
(9) (|fB'|/|fA'|) × ft × 0.50 ≤ fk ≤ ft:
   103.30 ≤ 103.30-188.0 ≤ 188.0
(10) |ZSw|/|LSw| = 0.62
(11) |ZSt|/|LSt| = 1.24
(12) √(|fA'|× fh)/LS = 84.2
(13) √(|fB'|× fk)/LS = 197.9

Figure 44A:
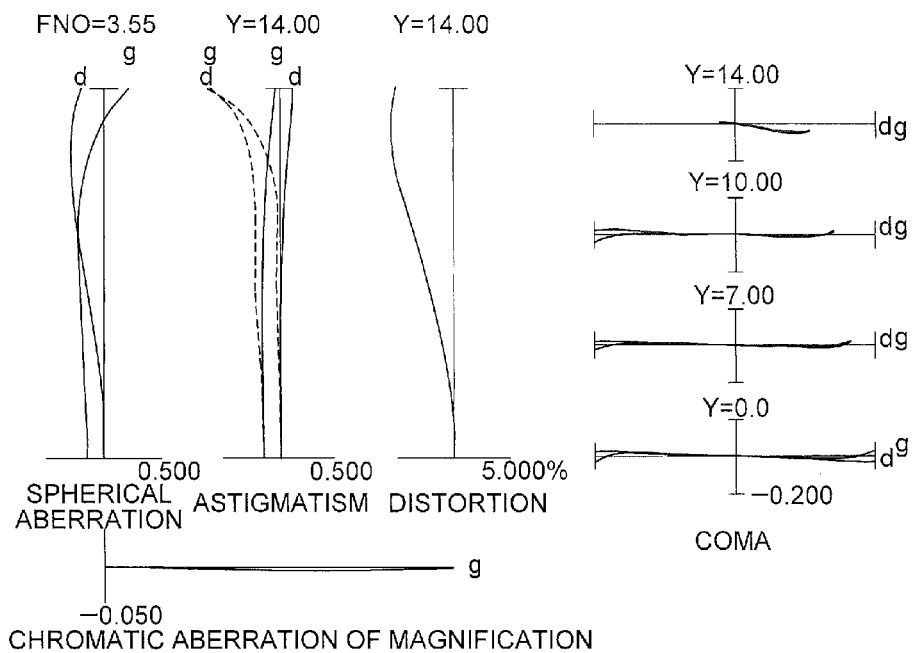
Figure 44B:
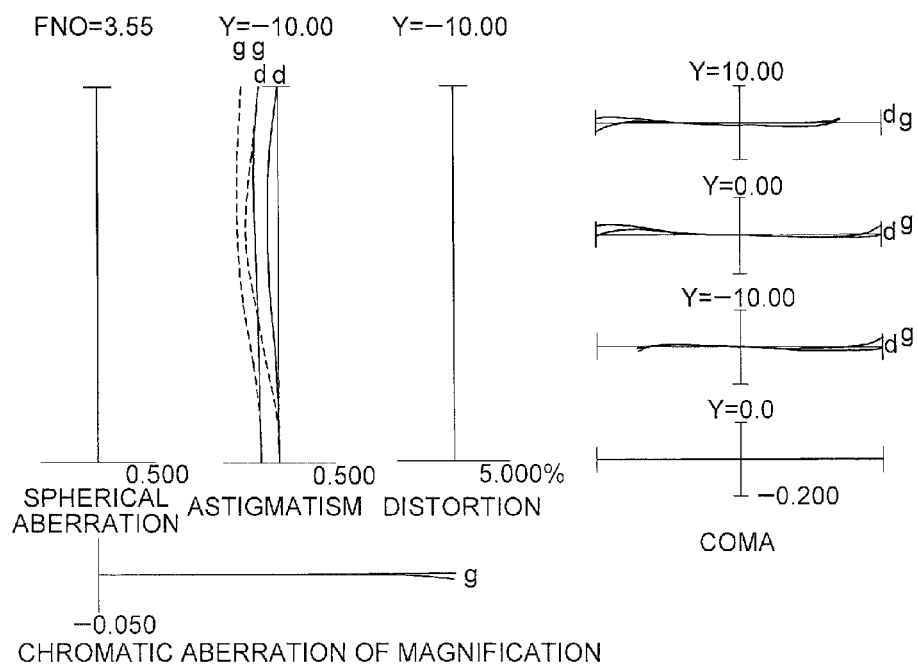

FIGS. 44A and 44B are graphs showing various aberrations of the optical system according to the eleventh Example in the wide-angle end state upon focusing on infinity, in which FIG. 44A shows various aberrations, and FIG. 44B shows various aberration upon performing a correction of an image blur with using the lens element A'.

Figure 45A:
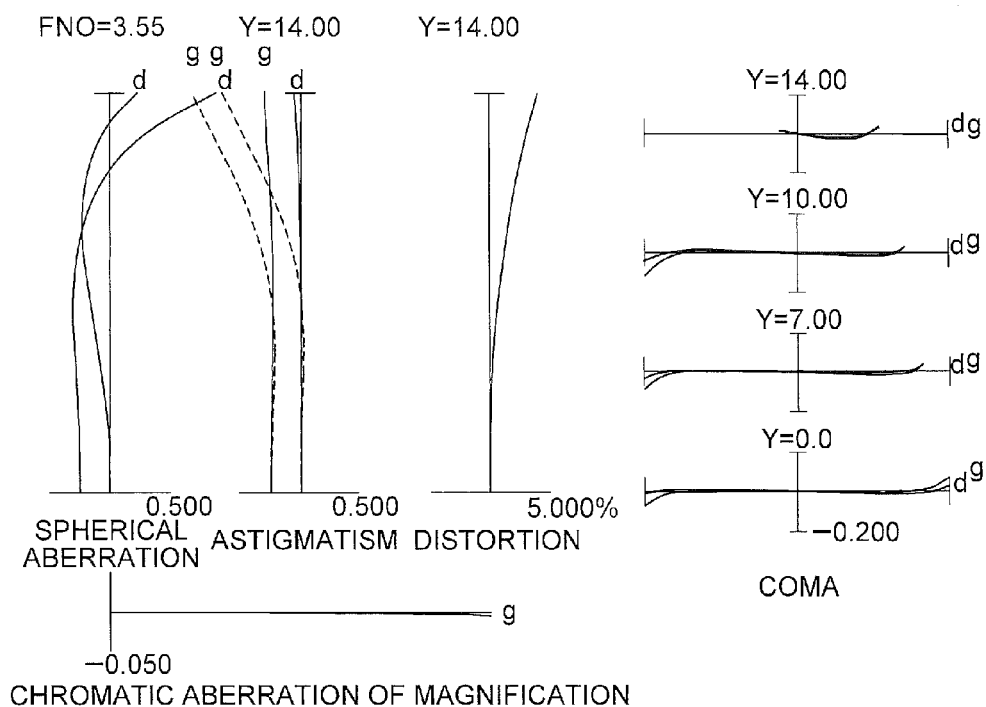
Figure 45B:
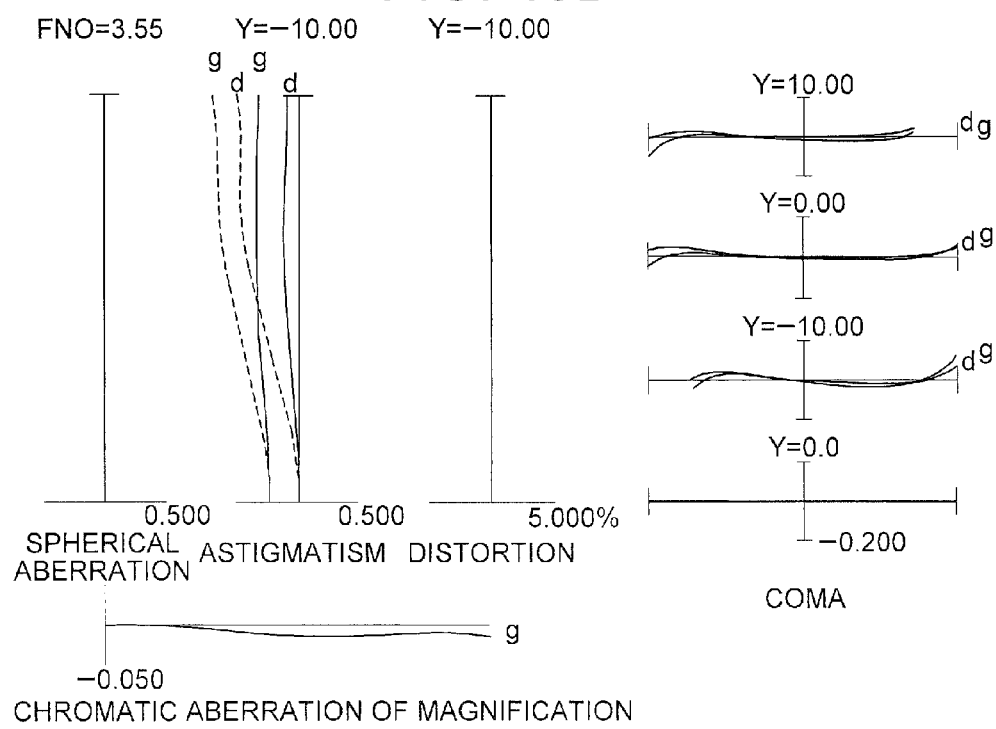

FIGS. 45A and 45B are graphs showing various aberrations of the optical system according to the eleventh Example in the intermediate focal length state upon focusing on infinity, in which FIG. 45A shows various aberrations, and FIG. 45B shows various aberration upon performing a correction of the image blur with using the lens element A'.

Figure 46A:
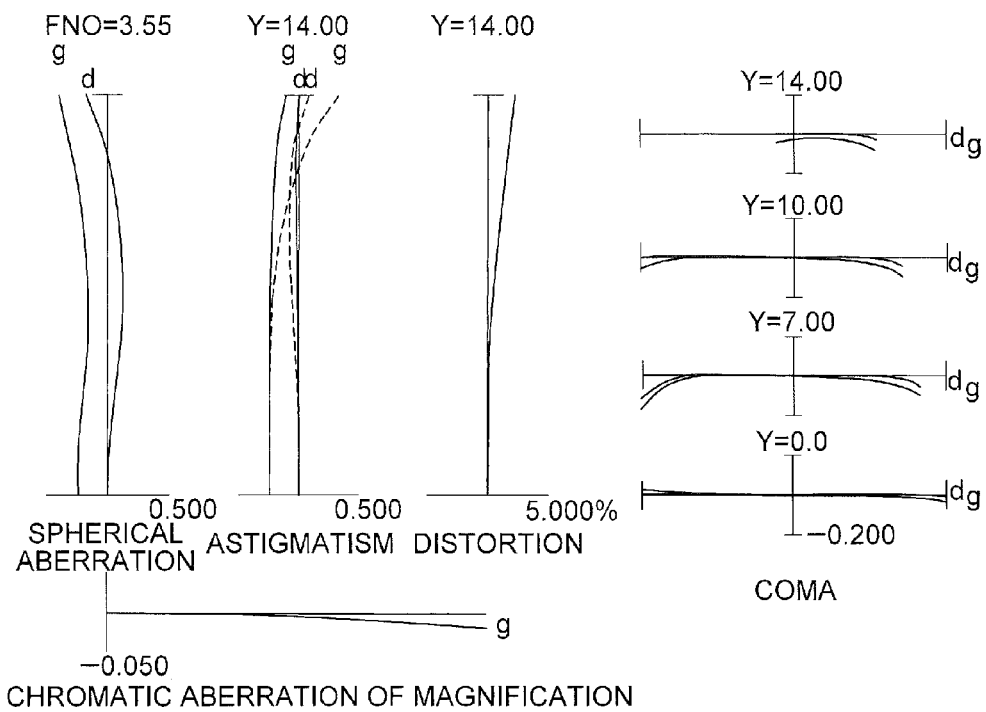
Figure 46B:
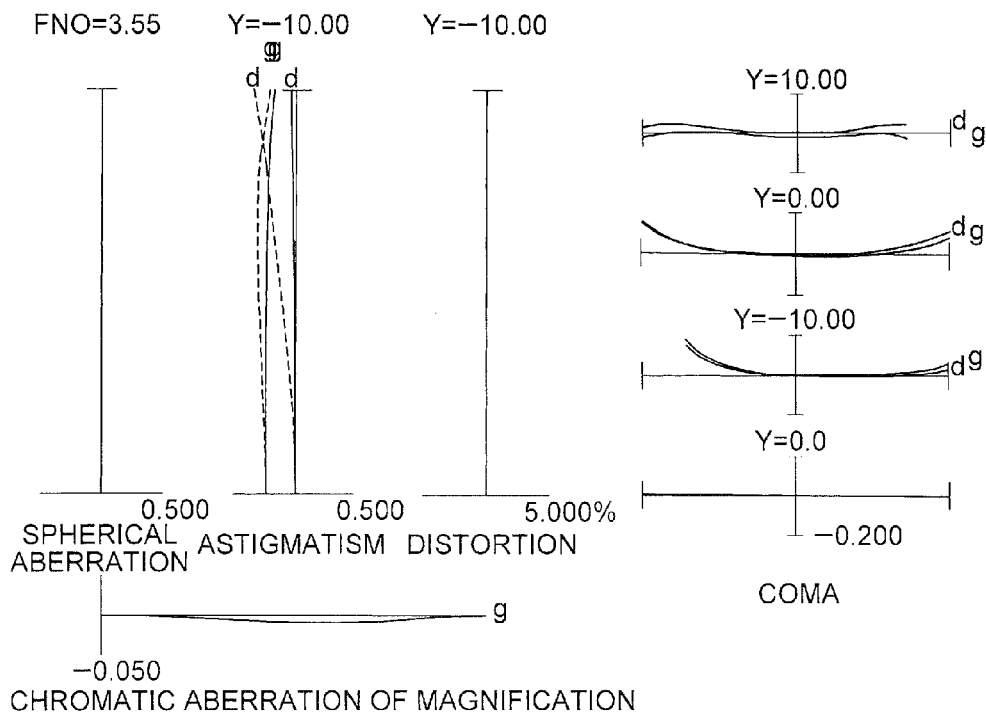

FIGS. 46A and 46B are graphs showing various aberrations of the optical system according to the eleventh Example in the telephoto end state upon focusing on infinity, in which FIG. 46A shows various aberrations, and FIG. 46B shows various aberration upon performing correction of the image blur with using the lens element B'.

As is apparent from the respective graphs of aberrations, it is understood that the eleventh Example has a superb optical performance as a result of good corrections to various aberrations from the wide-angle end state to the telephoto end state.

As described above, the above respective Examples can realize optical systems each having a suitable vibration reduction function.

Next, an image apparatus equipped with an optical system relating to each embodiment of the present invention is explained.

Figure 47:
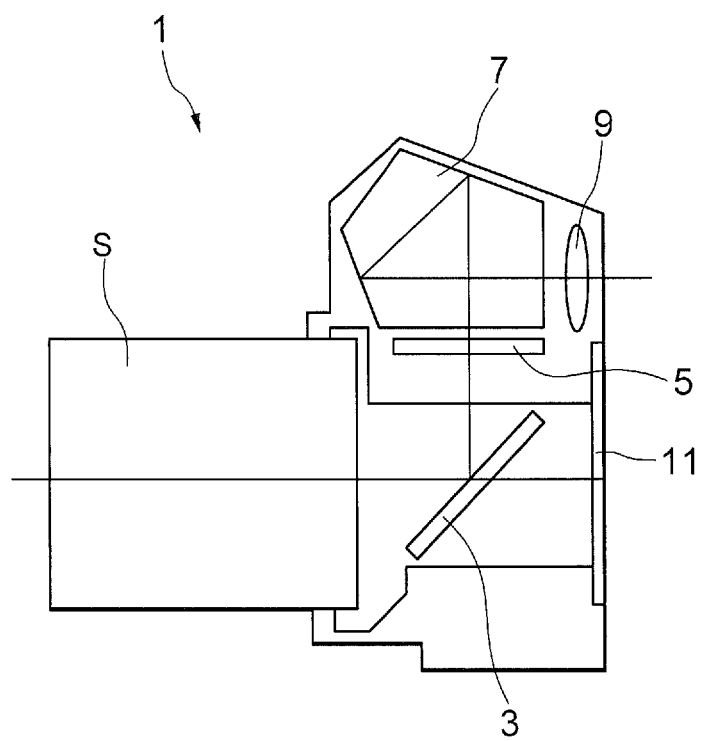
FIG. 47 is a schematic view showing a single lens reflex digital camera equipped with an optical system of the present invention.

FIG. 47 is a sectional view showing a single-lens reflex digital camera equipped with the optical system S relating to each embodiment of the present invention.

In the single-lens reflex digital camera 1 shown in FIG. 47, light emitted from an unillustrated object (object to be photographed) is converged by the optical system S, reflected by a quick return mirror 3, and focused on a focusing screen 5. The light focused on the focusing screen 5 is reflected a plurality of times in a pentagonal roof prism 7, and led to an eyepiece 9. Accordingly, a photographer can observe the object image as an erected image through the eyepiece 9.

When the photographer presses an unillustrated release button, the quick return mirror 3 is retracted from the optical path, and the light from the unillustrated object (object to be photographed) converged by the optical system S, forms an object image on an imaging device 11. Accordingly, the light emitted from the object is captured by the imaging device 11, and stored in an unillustrated memory as an image of the object. In this manner, the photographer can take a picture of an object (object to be photographed) by the camera 1.

As composed above, the single-lens reflex digital camera 1 equipped with the optical system relating to the present invention, has a suitable vibration reduction function, can correct excellently various aberrations and can realize a superb optical performance.

Incidentally, the camera 1 shown in FIG. 47 may be one that is detachably holds a taking lens or one that is integrally formed with the taking lens. The camera may be a single lens reflex camera, or a camera that has no quick return mirror.

The respective examples relating to the respective embodiments show concrete examples of the present inventions, but the present invention is not limited to them. The followings can be adopted properly within a range in which an optical performance is not deteriorated.

Although a four-lens-group configuration and a five-lens-group configuration are shown for numerical Examples of the present invention, the lens-group configuration according to the present application is not limited them, other lens-group configurations (for example, a six-lens-group configuration) is possible. Concretely, other lens configuration that a lens or a lens group is added to the most object side thereof is possible, and a lens configuration that a lens or a lens group is added to the most image side thereof is also possible. Incidentally, a lens group means a portion that includes at least one lens separated by air spaces.

In the optical system of the present invention, in order to carry out focusing from infinity to a close object, a portion of a lens group, a single lens group in its entirety, or a plurality of lens groups may be moved along the optical axis as a focusing lens group. In this case, the focusing lens group can be used for auto focus, and is suitable for being driven by a motor such as an ultrasonic motor. It is particularly preferable that at least a portion of the first or second lens group is made as the focusing lens group.

In the optical system of the present invention, a lens surface of a lens as a component of the system may be a spherical surface, a plane surface, or an aspherical surface. When the lens surface is a spherical surface or a plane surface, lens processing, assembling and adjustment become easy, and deterioration in optical performance caused by lens processing, assembling and adjustment errors can be prevented, so that it is preferable. Moreover, even if the image plane is deviated, deterioration in optical performance is little, so that it is preferable. When the lens surface is an aspherical surface, the aspherical surface may be fabricated by a grinding process, a glass molding process that a glass material is formed into an aspherical shape by a mold, or a compound type process that a resin material is formed into an aspherical shape on the glass lens surface. A lens surface may be a diffractive optical surface, and the lens may be a graded-index type lens (GRIN lens) or a plastic lens.

It is preferable that the aperture stop SP of the optical system of the present invention is disposed in the neighborhood of the vibration reduction lens group, but without providing the aperture stop, a lens frame may replace therefor.

An anti-reflection coating having high transmittance over a broad wavelength range may be applied to a or each surface of each or any lens composing the optical system of the present invention, thereby, flare or ghost images are reduced so that an optical performance with high contrast may be attained.

Moreover, in an optical system according to the present invention, the zoom ratio is about 3 to 20.

What is claimed is:

1. An optical system comprising a first lens element which is shiftable to have a component in a direction perpendicular to the optical axis and a second lens element which is shiftable to have a component in a direction perpendicular to the optical axis, said second lens element comprising said first lens element and other lens element, and said first lens element or said second lens element being shifted to have a component in a direction perpendicular to the optical axis, said first lens element being shifted relative to said other lens element upon said first lens element shifting thereby carrying out a correction of the image plane.

2. An optical system according to claim 1, wherein the first lens element and the second lens element are respectively shiftable to have a component in a direction perpendicular to the optical axis, and in said second lens element, said first lens element and said other lens element have refractive powers having the same sign.

3. An optical system according to claim 1, wherein the following conditional expression is satisfied:

$$|fB| < |fA|$$

where $|fA|$ denotes an absolute value of a focal length of the first lens element, $|fB|$ denotes an absolute value of a focal length of the second lens element, and fA and fB have the same sign.

4. An optical system according to claim 1, wherein the following conditional expression is satisfied:

$$0.24 < |fB|/|fA| < 1.00$$

where $|fA|$ denotes an absolute value of a focal length of the first lens element, $|fB|$ denotes an absolute value of a focal length of the second lens element, and fA and fB have the same sign.

5. An optical system according to claim 1 further comprising a third lens element which is shiftable to have a component in a direction perpendicular to the optical axis, and wherein any one lens element among said first lens element, said second lens element and said third lens element is shifted to have a component in a direction perpendicular to the optical axis, thereby performing a correction of the image plane.

6. An optical system according to claim 5, wherein
said third lens element is composed of said second lens element and other lens element that has refractive power of the same sign as that of refractive power of said second lens element.

7. An optical system according to claim 5, wherein the following conditional expression is satisfied:

$$|fC|<|fB|<|fA|$$

where |fA| denotes an absolute value of a focal length of the first lens element,
|fB| denotes an absolute value of a focal length of the second lens element,
|fC| denotes an absolute value of a focal length of the third lens element, and
fA, fB and fC have the same sign.

8. An optical system according to claim 5, wherein the following conditional expression is satisfied:

$$0.24<|fC|/|fA|<1.00$$

where |fA| denotes an absolute value of a focal length of the first lens element,
|fC| denotes an absolute value of a focal length of the second lens element, and
fA and fC have the same sign.

9. An optical system according to claim 5, wherein said third lens element comprises a cemented lens.

10. An optical system according to claim 1, wherein said first and said second lens elements comprise a cemented lens.

11. An optical system according to claim 1, comprising at least four lens groups,
at least said first and said second lens elements are included in any one lens group among said four lens groups.

12. An optical system according to claim 11, comprises in order from the object side, a first lens group, a second lens group, a third lens group, and a fourth lens group, wherein
upon zooming, a distance between said first lens group and said second lens group, a distance between said second lens group and said third lens group, and a distance between said third lens group and said fourth lens group, are varied.

13. An optical system according to claim 1, wherein
the first lens element and the second lens element are shiftable respectively to have a component in a direction perpendicular to the optical axis, and
in said second lens element, said first lens element and said other lens element have refractive powers having different signs from each other.

14. An optical system according to claim 1, wherein the following conditional expression is satisfied:

$$|fA|<|fB|$$

where |fA| denotes an absolute value of a focal length of the first lens element,
|fB| denotes an absolute value of a focal length of the second lens element, and
fA and fB have different signs from each other.

15. An optical system according to claim 1, wherein the following conditional expression is satisfied:

$$0.24<|fA|/|fB|<1.00$$

where |fA| denotes an absolute value of a focal length of the first lens element,
|fB| denotes an absolute value of a focal length of the second lens element, and
fA and fB have different signs from each other.

16. An imaging apparatus equipped with an optical system according to claim 1.

17. An optical system according to claim 1, wherein
each of said first and said second lens elements comprises a cemented lens.

18. A method for manufacturing an optical system comprising a first lens element and a second lens element, including steps of:
composing said second lens element by said first lens element and other lens element,
disposing said first lens element to be shiftable such that a component in a direction perpendicular to the optical axis is included, and said second lens element to be shiftable such that a component in a direction perpendicular to the optical axis is included, said first lens element is shifted relative to said other lens element upon said first lens element shifting, and
composing said first lens element and said second lens element such that a correction of an image blur may be performed by shifting either said first lens element or said second lens element to have a component in a direction perpendicular to the optical axis.

19. A method for manufacturing an optical system according to claim 18, comprising the first lens element and the second lens element which are shiftable respectively to have a component in a direction perpendicular to the optical axis, and
in said second lens element, said first lens element and said other lens element have refractive powers having the same sign.

20. A method for manufacturing an optical system according to claim 18, wherein the following conditional expression is satisfied:

$$|fB|<|fA|$$

where |fA| denotes an absolute value of a focal length of the first lens element,
|fB| denotes an absolute value of a focal length of the second lens element, and
fA and fB have the same sign.

21. A method for manufacturing an optical system according to claim 18, further comprising a third lens element which is shiftable to have a component in a direction perpendicular to the optical axis, and wherein
any one lens element among said first lens element, said second lens element and said third lens element is shifted to have a component in a direction perpendicular to the optical axis, thereby performing the correction of the image plane.

22. A method for manufacturing an optical system according to claim 18, comprising the first lens element and the second lens element which are shiftable respectively to have a component in a direction perpendicular to the optical axis, and
in said second lens element, said first lens element and said other lens element have refractive powers having different signs from each other.

23. A method for manufacturing an optical system according to claim 18, wherein
the following conditional expression is satisfied:

$$|fB|<|fA|$$

where |fA| denotes an absolute value of a focal length of the first lens element,
|fB| denotes an absolute value of a focal length of the second lens element, and
fA and fB have different signs from each other.

* * * * *